United States Patent
Ohara et al.

(10) Patent No.: US 7,479,964 B2
(45) Date of Patent: Jan. 20, 2009

(54) DISPLAY TECHNIQUE FOR DISPLAYING A LAYOUT OF A PRINT NETWORK SYSTEM

(75) Inventors: Kiyotaka Ohara, Nagoya (JP); Tsukasa Nagata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 262 days.

(21) Appl. No.: 11/277,829

(22) Filed: Mar. 29, 2006

(65) Prior Publication Data

US 2006/0224714 A1    Oct. 5, 2006

(30) Foreign Application Priority Data

Mar. 30, 2005   (JP)   ............................. 2005-099256

(51) Int. Cl.
*G06T 15/00*   (2006.01)
(52) U.S. Cl. ............................. 345/581; 710/8; 710/14; 710/15
(58) Field of Classification Search ................. 345/581, 345/419; 710/15, 14, 8
See application file for complete search history.

(56) References Cited

U.S. PATENT DOCUMENTS

| | | | |
|---|---|---|---|
| 5,586,254 A | 12/1996 | Kondo et al. ............. | 395/200.1 |
| 6,714,974 B1 | 3/2004 | Machida ..................... | 709/223 |
| 7,330,913 B1 * | 2/2008 | Dahneke et al. ............... | 710/15 |
| 2001/0052995 A1 | 12/2001 | Idehara ...................... | 358/1.15 |

FOREIGN PATENT DOCUMENTS

| | | |
|---|---|---|
| EP | 0978767 A1 | 2/2000 |
| EP | 1073234 A2 | 1/2001 |

OTHER PUBLICATIONS

European Patent Office, European Search Report for Related EP Application No. 06251771.9 dated Dec. 18, 2006.

* cited by examiner

*Primary Examiner*—Phu K Nguyen
(74) *Attorney, Agent, or Firm*—Baker Botts L.L.P.

(57) ABSTRACT

A display terminal comprises a position storage, a status storage, a connection relationship storage, and a display device. The position storage stores a position of each of the terminals and the printers. The status storage stores a status of each of the printers. The connection relationship storage stores a connection relationship between each of the terminals and each of the printers. The display device displays a layout of a print network system. The layout comprises a plurality of terminal objects, a plurality of printer objects, and a communication path object. Each of the terminal objects and the printer objects is disposed at a corresponding position stored in the position storage. Each of the printer objects is displayed in a manner that represents a status of a corresponding printer stored in the status storage. The communication path object is disposed between each of the terminal objects and each of the printer objects based on the connection relationship stored in the connection relationship storage.

20 Claims, 40 Drawing Sheets

- Device Storage — 42a
- Floor Configuration Storage — 42b
- Position Storage — 42c
- Status Storage — 42d
- Connection Relationship Storage — 42e
- Updating Portion — 42f

42

| Index | Device | Node Name | IP |
|---|---|---|---|
| 1 | HUB | — | — |
| 2 | HUB | — | — |
| 3 | PC | BOB's PC | 10.123.11.11 |
| 4 | Printer | 87AFBA | 10.123.11.4 |

FIG. 6

| Floor | Floor Configuration |
|---|---|
| 1F | X,Y=0,0  X,Y=0,500  X,Y=500,500  X,Y=500,0 |
| 2F | X,Y=0,0  X,Y=0,500  X,Y=500,500  X,Y=500,0 |

FIG. 7

| Index | Position |
|---|---|
| 1 | 2F  X=100  Y=400 |
| 2 | 1F  X=100  Y=400 |
| 3 | 1F  X=100  Y=200 |
| 4 | 1F  X=200  Y=100 |
| 9 | ? |

FIG. 8

| Index | Status |
|---|---|
| 1 | Port : 1/7 |
| 2 | Port : 5/7 |
| 3 | Default P : 4<br>Temporary P : 5 |
| 4 | SLEEP<br>Y = 50, M = 60, C = 20, K = 10 |
| | |

FIG. 9

| Status | Meaning |
|---|---|
| READY | Printable |
| SLEEP | Printable   It's Necessary to Activate. |
| IN-PRINTING | Printable<br>It's Necessary to Wait for Completion of Printing. |
| Y,M,C,K | Remaining Amount of Each Color of Ink<br>In The Case of "Remaining Amount = 0",<br>Not Printable. |
| TROUBLE | Communication Trouble (Paper Jam etc.)<br>Not Printable. |
| POWER OFF | Not Printable   It's Necessary to Turn On. |

FIG. 10

| Index | Connection |
|---|---|
| 1 | 0 |
| 2 | 1 |
| 3 | 2 |
| 4 | 2 |
| 9 | ? |

FIG. 11

| Index | Device | NodeName | IP | Connection | Status | Position |
|---|---|---|---|---|---|---|
| 1 | HUB | — | — | 0 | Port: 1/7 | 2F X=100, Y=400 |
| 2 | HUB | — | — | 1 | Port: 5/7 | 1F X=100, Y=400 |
| 3 | PC | BOB's PC | 10.123.11.11 | 2 | defaultP: 4 temporaryP:5 | 1F X=100, Y=200 |
| 4 | Printer | 87AFBA | 10.123.11.4 | 2 | SLEEP Y:50,M:60:C:20,K:10 | 1F X=200, Y=100 |
| 5 | Printer | 4537FE | 10.123.11.8 | 2 | IN-PRINTING(3) Y:50,M:60:C:20,K:10 | 1F X=400, Y=100 |
| 6 | PC | Mike's PC | 10.123.11.7 | 2 | defaultP: 5 | 1F X=400, Y=400 |
| 7 | Printer | 37366E | 10.123.11.9 | 2 | POWEROFF | 1F X=300, Y=300 |
| 8 | PC | Tom's PC | 10.123.11.6 | 1 | defaultP: 5 | 2F X=100, Y=200 |
| 9 | PC | Bill's PC | 10.123.11.19 | ? | defaultP: 5 | ? |

FIG. 15
(a)
| First Angle | 0~359° |
|---|---|
| Second Angle | 0~90° |
| Mode | Display Mode, Nondisplay Mode, or Desktop Wall Paper Mode |
(b)
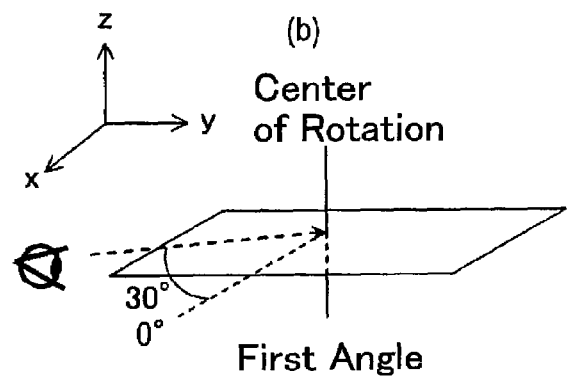
First Angle
(c)
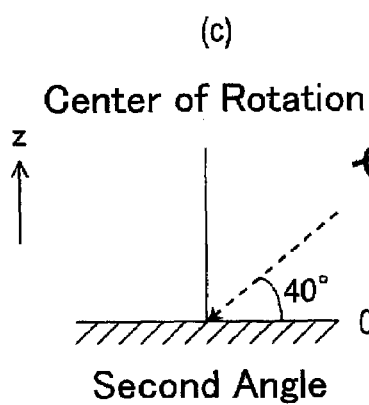
Second Angle (a)

| Floor | View Area |
|---|---|
| 2F | (X,Y=100,100  X,Y=100,200  X,Y=200,200  X,Y=200,100) |
|    | (X,Y=400,400  X,Y=400,500  X,Y=500,500  X,Y=500,400) |
| 1F | (X,Y=100,0  X,Y=100,500  X,Y=500,500  X,Y=500,0) |

(b)

FIG. 22
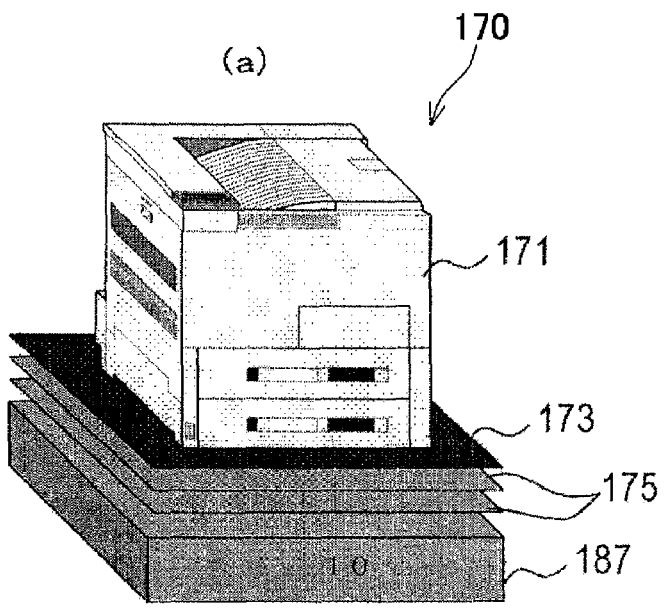
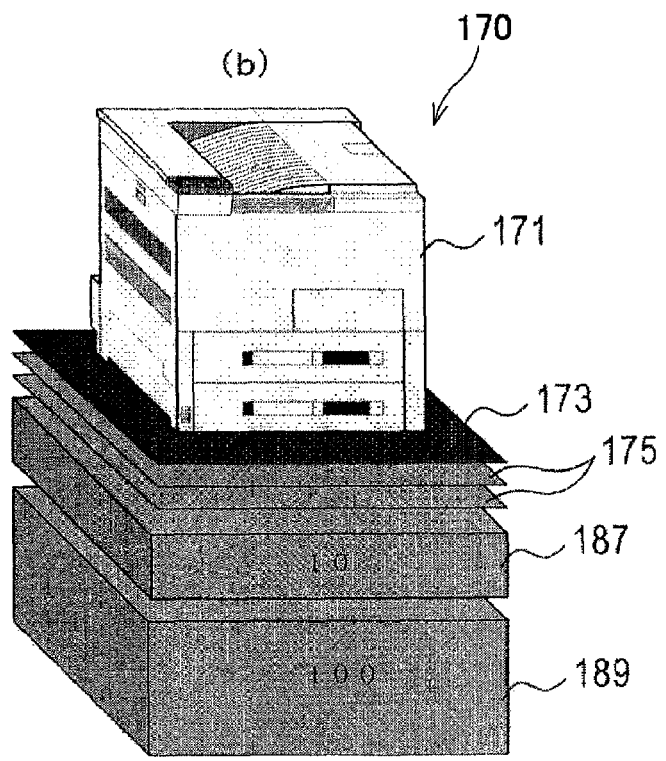

FIG. 24
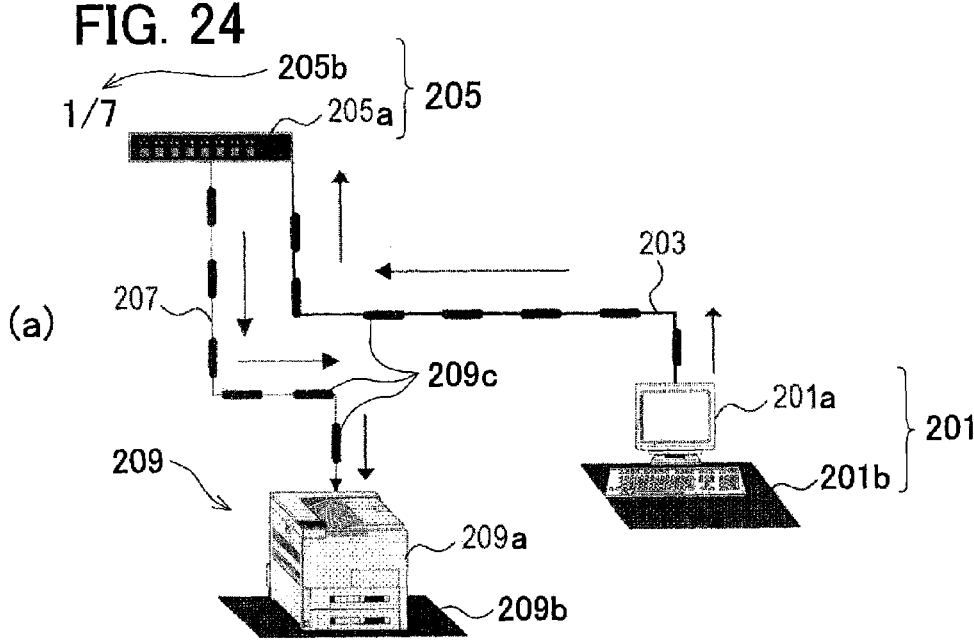
(a)
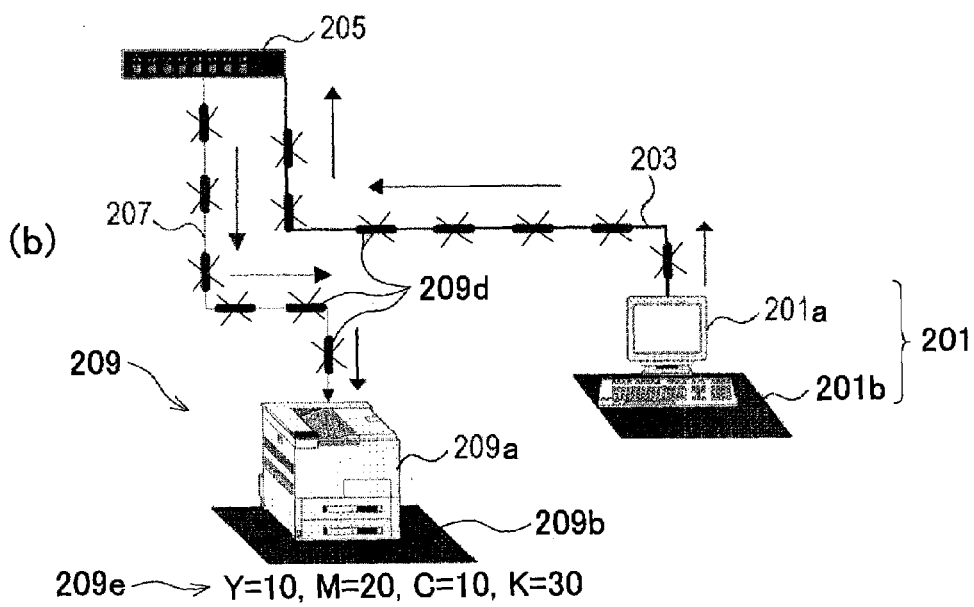
(b)
209e → Y=10, M=20, C=10, K=30
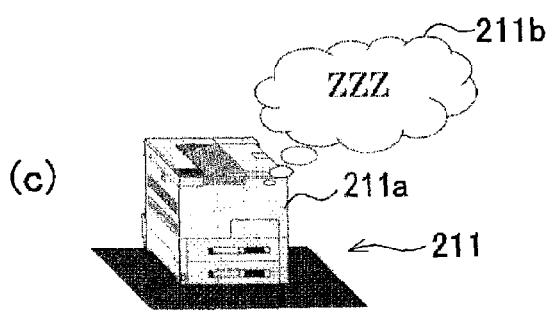
(c)
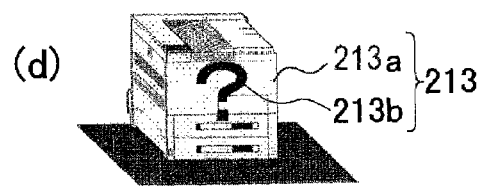
(d)

FIG. 38
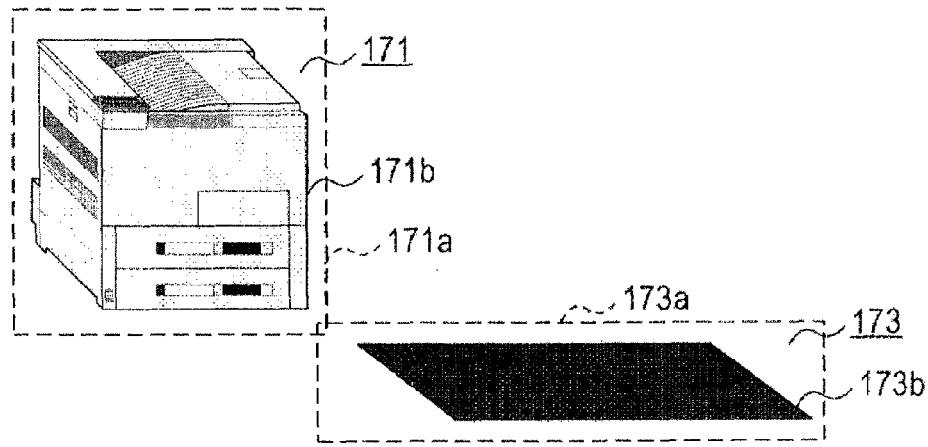
(a)
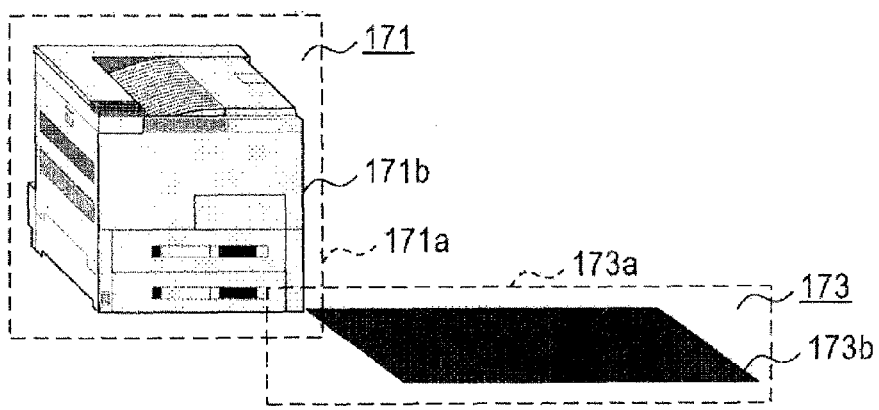
(b)
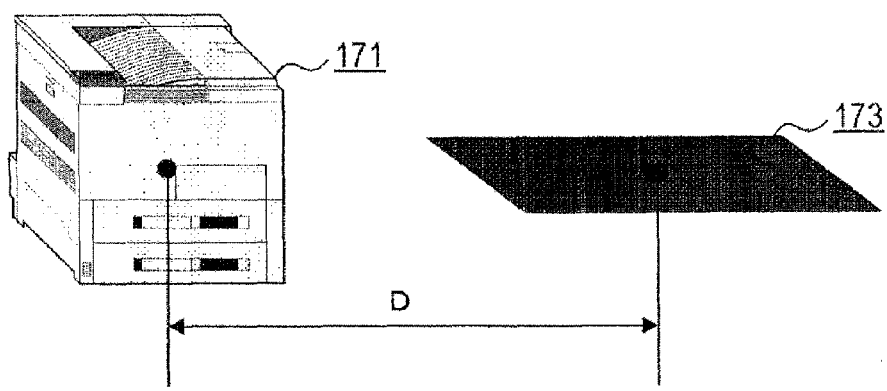
(c)

DISPLAY TECHNIQUE FOR DISPLAYING A LAYOUT OF A PRINT NETWORK SYSTEM

CROSS-REFERENCE TO RELATED APPLICATION

This application claims priority to Japanese Patent Application No. 2005-099256, filed on Mar. 30, 2005, the contents of which are hereby incorporated by reference into the present application. This application is related to United States Patent Application titled "DISPLAY TECHNIQUE FOR DISPLAYING DEFAULT PRINTER INFORMATION OF A PRINT NETWORK SYSTEM" by Kiyotaka Ohara and Tsukasa Nagata, filed on the same day as the present application, which is incorporated herein by reference.

BACKGROUND

1. Field

One aspect of the present invention relates to display technology for displaying a layout of a print network system. In particular, the aspect relates to a display terminal that displays the layout. In addition, the aspect also relates to the print network itself. Furthermore, the aspect also relates to a layout display method, and computer program product for displaying the layout.

Note that the term "printer" in the present specification is to be interpreted in the broadest sense, and includes all devices that print text, images, etc. on print media. For example, a copying machine, an ink jet printer, a laser printer, a facsimile device, a multi-function device, and the like are included in the term "printer".

2. Description of the Related Art

It is widely known to communicably connect a plurality of printers with a plurality of PCs to form a print network system. A device that displays a layout of a print network system is disclosed in US Patent Application Publication No. 2001/0052995. The layout displays a plurality of printer objects and a plurality of PC objects. Each printer object corresponds to different one printer in the system. In addition, each PC object corresponds to different one PC in the system. Each printer object is arranged in a position in which the corresponding printer is actually located. In addition, each PC object is arranged in a position in which the corresponding PC is actually located.

Each printer object shows a status of the corresponding printer (e.g., paper jam, power off, etc.). The printer object shows text data such as "PAPER JAM", "POWER OFF", or the like.

Although the aforementioned conventional technology is useful to a certain degree, the amount of information displayed by the layout is insufficient.

BRIEF SUMMARY

One aspect of the present invention provides technology that can display a layout that includes extremely useful information.

The aspect is a display terminal that displays the layout of a print network system. The print network comprises a plurality of terminals and a plurality of printers. The display terminal is one of the terminals of the print network. The display terminal comprises a position storage, a status storage, a connection relationship storage, and a display device.

The position storage stores a position of each of the terminals and the printers.

The status storage stores a status of each of the printers.

The connection relationship storage stores a connection relationship between each of the terminals and each of the printers.

The display device displays the layout of the print system network. The layout comprises a a plurality of terminal objects, a plurality of printer objects, and a communication path object. Each of the terminal objects and the printer objects is disposed at a corresponding position stored in the position storage. Each of the printer objects is displayed in a manner that represents the status of the corresponding printer stored in the status storage. The communication path object is disposed between each of the terminal objects and each of the printer objects based on the connection relationship stored in the connection relationship storage.

A user of the aforementioned display terminal can see the print network system that the display terminal belongs to. The positional relationship of each terminal and each printer in the system will be properly shown in the layout. Because of that, the user can easily understand the positional relationship of each device (the terminals and the printers).

Each printer object is displayed in a manner that represents the status of the corresponding printer. Because of that, the user can know the status of each printer.

The communication path object is displayed in the layout. Because of that, the user can easily understand the connection relationship of each device.

The user can know, from the layout, positional relationship data for each device, status data for the printers, and communication relationship data for each device. The user can obtain extremely useful data.

The user can, for example, obtain the following information. For example, assume that two printers are connected to the display terminal. The user of the display terminal can know by looking at the communication path object of the layout that two printers are connected to the display terminal. In addition, the user can know the status of each of the two printers by looking at the printer objects of the two printers. For example, when one of the printers is having communication trouble, the user can decide not to use that printer. In this case, the user can decide to use the other printer to execute printing.

Note that the disclosure here is simply an example, and it is not necessary for the aforementioned information to be obtained from the layout. The scope of the aspect of the present invention is to be objectively determined based upon the disclosure of the claims.

The user can obtain extremely useful information by means of the display terminal of the present invention.

BRIEF DESCRIPTION OF THE DRAWINGS

FIG. 6 shows an example of contents stored in a floor configuration storage.

FIG. 7 shows an example of contents stored in a position storage.

FIG. 8 shows an example of contents stored in a status storage.

FIG. 9 shows a table that shows status with the meaning thereof

FIG. 10 shows an example of contents stored in a communication relationship storage.

FIG. 11 shows an example of device data.

FIG. 15(a) shows a table for describing a first angle, a second angle, and mode. FIG. 15(b) shows a figure for describing the first angle. FIG. 15(c) shows a figure for describing the second angle.

FIG. 22(a) shows another example of the display embodiment of the printer object. FIG. 22(b) shows another example of the display embodiment of the printer object.

FIG. 24(a) shows an example of a display embodiment of a portion of the layout. FIG. 24(b) shows another example of the display embodiment of the portion of the layout. FIG. 24(c) shows another example of the display embodiment of the printer object. FIG. 24(d) shows another example of the display embodiment of the printer object.

FIG. 38(a) describes the movement of a self default status object. FIG. 38(b) describes the movement of the self default status object. FIG. 38(c) describes the movement of the self default status object.

DETAILED DESCRIPTION

An illustrative aspect of the present invention will be described with reference to the drawings.

Figure 1:
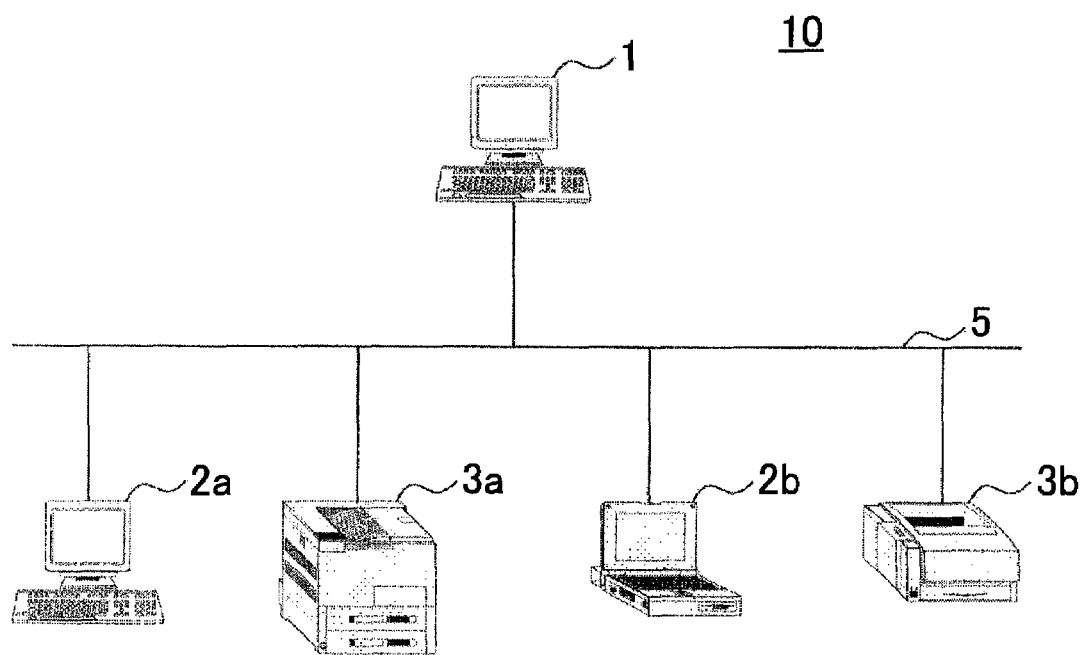
FIG. 1 shows a configuration of a print network system in simplified form.

FIG. 1 shows an example of each device that forms a print network system 10.

The print network system 10 comprises at least one server PC 1, a plurality of client PCs 2a, 2b, and a plurality of printers 3a, 3b. Each device 1, 2a, 2b, 3a, 3b is connected to a LAN (Local Area Network) 5.

Note that the client PCs 2a, 2b will hereinafter be collectively referred to as a client PC 2. In addition, the printers 3a, 3b will be collectively referred to as a printer 3.

In FIG. 1, one server PC 1 is shown. When the server PC is configured with one computer, all functions of the server will be provided in that one computer. However, two or more computers may be configured so as to collectively function as one server PC. In addition, when the server PC 1 is configured with two or more computers, each function of the server will be distributed among the two or more computers. In this case, each function of the server will be achieved by each computer communicating with each other to execute distributed processes. It will be effective to adopt a system that forms one server PC by means of a plurality of computers, for example, when the scale of the system is comparatively large, and when the burden on the server PC is comparatively large.

In the present embodiment, the server PC 1 is configured with one computer.

Two client PCs 2a, 2b and two printers 3a, 3b are shown in FIG. 1. However, the number of client PCs 2 and printers 3 that are present in the system 10 can be freely changed.

Furthermore, a LAN 5 is shown in FIG. 1 in a simplified form. The LAN 5 may include relay devices such as router, a hub, and the like. In addition, the LAN 5 may include a network cable that connects each device including the relay device. Furthermore, the communication path between the devices may be wire type or wireless type.

Figure 2:
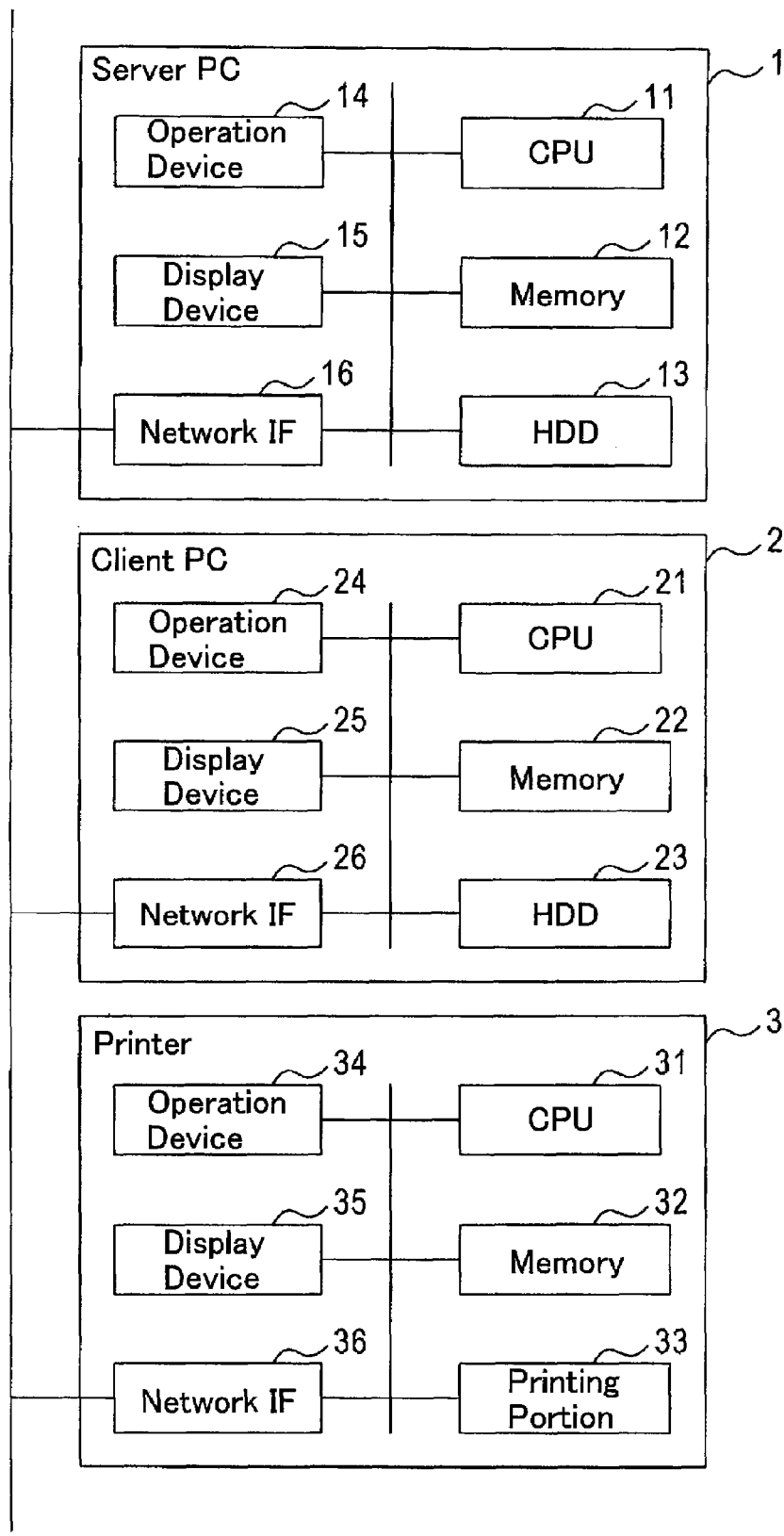
FIG. 2 shows a hardware configuration of each device.

FIG. 2 shows a hardware configuration of each of the server PC 1, the client PC 2, and the printer 3. The system 10 is configured with a plurality of client PCs 2, but the hardware configuration of each client PC 2 is the same. Because of this, only one client PC 2 is shown in FIG. 2. In addition, the system 10 is configured with a plurality of printers 3, but the hardware configuration of each printer 3 is the same. Because of this, only one printer 3 is shown in FIG. 2.

First, the hardware configuration of the server PC 1 will be described.

The server PC 1 includes a CPU 11, a memory 12, an HDD 13 (a hard disk device), an operation device 14, a display device 15, a network IF (network interface) 16, and the like.

The CPU 11 will execute various calculations and controls in accordance with a program stored in the memory 12.

The memory 12 includes a ROM, a volatile RAM, a non-volatile RAM, and the like. The ROM stores a BIOS (Basic Input Output System) and basic data. The memory 12 stores a program for carrying out each function described below. This program is installed from media (e.g., a CD, DVD, etc.). In addition, the volatile RAM temporarily stores various data that is read from the ROM or HDD 13. Furthermore, the volatile RAM temporarily stores various data that is obtained by the calculations and processes executed by the CPU 11. In addition, the non-volatile RAM stores various parameters that can be freely changed in the server PC 1.

The HDD 13 stores program files that correspond to the OS and applications, and various data files.

The operation device 14 is a device that is operated by a user. The operation device 14 includes, for example, a keyboard, a pointing device (e.g., a mouse), or the like. A user can input various data by using the operation device 14.

The display device 15 can display various data. The display device 15 may be configured with a liquid crystal display.

The network IF 16 is connected to the LAN 5. The network IF 16 is a device for outputting data to each device and inputting data from each device in the system 10. The network IF 16 is configured with a network interface card (NIC) and the like.

Next, the hardware configuration of the client PC 2 will be described.

The client PC 2 has the same construction as the server PC 1. In other words, the client PC 2 comprises a CPU 21, a memory 22, an HDD 23, an operation device 24, a display device 25, a network IF 26, and the like.

Each device 21 to 26 is the same as each device 11 to 16 of the server PC 1. Because of this, descriptions of these devices will be omitted.

Next, the hardware configuration of the printer 3 will be described.

The printer 3 comprises a CPU 31, a memory 32, a printing portion 33, an operation device 34, a display device 35, a network IF 36, and the like.

The CPU 31 will control various devices of the printer 3 in accordance with a program stored in the memory 32.

The memory 32 includes a ROM, a volatile RAM, a non-volatile RAM, and the like.

The printing portion 33 includes a conveying mechanism for print media (e.g., printing paper), and a mechanism that prints text and images on the print media. These mechanisms are controlled by the CPU 31.

The operation device 34 is operated by a user. The operation device 34 includes an operation panel having a plurality of keys.

The display device 35 will display various data. The display device 35 is configured with, for example, a liquid crystal display.

The network IF 36 is a device for communicating with each device in the system 10. The network IF 36 is configured with an NIC and the like.

Figure 3:
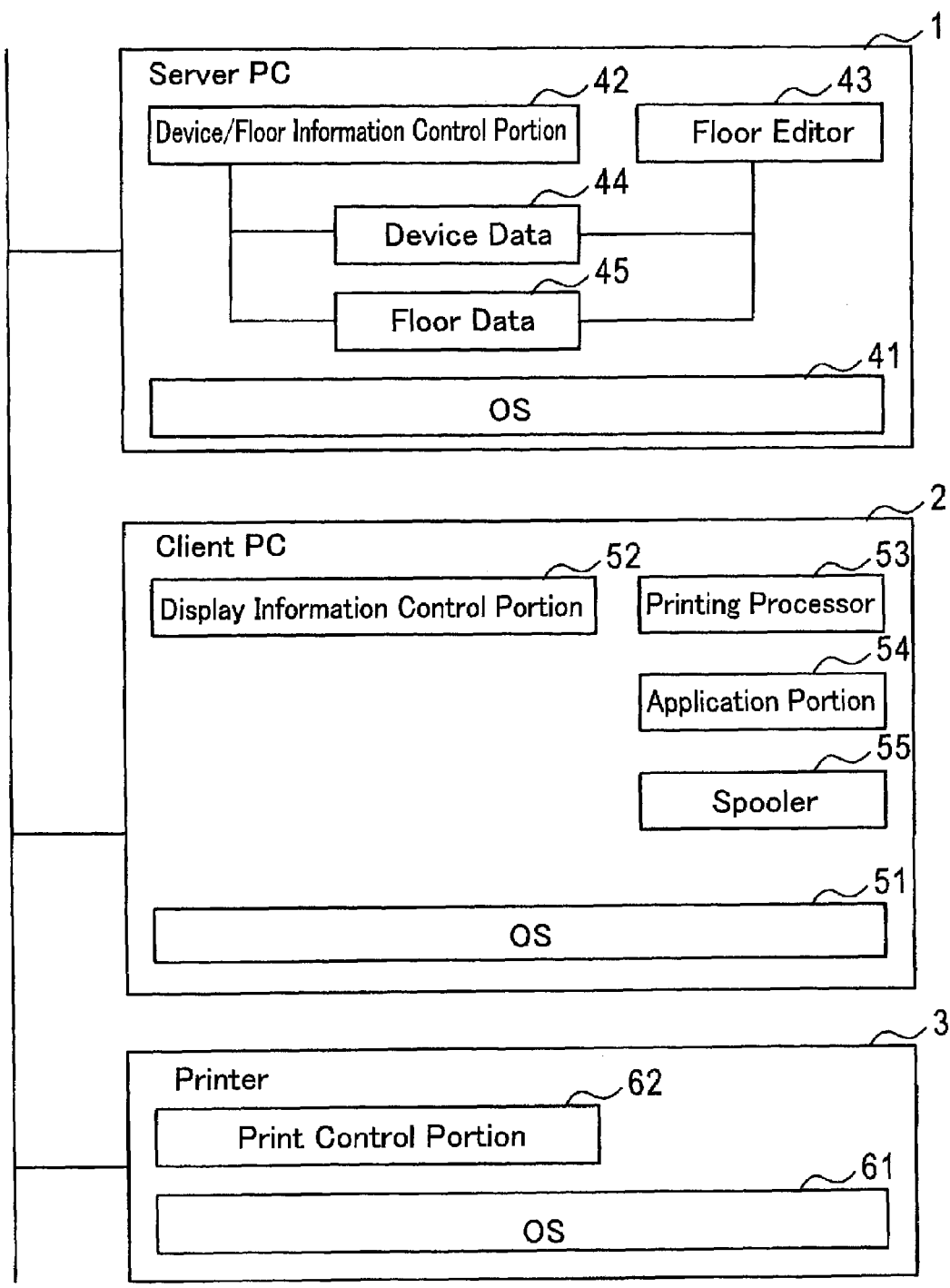
FIG. 3 shows a software configuration of each device.

FIG. 3 shows a software configuration of each of the server PC 1, the client PC 2, and the printer 3.

The server PC 1 includes an OS 41, a device/floor information control portion 42, and a floor editor 43.

The OS 41 performs basic control of the server PC 1. The device/floor information control portion 42 and the floor editor 43 function in parallel by time-sharing, due to the multi-task function of the OS 41. The OS 41 includes a multi-window function that displays a plurality of windows on the display device 15. The OS 41 can display windows corresponding to each of a plurality of software on the display device 15. Windows (registered trademark), Mac OS (registered trademark), and the like can be utilized as specific examples of an OS having the multi-task function and multi-window function. Because the various functions provided by these OSs are well-known, a detailed description of the multi-task function and multi-window function will be omitted. The server PC 1 of this embodiment has the various functions provided by Windows (registered trademark).

The device/floor information control portion 42 will acquire and store various data from each device (client PC 2 and printer 3) in the system 10. In addition, the device/floor information control portion 42 can also store data input by means of the operation device 14 (see FIG. 2). The device/floor information control portion 42 can exchange data with the floor editor 43.

The device/floor information control portion 42 will product device data 44 based upon acquired data and input data. In addition, the device/floor information control portion 42 will execute a process that will provide the device data 44 and floor data 45 to the client PC 2. This process will be described in detail below.

The floor editor 43 will execute a process that produces the floor data 45, and a process that adds hub data to the device data 44. These processes will be described in detail below.

Figures 4, 5:
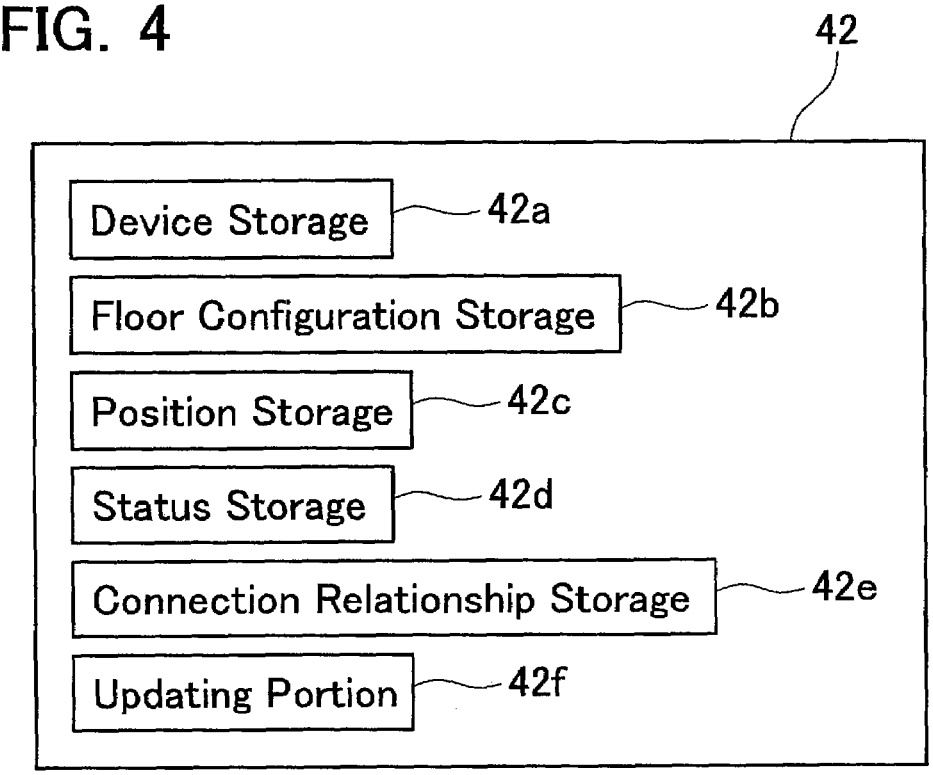
FIG. 4 shows functions achieved by a device/floor information control portion.
FIG. 5 shows an example of contents stored in a device storage.

Each function carried out by the device/floor information control portion 42 will be described. FIG. 4 shows various functions of the device/floor information control portion 42.

The device/floor information control portion 42 has a device storage 42a, a floor configuration storage 42b, a position storage 42c, a status storage 42d, a connection relationship storage 42e, and an updating portion 42f.

FIG. 5 shows an example of contents stored in the device storage 42a. The device storage 42a stores a plurality of combinations of an index number, a device type, a node name, and an IP address.

"Index" in FIG. 5 means the index number. The index number is a number (ID) for identifying each device. Two or more devices will not have the same index number.

"Device" in FIG. 5 means the type of device. In the present embodiment, a device can be a hub, a PC, or a printer. Here, the server PC and the client PCs are both stored under "PC".

"Node Name" in FIG. 5 is the node name set for the client PC 2 or the printer 3. For example, the PC of number 3 has a node name of "Bob's PC". The hubs do not have node names.

"IP" in FIG. 5 is the IP address assigned to the client PC 2 or the printer 3. The hubs do not have IP addresses.

FIG. 6 shows an example of contents stored in the floor configuration storage 42b (see FIG. 4).

The floor configuration storage 42b stores the configuration of floors in which the system 10 is disposed. In the present invention, the PC 2 and the printer 3 are distributed on two floors (first floor and second floor). The floor configuration storage 42b stores a combination of the first floor and the floor configuration thereof. The floor configuration storage 42b also stores a combination of the second floor and the floor configuration thereof "Floor" in FIG. 6 indicates the first floor or the second floor.

"Floor Configuration" in FIG. 6 indicates the floor configuration. In the present embodiment, the floor configuration is defined by the coordinates (two dimensional coordinates) of each corner of the floor. For example, the first floor is defined by four coordinates because there are four corners therein.

Likewise, the second floor is defined by four coordinates because there are four corners therein.

The contents of the floor configuration storage 42b correspond to the floor data 45 shown in FIG. 3. The floor data 45 is produced by the floor editor 43. How the floor data 45 is produced will be described in detail below.

FIG. 7 shows an example of contents stored in the position storage 42c (see FIG. 4). The position storage 42c stores a plurality of combinations of the index number and the position of the device.

"Index" in FIG. 7 means the index number.

"Position" in FIG. 7 means the position of each device in the system 10. The positions of the devices are defined by the combination of the floor and the two dimensional coordinates. The coordinate system is the same as the coordinate system stored in the floor configuration storage 42b.

In the present embodiment, the device of number 1 (hub) is disposed at (100, 400) on the second floor. In another example, the device of number 3 (PC) is disposed at (100, 200) on the first floor. The coordinates of the device of number 9 are not stored because the position thereof is unclear.

FIG. 8 shows an example of contents stored in the status storage 42d (see FIG. 4). The status storage 42d stores a plurality of combinations of the index number and the status of the device.

"Index" in FIG. 7 means the index number.

"Status" in FIG. 7 means the status of the device. In the present embodiment, the status for each type of device will differ. In the present embodiment, there are three types of devices present, hubs, PCs (client PCs and a server PC), and printers. The status of each device will be described below.

The status storage 42d will store the hub with the usage status of the ports thereof. If we assume that the number of the ports of the hub that are in use is X1, and the total number of the ports of the hub is X2, then the usage status of the ports is defined as X1/X2.

For example, the hub of the number 1 has the port usage status of 1/7 in FIG. 7. This means that there are a total of 7 ports, and one port among these is being used.

The status storage 42d stores the PC with the index number of a default printer of that PC. There is normally one default printer set for each PC. If the printer to which print instructions are to be output has not been particularly selected by a user, the PC will output the print instructions to the default printer. In this way, the printer (the default printer) will execute printing. When viewing FIG. 8, it is clear that the PC of number 3 has the printer of number 4 set as the default printer.

The status storage 42d stores the PC with a temporary printer of that PC. The temporary printer is a printer that will be used temporarily. A user can order a PC not to use a default printer and instead use a temporary printer. In this case, the PC will set the temporary printer. When the temporary printer is set in the PC, the status storage 42d will store the index number of the temporary printer associated with that PC. In FIG. 8, the PC of number 3 is associated with the index number 5 of the temporary printer. In contrast, when the temporary printer is not set in a PC, the status storage 42d will not store the index number of the temporary printer associate with that PC. In this case, only the index number of the default printer is associated with the PC.

As noted above, the status storage 42d stores a PC with the index number of the default printer (or temporary printer) set in that PC. This can also be said to be storing the status (the status that indicates which printer is the default printer (or temporary printer).

In addition, when viewed from the perspective of a printer, the index number of the PC which sets the printer itself as the default printer (or temporary printer) is stored in the status storage 42d. For example, in FIG. 8, the printer of number 4 is set as the default printer by the PC of number 3. In other words, a combination of the printer and the PC which sets the printer as the default printer is stored in the status storage 42d. In the present embodiment, this information will be referred to as default printer information. The default printer information is stored in the status storage 42d. Further, the number of PCs which sets one printer as the default printer can be obtained based on the default printer information of each printer. In the present embodiment, this number will be referred to as default number. The default number of each printer is stored in the status storage 42d.

The status storage 42d will store the printer with the status of that printer. FIG. 9 shows a list of printer statuses.

"Ready" means a status in which printing can be immediately executed when a print instruction is input.

"Sleep" means a status in which the power is on, but the printer is in a low energy mode. In this status, printing cannot be immediately executed even if a print instruction is input. In order to execute printing, the low energy mode must be terminated, and the printer must be activated.

"In-printing" means that printing is being performed. In this status, if printing that is currently being executed is yet to be completed, the next print job cannot be executed, even if a print instruction is input. Note that with this status, the index number of the PC from which the print instruction was output will also be stored.

"Y, M, C, K" means the remaining quantity of four colors of ink (yellow, magenta, cyan, black). The remaining quantity of each ink will be stored as numerical values.

"Trouble" means that a print error has occurred. For example, the trouble status includes situations in which print data (print instruction) cannot be correctly received, a paper jam has occurred, ink has run out, or the like. Note that with this status, the index number of the PC from which the print instruction was output will also be stored.

"Power off" means a status in which power has been turned off. In this status, printing cannot be executed if power is not supplied to the printer.

The status storage 42d stores the "Y, M, C, K" of each printer. For example, with the printer of number 4 in FIG. 8, the remaining quantity of yellow ink is 50, the remaining quantity of magenta ink is 60, the remaining quantity of cyan ink is 20, and the remaining quantity of black ink is 10.

The status storage 42d stores the printer with any of the statuses "Ready", "Sleep", "In-printing", "Trouble", and "Power Off". Thus, two or more of these five statuses cannot be simultaneously stored with one printer. For example, "Ready" and "Sleep" cannot be simultaneously stored with one printer. The printer of number 4 in FIG. 8 is in sleep status.

Figure 10:
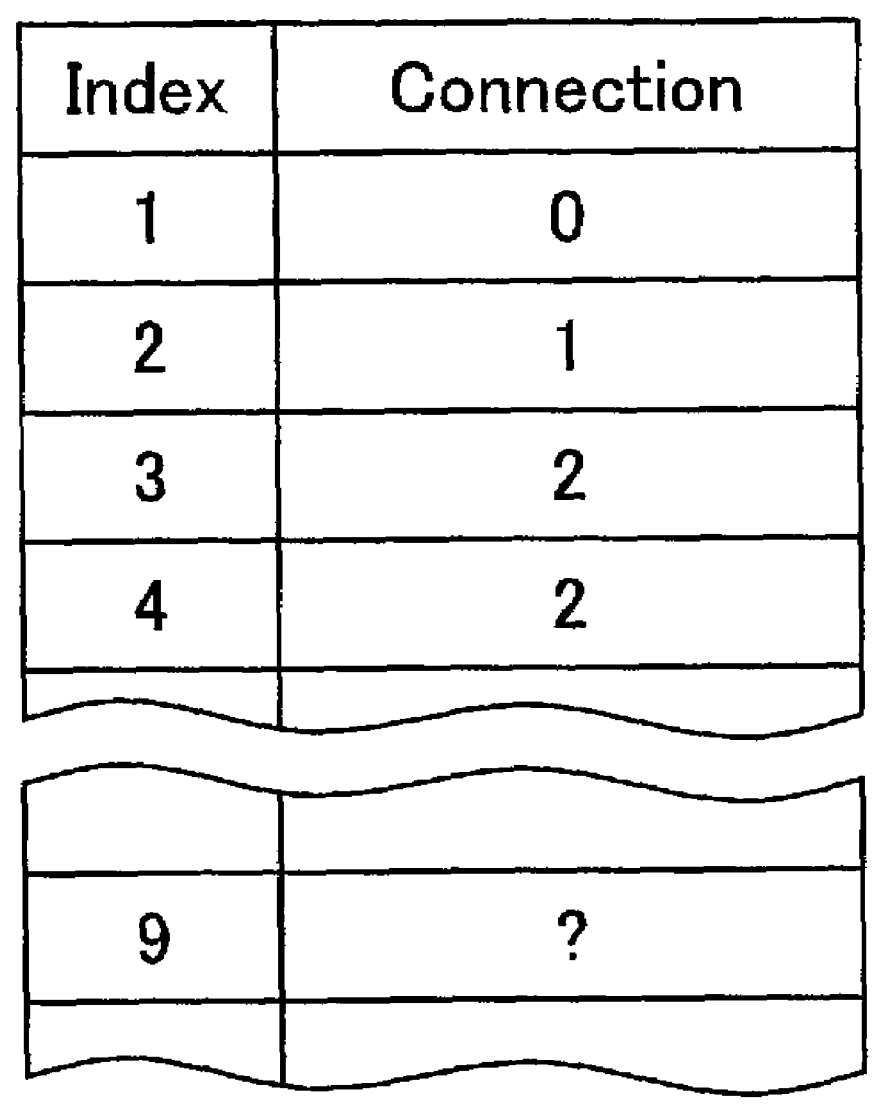

FIG. 10 shows an example of contents stored in the connection relationship storage 42e (see FIG. 4). The status storage 42d stores combinations of the index number of the device and a connection of the device.

"Index" in FIG. 10 means the index number.

"Connection" is an item that indicates how the device is connected with another device. The plurality of devices in the system 10 is assumed to have connection relationships that are tree-structured. When the highest ranking device among the devices in the system 10 is determined, the device connected to that highest ranking device will be a low ranking device. Then, the device that is connected to the low ranking device will be a further low ranking device. For example, when the server PC 1 is the highest ranking device, the client PC 2 that is connected to the server PC 1 is the low ranking device, and the printer 3 that is connected to the client PC 2 and not connected to the server PC 1 is the further low ranking device.

The status storage 42d stores the index number of a high ranking device as data that indicates the relationship between the high ranking device and the low ranking device. For example, in FIG. 10, the "connection" of the PC of number 3 is 2. This means that the PC of number 3 is lower ranked with respect to the hub of number 2, and is connected to the hub of number 2. In addition, the "connection" of the hub of number 2 is 1. This means that the hub of number 2 is lower ranked with respect to the hub of number 1, and is connected to the hub of number 1.

The "connection" of the hub of number 1 is zero. This means that the hub of number 1 has the highest ranking in the tree-structure. The highest ranking device need not be a hub, and can be freely set.

Note that the device of number 9 has a "connection" that is not known. Because of this, the "connection" is not stored.

The device/floor information control portion 42 (see FIG. 3) can produce the data shown in FIG. 11 (the device data 44 of FIG. 3) from the contents of storages 42a, 42c, 42d, 42e described above. FIG. 11 shows an example of the device data 44. Note that in the present embodiment, the storages 42a, 42c, 42d, 42e store the device data 44. However, one storage may store all of the device data 44.

The server PC 1 can output the device data 44 to each client PC 2. In addition, the server PC 1 can output the floor data 45 to each client PC 2. Each data 44, 45 is output from the network IF 16 (see FIG. 2).

Note that in FIG. 11, the remaining quantity of ink is not associated with the printer of number 7 in the "power off" status. However, even in the "power off" status, the remaining quantity of ink may be stored.

The updating portion 42f in FIG. 4 updates the contents of storages 42a to 42e, when new data is obtained. In this way, the device data 44 shown in FIG. 11 will always contain the latest data. In addition, the floor data 45 will be updated with the latest data.

Note that details on how the updating portion 42f updates the data will be provided below.

Next, the software configuration of the client PC 2 will be described. As shown in FIG. 3, the client PC 2 is provided with an OS 51, a display information controller portion 52, a printing processor 53, an application portion 54, a spooler 55, and the like.

Like the OS 41 noted above, the OS 51 includes a multi-task function and a multi-window function. The client PC 2 will be described below as one having various functions provided by Windows (registered trademark).

The display information control portion 52 stores various data needed to control the display of the display device 25 (see FIG. 2), and uses this data to produce various data needed for display. The layout of the print network system is displayed on the display device 25 due to the functionality of the display information control portion 52. Each function that the display information control portion 52 performs will be described below.

The printing processor 53 will process the print data output from the application portion 54 etc. in accordance with the type of printer 3. In addition, the printing processor 53 stores data that specifies the default printer of the client PC 2 itself (e.g., the index number noted above).

The application portion 54 executes a print data creating process and a print data outputting process.

The spooler 55 executes a process that manages, as a print job, the print data output from the application portion 54 and the like.

Figure 12:
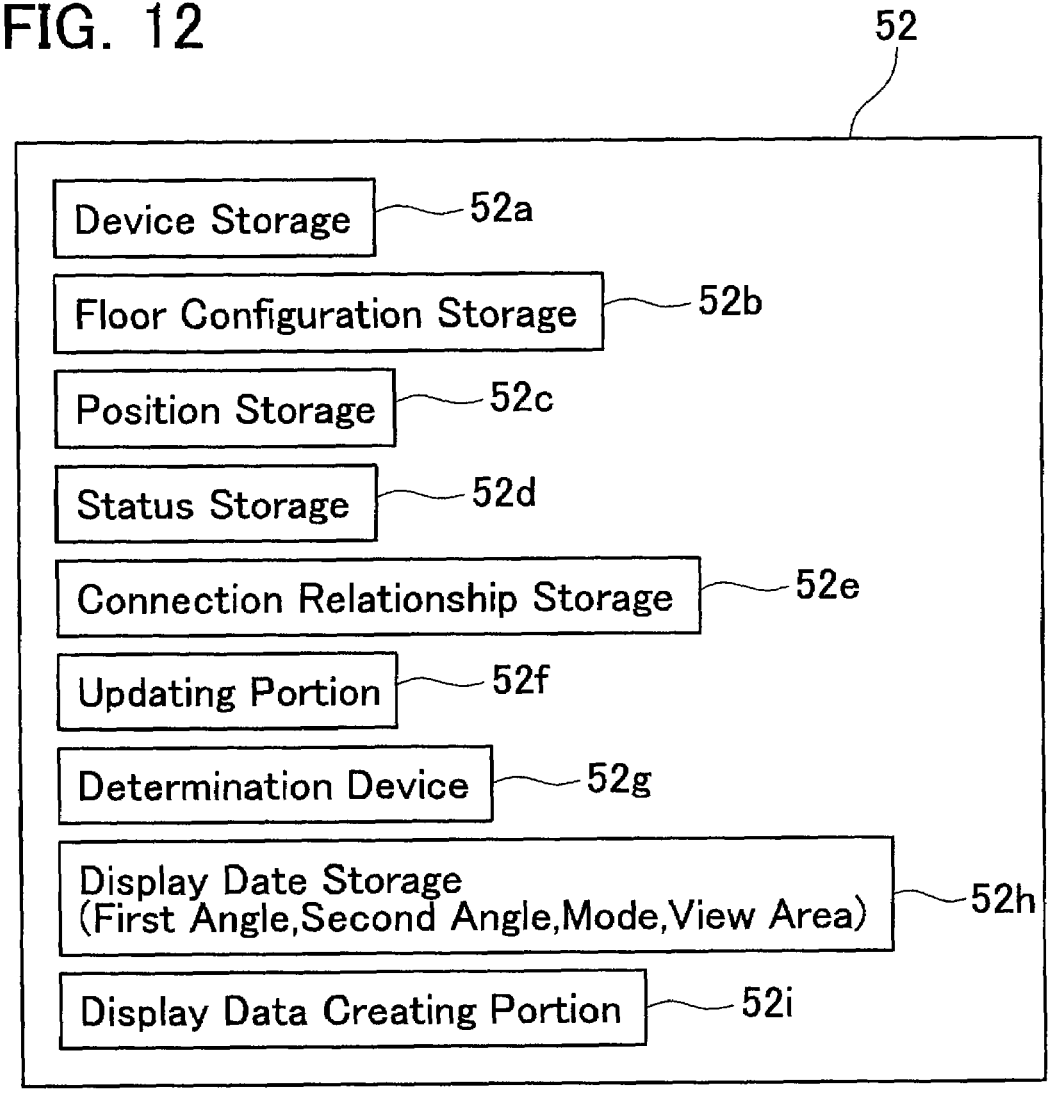
FIG. 12 shows functions achieved by a display information control portion.

FIG. 12 shows the functions that the display information control portion 52 performs. The display information control portion 52 has a device storage 52a, a floor configuration storage 52b, a position storage 52c, a status storage 52d, a connection relationship storage 52e, an updating portion 52f, a determination device 52g, a display data storage 52h, and a display data creating portion 52i.

Each device 52a to 52e stores the same data as each device 42a to 42e noted above (see FIG. 4). The device storage 52a stores the data illustrated in FIG. 5. The floor configuration storage 52b stores the data illustrated in FIG. 6. The position storage 52c stores the data illustrated in FIG. 7. The status storage 52d stores the data illustrated in FIG. 8. The connection relationship storage 52e stores the data illustrated in FIG. 10.

The client PC 2 inputs the device data 44 (the data shown in FIG. 11) that was output from the server PC 1. The device data 44 is input by means of the network IF 26 (see FIG. 2). Data can be stored in each storage 52a, 52c, 52d, 52e based on the content of the device data 44. In the present embodiment, the four storages 52a, 52c, 52d, 52e store the device data 44. However, one storage may store all of the device data 44.

The client PC 2 inputs the floor data 45 (the data shown in FIG. 6) that was output from the server PC 1. The floor data 45 is input by means of the network IF 26 (see FIG. 2). In this way, the client PC 2 can store data in the floor configuration storage 52b.

The update of each storage 52a to 52e is executed by the updating portion 52f shown in FIG. 12. The updating portion 52f will update the content of each storage 52a to 52e based on the content of the device data 44 and the floor data 45 output from the server PC 1. In addition, the updating portion 52f will update the content of the display data storage 52h described below.

The determination device 52g will determine whether or not the PC and the hub may be connected. The details of the process executed by the determination device 52g will be described in detail below.

The display data storage 52h stores various data that is input by a user. The data stored here is data relating to the display of the layout. For example, data relating to a first angle, a second angle, mode, and view area is stored. This data will be described in detail below.

The display data creating portion 52i will produce data to display the layout based on the content of each storage 52a, 52b, and the like noted above.

Next, the software configuration of the printer 3 will be described. As shown in FIG. 3, the printer 3 has an OS 61 and a print control portion 62.

The OS 61 functions by means of the CPU 31 (see FIG. 2) executing various processes in accordance with a program. The print control portion 62 functions as a controller for the OS 61.

A print instruction (print data) output from the client PC 2 will be input to the network IF 36 shown in FIG. 2. The print control portion 62 will use the print data that was input in order to execute a print process. The print process includes a process that prints text and images on a print medium (printing paper).

In addition, the print control portion 62 will output various data relating to the printer 3 to the server PC 1 and the client PC 2. For example, when the status of the printer 3 changes, the print control portion 62 will output data that indicates the status after the change to the server PC 1. The data output to the server PC 1 will be described below.

(1) Data indicating the sleep status will be output when changing from the ready status into the sleep status.

(2) Data indicating the ready status will be output when changing from the sleep status into the ready status.

(3) When the remaining quantity of ink is changed, data indicating the remaining quantity of ink will be output. In the present embodiment, combined data on the remaining quantity of the four colors of ink will be output. For example, even when only the black ink was reduced, combined data on the remaining quantity of yellow ink, the remaining quantity of magenta ink, the remaining quantity of cyan ink, and the remaining quantity of black ink will be output.

The server PC 1 can know the status of the printer 3 (the ready status, the sleep status, and the remaining quantity of ink) by inputting the data of (1) to (3) noted above. In this way, the contents of the status storage 42*d* can be changed.

In addition, when there is a reason which prevents the print control portion 62 from being able to execute printing (a paper jam, insufficient ink, etc.), data indicating that the printer 3 has shifted to the trouble status will be output to the client PC 2 that output the print instruction. In this case, the client PC 2 will output data indicating that the trouble has occurred to the server PC 1. In addition, the client PC 2 will output that data to the server PC 1 when the print instruction was output to the printer 3. Also, the client PC 2 will output that data to the server PC 1 when printing has been completed (when all print data that is to be printed was output).

The server PC 1 can know that the printer 3 is in the in-printing status or trouble status by inputting data indicating that the print instruction has been output or data indicating that trouble has occurred. In addition, the server PC 1 can know that printing was completed in the printer 3 by inputting data indicating that the printing was completed.

In addition, the server PC 1 can know that a printer 3 is in the power off state by outputting a signal to each printer 3, and observing whether or not a response signal is returned. A more detailed description of this point will be provided below.

The hardware configuration and software configuration of each device 1, 2, 3 was described. 3. Next, the layout displayed by the display device 25 of the client PC 2 will be described in detail.

Figure 13:
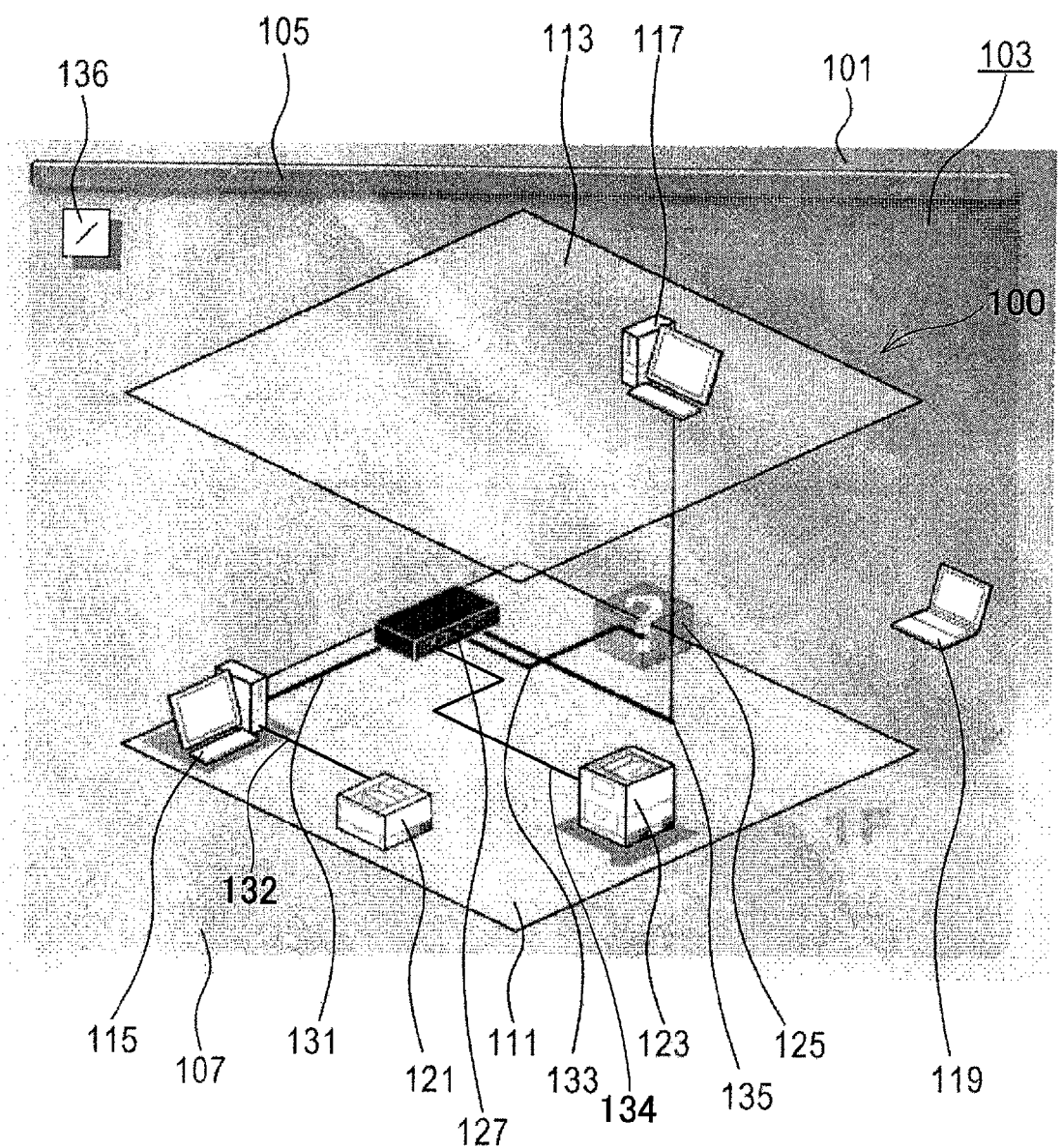
FIG. 13 shows an example of a layout.

FIG. 13 shows an example of a layout 100 that is displayed on the display device 25. The display device 25 has a screen 101.

A layout window 103 is displayed on the screen 101. The layout window 103 includes a bar 105 and a display area 107. The bar 105 is disposed above the display area 107.

The layout 100 is displayed on the display area 107. The layout 100 has a floor object 111 that represents the first floor, and a floor object 113 that represents the second floor. The basic configurations of the floor objects 111, 113 are stored in the floor data 45 (see FIG. 3) that is managed by the server PC 1. When the content of the floor data 45 changes, the configuration of the floor object will change. This embodiment shows only two floors. However, only one floor may be displayed. In addition, More than three floors may be displayed.

The layout 100 has objects that represent each device and communication paths that forms the print network system 100. More specifically, the layout 100 has PC objects 115, 117, 119, printer objects 121, 123, 125, a hub object 127, and communication path objects 131 to 135. Below, the PC objects, the printer objects, and the hub object will be collectively referred to as the device objects.

Each device object corresponds to each device (PC, printer, hub) included in the device data 44 (see FIG. 3). Each device object is arranged in a corresponding position in the device data 44. For example, the PC of number 3 in FIG. 11 is disposed at the position (100, 200) of the first floor. In addition, the printer of number 4 in FIG. 11 is disposed at the position (200, 100) of the first floor. The layout 100 of FIG. 13 is one example, and the layout 100 was not produced based upon the content of FIG. 11.

The devices that are not associated with a position in the device data 44 are disposed at positions that do not overlap on the floor object 111, 113. For example, the location of the PC of number 9 in FIG. 11 is unclear. In this case, like the PC object 119 in FIG. 13, it is disposed in a position that does not overlap with the floor objects 111, 113.

The communication path objects 131 to 135 are disposed between each PC object 113, 115, 117, each printer object 121, 123, 125, and the hub object 127. For example, the communication path object 131 is disposed between the PC object 115 and the hub object 127. The communication path object 132 is disposed between the PC object 115 and the printer object 121. Each communication path object 131 to 135 is disposed in accordance with the connection relationships included in the device data 44. For example, the connection of the PC of number 3 in FIG. 11 is 2. Because of this, a communication path object is disposed between the PC object of the PC of number 3 and the hub object of the hub of number 2. This communication path object is displayed so as to link the PC object of the PC of number 3 with the hub object of the hub of number 2.

The reference numeral 136 in FIG. 13 is an addition operation icon. The addition operation icon 136 is displayed on the display area 107. A user of the client PC 2 can operate the addition operation icon 136 by operating the operation device 24 (e.g., a mouse). In this way, a communication path object can be added to the layout 100.

When a user clicks on the addition operation icon 136, the addition mode will be switch on and off. When two device objects of the layout 100 are sequentially clicked when the addition mode is on, a communication path will be added between the two device objects. For example, when the printer object 117 and the PC object 121 are clicked, a communication path will be added between the printer object 117 and the PC object 121.

As noted above, the layout 100 has the floor objects that correspond to the content of the floor editor (see FIG. 3). The display data creating portion 52*i* (see FIG. 12) will create data for displaying the floor objects based upon the content of the floor configuration storage 52*b* (the floor data 45).

In addition, the layout 100 has the device objects and the communication path objects that correspond to the content of the device data 44 (see FIG. 3). The display data creating portion 52*i* (see FIG. 12) creates data for displaying the device objects and the communication path objects based upon the contents of each storage 52*a*, 52*c*, 52*d*, 52*e* (device data 44).

In addition, the display data creating portion 52*i* (see FIG. 12) will change the display format of the layout based upon the content of the display data storage 52*h*.

How the display information control portion 52 (display data creating portion 52*i*) creates the data for displaying the layout 100 will be described in detail below.

Figure 14:
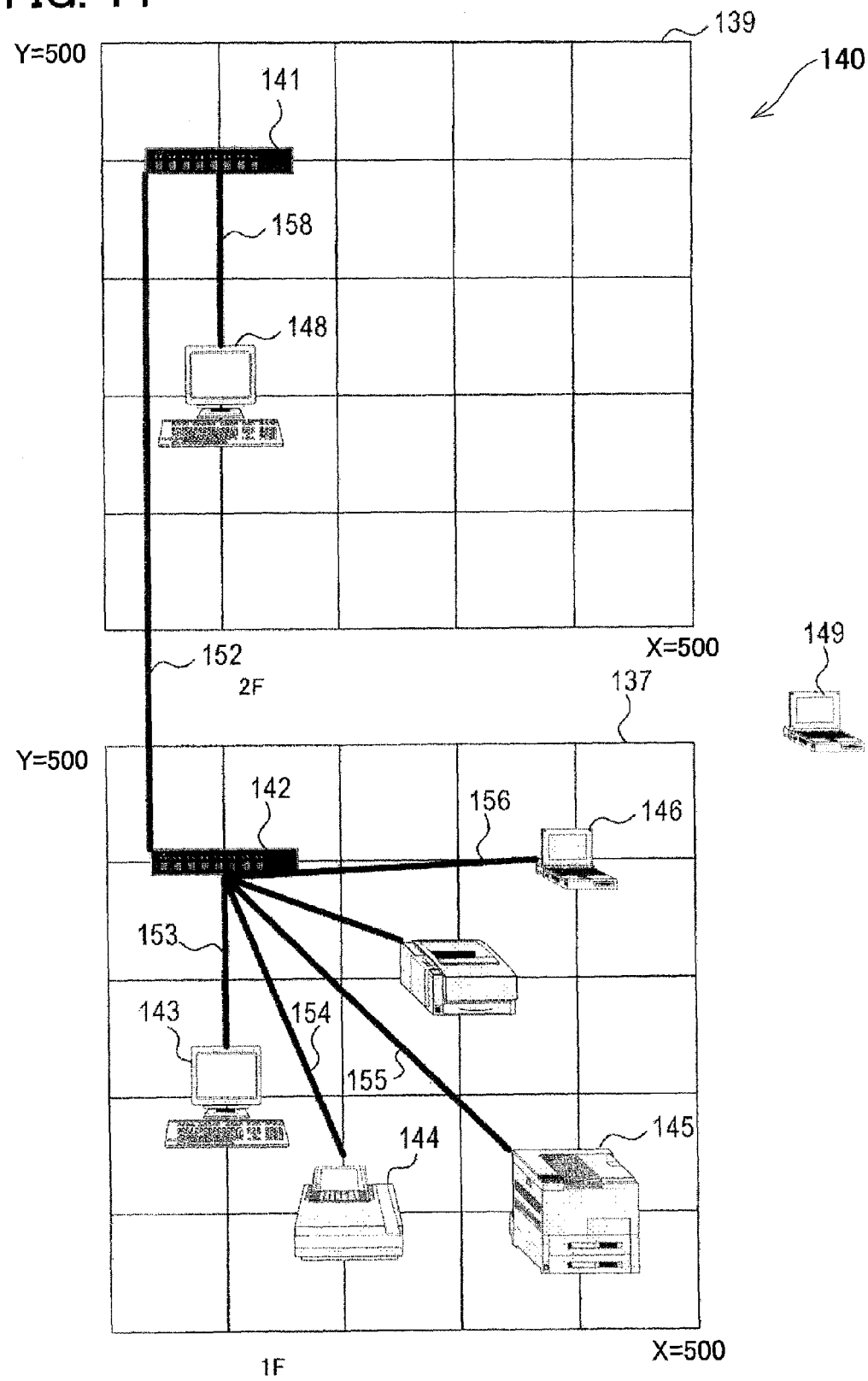
FIG. 14 shows another example of a layout.

The layout 100 illustrated in FIG. 13 is displayed in a perspective format. FIG. 14 shows an example of a layout 140 that is displayed in another format. The layout 140 of FIG. 14 is drawn in a plan view. In FIG. 14, each object is arranged based upon the floor data 45 of FIG. 6 and the device data 44 of FIG. 11.

In FIG. 14, the horizontal direction is the X direction, and the vertical direction is the Y direction. The floor objects 137, 139 have contour lines that are drawn based upon the floor data 44 of FIG. 6. In addition, the floor objects 137, 139 have grids that are drawn at a predetermined spacing (spacing that corresponds to the coordinate values 100). However, the floor objects 137, 139 need not have grids.

The device object 141 corresponds to the hub of number 1 in FIG. 11. Likewise, the other device objects 142-149 correspond to the devices of numbers 2-9 of FIG. 11. Each of the device objects 141 to 149 is disposed at a position that corresponds to the device data 44 of FIG. 11. For example, the hub of number 1 and the coordinates (100, 400) of 2F are combined in the device data 44. Because of this, the hub object of the hub of number 1 is disposed at (100, 400) on the floor object 139 of the second floor. In addition, the printer of number 4 and the coordinates (200, 100) of the first floor are combined in the device data 44. Because of this, the printer object of the printer of number 4 is disposed at (200, 100) on the floor object 137 of the first floor.

In the device data 44 of FIG. 11, the position of the PC of number 9 is unclear. Because of this, the PC object 149 of the PC of number 9 is disposed in a position that does not overlap with the floor objects 137, 139 in FIG. 14.

The communication path objects 152 to 158 are disposed between each device object 141 to 149 based upon the connection relationships (connection) in the device data 44 of FIG. 11. The communication path objects 152 to 158 are displayed so as to link two devices. For example, because the connection of the hub of number 2 in the device data 44 is 1, the communication path object 152 is disposed between the hub object 141 of the hub of number 1 and the hub object 142 of the hub of number 2. The communication object 152 links the hub object 141 and the hub object 142.

The connection relationship of the PC of number 9 in device data 44 is unclear. Because of this, a communication path object is not connected to the PC object 149 of the PC of number 9.

Next, the first angle, the second angle, the mode, and the view area (see the display data storage 52h of FIG. 12) will be described in detail. A user of the client PC 2 can, by operating the operation device 24, input data relating to these elements. The data that was input will be stored in the display data storage 52h.

FIG. 15(a) shows a range in which a user can select the first angle and the second angle. In addition, FIG. 15(a) also shows the types of modes that a user can select.

A user can select the first angle within a range of 0 to 359°. A user can select the second angle within a range of 0 to 90°. A user can select any of a display mode, a non-display mode, and a desktop wallpaper mode.

The first angle and the second angle are elements for determining the view point in which a user will view the layout when the layout is displayed in the perspective format (see FIG. 13).

In this embodiment, a plane in which the floor is enlarged is the XY plane. In addition, the direction perpendicular to the XY plane is the Z direction.

The first angle is an element for determining the view point around the Z axis. FIG. 15(b) serves to explain the first angle. In the example of FIG. 15(b), the view point is a position that is rotated 30° around the Z axis from a reference view point (0°). In this case, the layout when viewed from this view point will be displayed. Below, the Z axis that serves as the reference when determining the first angle will be referred to as a center of rotation.

The second angle is an angle between a line of sight and an intersection of the XY plane and the center of rotation, when looking downward on the XY plane. FIG. 15(c) serves to explain the second angle. In the example of FIG. 15(c), the viewpoint is in a position that is inclined 40° with respect to the XY plane. When the second angle is 90°, a user will look downward on the layout from directly above. In this case, the layout will be displayed in the plan view format as in FIG. 14.

The central point of the layout is preferably the center of rotation noted above. However, this is not required. For example, the center of the drawing of the layout in the XY plane may be the center of rotation.

When the first angle and the second angle are determined, the position of the view point from which the layout is viewed will be determined. In this way, the three dimensional coordinates of each object can be projected onto a two dimensional plane. The layout can be displayed in a perspective format on the two dimensional plane.

The parallel projection method or the perspective projection method can be used as a method for converting three dimensional coordinates to two dimensional coordinates. These projection methods are utilized in the three dimensional CAD system and car navigation fields. Because of this, a detailed description of the method for converting the coordinates will be omitted in the present specification.

Next, the mode will be described (see device data storage 52h of FIG. 12).

A user can use the operation device 24 (see FIG. 2) to select either the display mode, the non-display mode, or the desktop wallpaper mode. The display information control portion 52 (see FIG. 3) will change the display format of the layout on the display device 25 (see FIG. 2) based on the selected mode.

Figure 16:
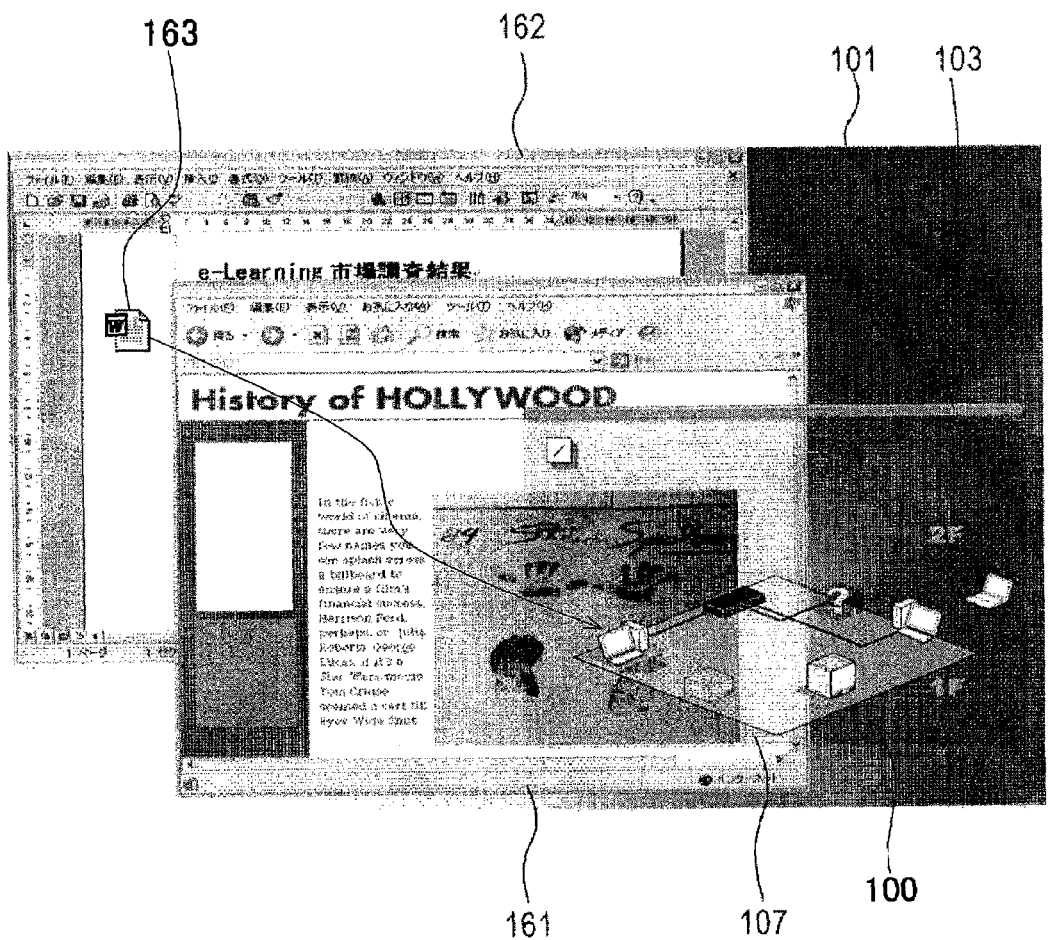
FIG. 16 shows a layout window displayed on a screen (display mode).

FIG. 16 shows the display format when the display mode is selected. In this case, the layout window 103 will be displayed so that it overlaps with the other windows 161, 162. Each object is displayed in a semi-transparent state in the layout window 103. Because of this, the user can easily see the content of another window 161 that overlaps with each object.

Each window 103, 161, 162 is disposed such that the window that was operated last will be on the front side. In the example of FIG. 16, the layout window 103 is disposed on the front side. The window 161 is disposed behind the layout window 103, and the window 162 is disposed behind the window 161. In this case, the window that was operated first is the window 162, the window that was operated thereafter is the window 161, and the window 103 that was operated last is the window 103.

The layout window 103 may be displayed so that it is always on the front side. In the present embodiment, each object of the layout 100 is transparent. Because of this, the view of the other window 161 will not be hindered, even when the layout window 103 is always displayed on the front side.

It is preferred that the user can select whether or not the layout window 103 is always displayed on the front side.

Figure 17:
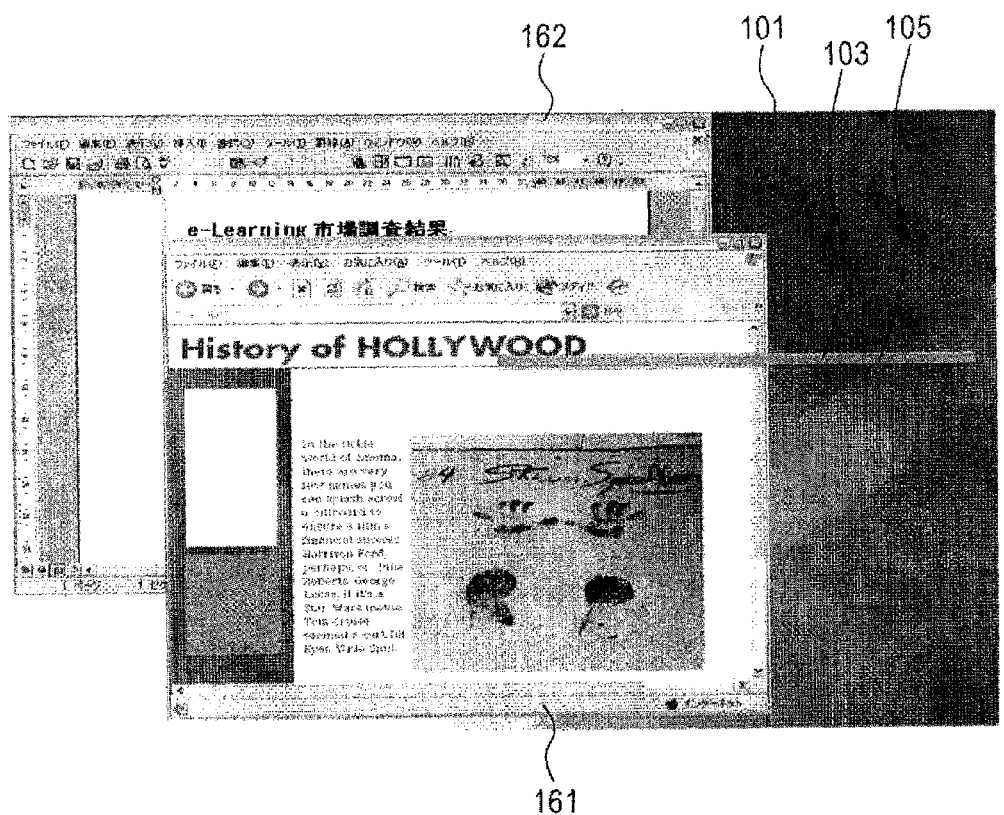
FIG. 17 shows the layout window displayed on the screen (non-display mode).

FIG. 17 shows the display format when the non-display mode is selected. In this case, the bar 105 of the layout window 103 is displayed. In this mode, the layout cannot be seen, but the other windows 161, 162 can be easily seen.

A user can move the bar 105 to a corner of the screen by operating the operation device 24 (see FIG. 2). In this case, the other windows 161, 162 are easy to see.

Switching between the display mode and the non-display mode may be performed by double clicking the bar 105.

Figure 18:
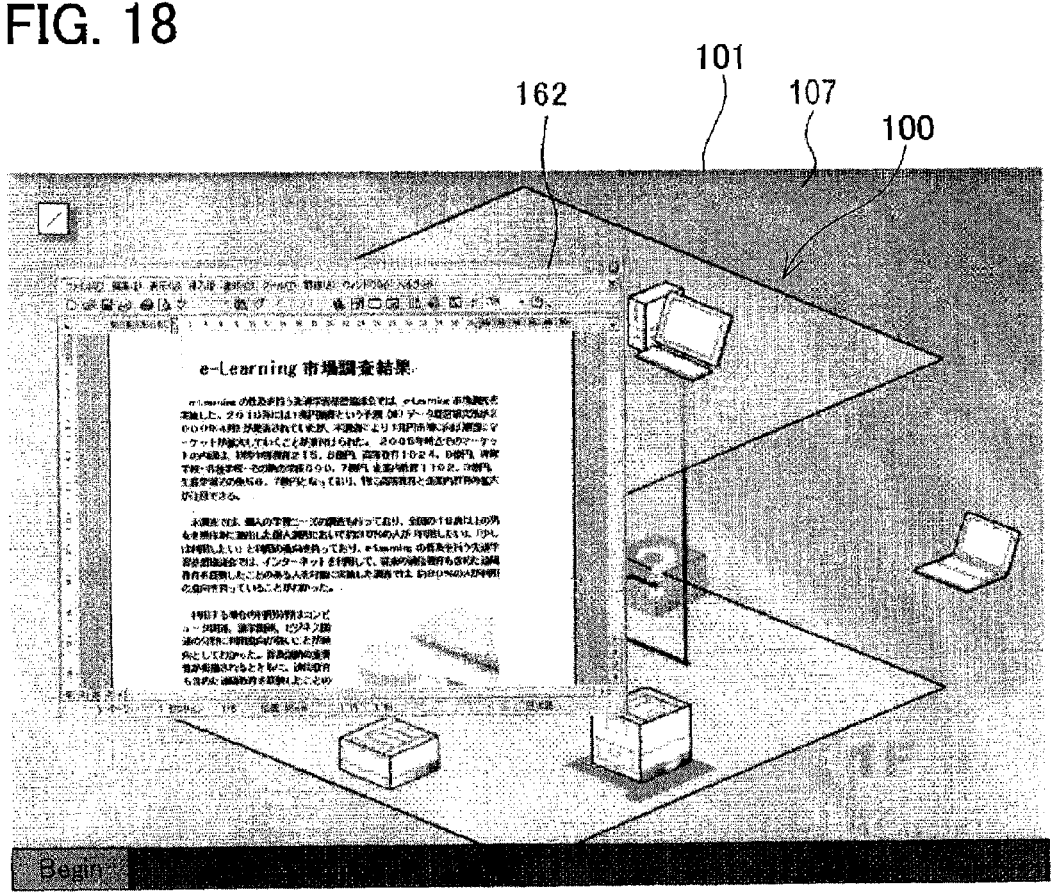
FIG. 18 shows the layout window displayed on the screen (wallpaper mode).

FIG. 18 shows the display format when the desktop wallpaper mode is selected. In this case, the display area 107 will be displayed so as to fill the screen of the screen 101. The display area 107 is disposed behind the other window 162. In this state, the other window 162 is easy to see. If the other window 162 is closed (or made smaller), the display area 107 can be seen.

Next, the view area will be described (see the device data storage 52h of FIG. 12). A user can set the view area by operating the operation device 24 (see FIG. 2). The view area set by the user is stored in the display data storage 52h. The user can set a range in which he or she wants to display the layout as the view area.

Figure 19:
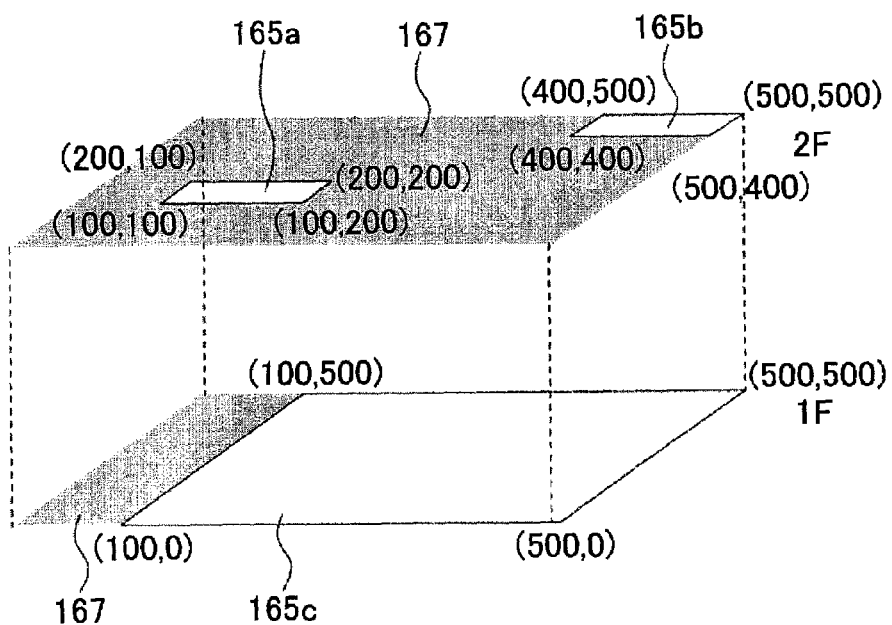
FIG. 19(a) shows an example data of a view area that is stored in the display data storage.
FIG. 19(b) shoes a figure for describing the view area.

FIG. 19(*a*) shows an example of the view area set by the user. The view area is set for each floor. FIG. 19(*b*) shows view areas 165a to 165c in accordance with the content of FIG. 19(*a*). Two view areas are set in the second floor of FIG. 19(*a*). One view area is defined by four coordinates (100, 100), (100, 200), (200, 200), and (200, 100). The area bounded by these four coordinates is the view area. Reference numeral 165a of FIG. 19(*b*) shows the view area bounded by these four coordinates.

In addition, the other view area of the second floor is defined by four coordinates (400, 400), (400, 500), (500, 500), and (500, 400). Reference numeral 165b of FIG. 19(*b*) shows the view area bounded by these four coordinates.

The view area of the first floor is defined by four coordinates (100, 0), (100, 500), (500, 500), and (500, 0). Reference numeral 165c of FIG. 19(*b*) shows the view area bounded by these four coordinates.

Reference numeral 167 of FIG. 19(*b*) shows a region outside the view area.

In the layout, the device objects are displayed inside the view areas 165a to 165c, and device objects are not displayed in the area 167 outside these areas 165a to 165c. Thus, even if a PC is in fact disposed inside the area 167 in the system 10, the PC object of that PC will not be displayed in the layout.

In the present embodiment, a user can freely set the view areas. A layout having only the areas needed by the user will be displayed. The user can see a layout in which unnecessary data has been eliminated.

For example, if two departments are located on the same floor of an office, the client PCs belonging to only one of the departments can be set as the view area. In this case, the users of the client PCs can see a layout in which each device object belonging to the other department has been eliminated. The users can see only the data that they need.

When there are two view areas that are separately arranged (e.g., 165a and 165b of FIG. 19(*b*)), a portion of an area between these view areas may be deleted, and the two view areas may be displayed near each other. When this is done, the layout can be displayed in a more compact manner. In this case, double wave lines or the like may be displayed in the deleted portions. When this is done, the user can know that there is a deleted portion.

The first angle, the second angle, the modes, and the view area have been described. These elements are stored in the display data storage 52h (see FIG. 12).

The display data creating portion 52i (see FIG. 12) will determine the position of the view point based on the first angle and the second angle set by a user, and create display data in order to display the layout when viewed from the position of that view point.

In addition, the display data creating portion 52i will create the display data in response to the mode.

The display data creating portion 52i will create the display data such that the device objects will only be displayed inside the view area that was set.

In the present embodiment, the layout can be displayed in various formats on the display device 25 (e.g., FIG. 13, FIG. 14, FIG. 16, FIG. 17, FIG. 18).

Next, examples of the objects displayed in the layout will be described in detail.

The printer object (121 of FIG. 13 and the like) will be changed in response to the status of the corresponding printer. Examples of the printer object will be sequentially described below.

Figure 20:
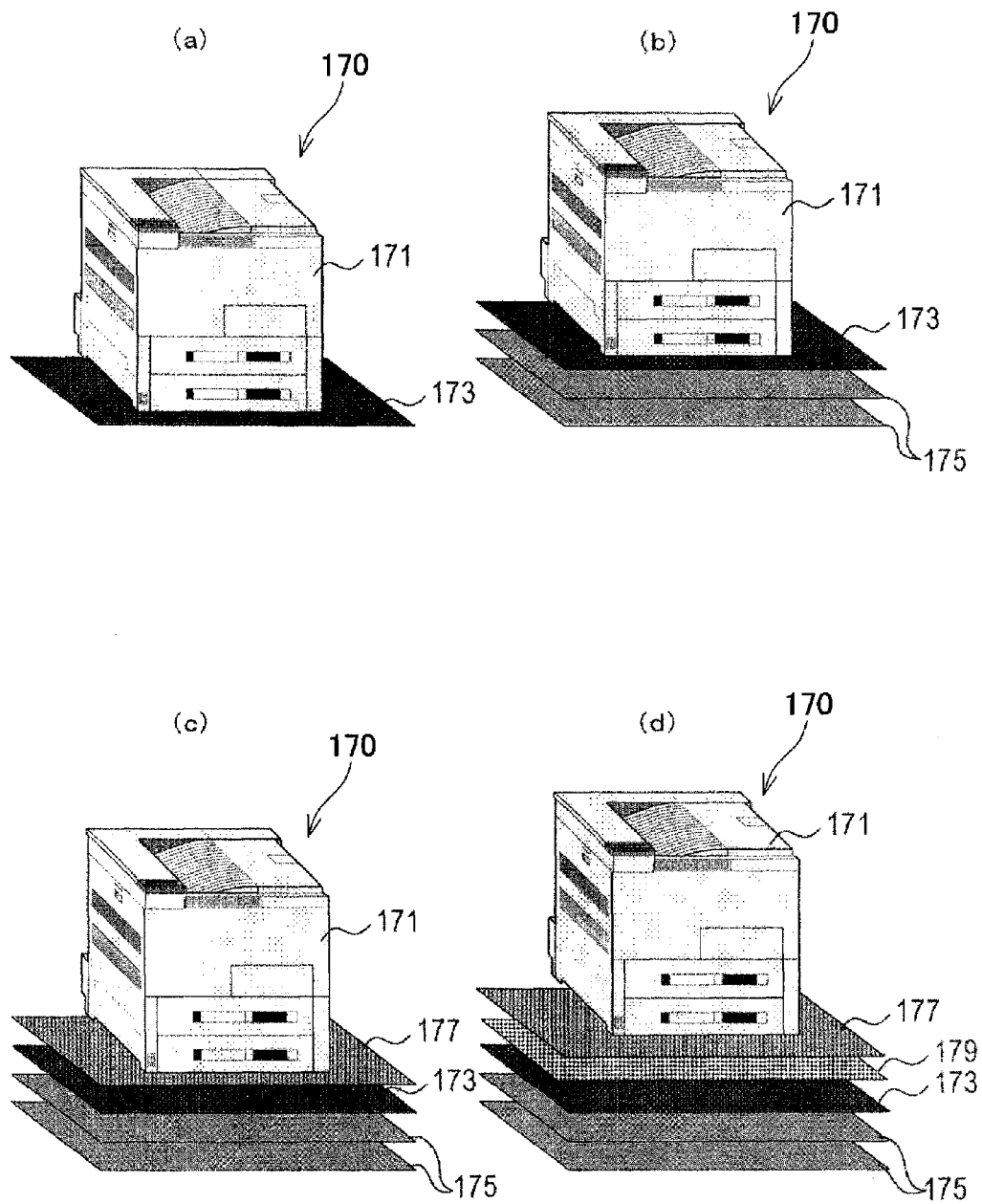
FIG. 20(a) shows an example of a display embodiment of a printer object.
FIG. 20(b) shows another example of the display embodiment of the printer object.
FIG. 20(c) shows another example of the display embodiment of the printer object.
FIG. 20(d) shows another example of the display embodiment of the printer object.

FIG. 20(*a*) shows an example of a printer object 170.

In the example of FIG. 20(*a*), the printer object 170 has a printer figure object 171 and a self default status object 173. The printer figure object 171 has a shape that is modeled on a printer. Because of this, a user can easily understand that the printer figure object 171 represents a printer when he or she views the same.

The self default status object 173 means that the client PC 2 displaying the layout has set this printer as the default printer. For example, when the client PC 2a sets the printer 3a as the default printer, the printer object 170 of the printer 3a will be displayed on the client PC 2a in a format that includes the self default status object 173.

The display data creating portion 52i (see FIG. 12) can know which PC has set which printer as the default printer by referencing the device data 44 (see FIG. 11). Thus, the display data creating portion 52i can specify the default printer of the own client PC 2 (the client PC 2 to which this display data creating portion 52i belongs). The display data creating portion 52i will create display data such that the printer object 170 of the specified default printer will be displayed in a format that includes the self default status object 173.

FIG. 20(*b*) shows another example of the printer object 170.

In the example of FIG. 20(*b*), the printer object 170 has the printer figure object 171, the self default status object 173, and a non-self default status object 175.

The non-self default status object 175 means that the client PCs 2 other than the client PC 2 displaying the layout has set the default printer. For example, when the client PC 2a sets the printer 3a as the default printer, the printer object 170 of the printer 3a will be displayed on the client PC 2b in a format that includes the non-self default status object 175.

The display data creating portion 52i (see FIG. 12) can specify the default printer of another client PC 2 by referencing the device data 44 (see FIG. 11). The display data creating portion 52i will create display data such that the printer object 170 of the specified default printer will be displayed in a format that includes the non-self default status object 175.

In FIG. 20(*b*), two non-self default status objects 175 are displayed. This means that two other client PCs have set this printer as the default printer.

When a user views the display of FIG. 20(*b*), he or she can understand that a total of three client PCs 2 have set that printer as the default printer. The user can easily understand whether or not another client PC 2 has set its default printer as their default printer. In addition, the user can easily understand the default number of the printer 3 (in the aforementioned example, the default number is three). The default number of the printer 3 is the number of PCs that have set that printer 3 as the default printer.

FIG. 20(*c*) shows another example of the printer object 170.

In the example of FIG. 20(*c*), the printer object 170 has the printer figure object 171, the self default status object 173, the non-self default status object 175, and a self temporary printer object 177.

The self temporary printer object 177 will be displayed when the default printer of the client PC 2 that displays the layout is in the trouble status. In particular, the self temporary printer object 177 will be displayed when a print instruction output from the client PC 2 is the cause of the trouble status (e.g., a paper jam).

A user can input data for moving the self temporary printer object 177 on the layout by operating the operation device 24. For example, the user can move the self temporary printer object 177 to a position that overlaps another printer object. In this case, a user can temporarily use the printer 3 on which the self temporary printer object 177 has been overlapped in order to execute printing.

The display data creating portion 52*i* (see FIG. 12) can know which printer is in trouble status by referencing the device data 44 (see FIG. 11). In addition, the display data creating portion 52*i* (see FIG. 12) can know the PC that output a print instruction. The display data creating portion 52*i* will create display data so that the printer object 170 will be displayed in a manner that includes the self temporary printer object 177, when a print instruction output from the own client PC 2 is the cause of the printer being in the trouble status.

FIG. 20(*d*) shows another example of the printer object 170.

In the example of FIG. 20(*d*), the printer object 170 has the printer figure object 171, the self default status object 173, the non-self default status object 175, the self temporary printer object 177, and a non-self temporary printer object 179.

The non-self temporary printer object 179 is displayed when a printer is in trouble status. In particular, the non-self temporary printer object 179 will be displayed when a print instruction output from a client PC 2 other than the client PC 2 that displays the layout is the cause of the trouble status (e.g., a paper jam).

The display data creating portion 52*i* will create display data so that the printer object 170 will be displayed in a manner that includes the non-self temporary printer object 179, when a print instruction output from a client PC 2 other than the own client PC 2 is the cause of the printer being in the trouble status.

Note that each object 173 to 179 noted above will be displayed in a different format. For example, each object 173 to 179 may adopt a base having the same shape, but change the color or pattern thereof. In addition, each object 173 to 179 may adopt bases having different shapes.

Each object 173 to 179 will be stacked below the printer figure object 171 in the Z direction. The display space of the printer object 170 will be compact because the printer figure object 171 and each object 173 to 179 are not placed side by side in the XY plane. Because the printer object 170 is displayed in a compact manner, two printer objects 170 will not interfere even when placed adjacent to each other.

Although the printer figure object 171 is overlapped with each object 173 to 179 in the direction of the plane of the paper in FIG. 20, the printer figure object 171 is disposed on top thereof. Thus, the printer figure object 171 will not be hidden by each object 173 to 179. The printer figure object 171 will be easy to see. However, that does not mean information of each object 173 to 179 will be lost. A layout that is easy to see and understand for a user will be achieved.

Figure 21:
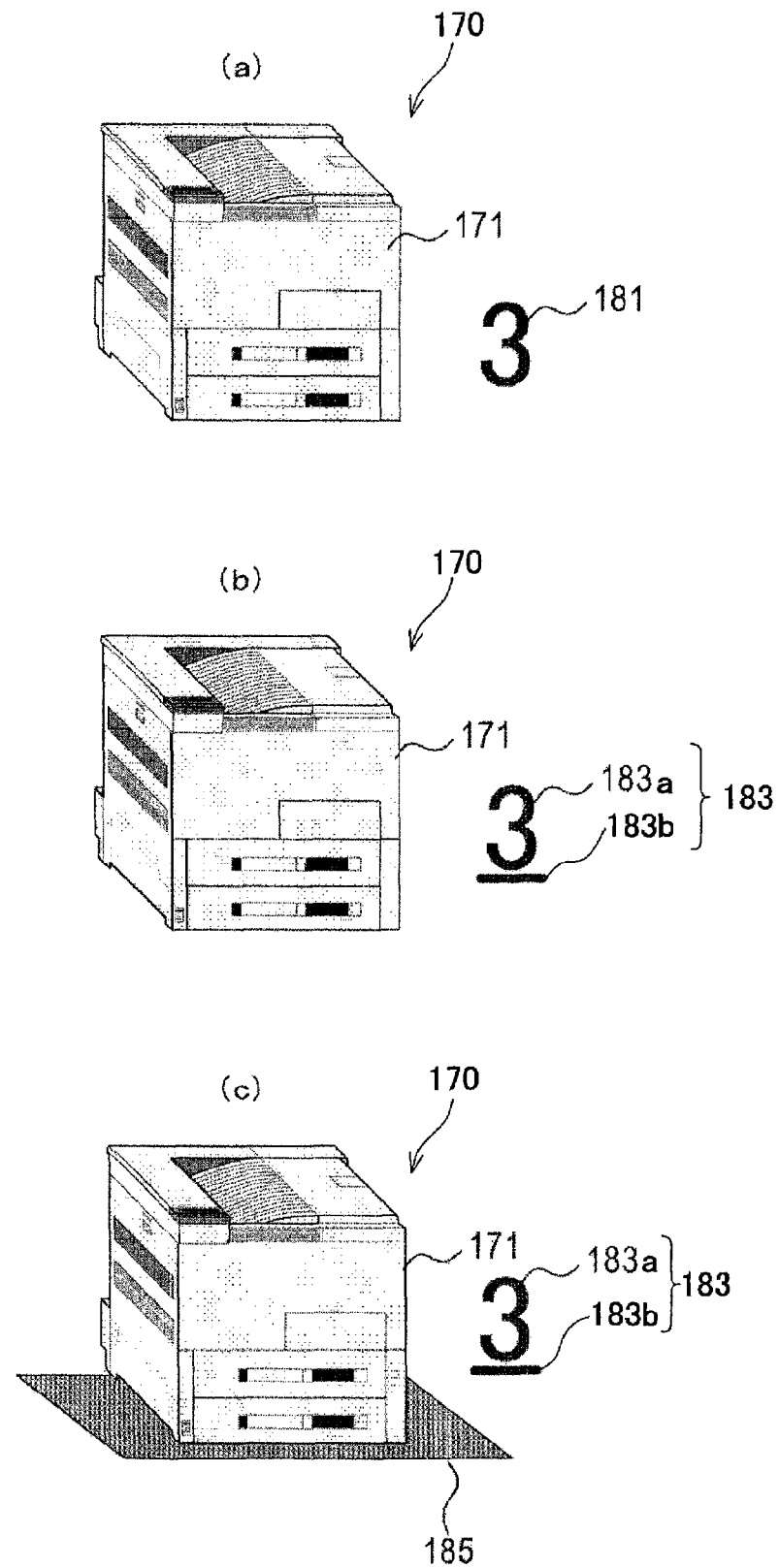
FIG. 21(a) shows another example of the display embodiment of the printer object.
FIG. 21(b) shows another example of the display embodiment of the printer object.
FIG. 21(c) shows another example of the display embodiment of the printer object.

Modifications to the printer object 170 will be described. FIG. 21(*a*) shows a modified example of the printer object 170. In FIG. 21(*a*), the printer object 170 has the printer figure object 171 and a default status object 181. The default status object 181 is shaped like the number 3. This means that the default number of the printer 3 corresponding to the printer figure object 171 is three.

FIG. 21 (*b*) shows another modified example of the printer object 170. In FIG. 21(*b*), the printer object 170 has the printer figure object 171 and a default status object 183. The default status object 183 has a default number object 183*a* and a self default status object 183*b*.

The default number object 183*a* shows the default number of the printer 3 in a number shape. The self default status object 183*b* means that the client PC 2 displaying the layout has set this printer as the default printer.

FIG. 21(*c*) shows another modified example of the printer object 170. In FIG. 21(*c*), the printer object 170 has the printer figure object 171, the default status object 183, and a self temporary printer object 185. The default status object 183 has the default number object 183*a* and the self default status object 183*b*.

The self temporary printer object 185 has the same meaning as the self temporary printer object 177 noted above (see FIG. 20(*c*)). The fact that the self temporary printer object 185 can also be moved is also identical.

FIG. 22(*a*) shows another modified example of the printer object 170. In FIG. 22, the printer object 170 has three non-self default status objects 175, 175, 187. One non-self default status object 175 means that one client PC 2 has set this printer as the default printer. The non-self default status object 187 means that 10 client PCs 2 have set this printer as the default printer. Thus, when viewing FIG. 22(*a*), it can be easily understood that 12 PCs 2 other than the client PC 2 displaying this layout have set the printer 3 as the default printer. In addition, it can be easily understood that the default number of this printer is 13.

Note that it is preferable that the object 187 is larger in the Z direction than one object 175, and smaller in the Z direction than when 10 objects 175 are stacked together in the Z direction.

In addition, FIG. 22(*b*) shows another modified example of the printer object 170. In FIG. 22(*b*), a non-self default status object 189 is added to the printer object 170 of FIG. 22(*a*). The non-self default status object 189 means that 100 client PCs 2 have set the printer 3 as the default printer. Thus, when viewing FIG. 22(*b*), it can be easily understood that 112 PCs 2 other than the client PC 2 displaying this layout have set the printer 3 as the default printer. In addition, it can be easily understood that the default number is 113.

Note that it is preferable that the object 189 is larger in the Z direction than the object 187, and smaller in the Z direction than when 10 objects 187 are stacked together in the Z direction.

If the display formats shown in FIGS. 22(*a*) and (*b*) are used, the default status object can be displayed in a compact manner even when the default number is large. A user can easily comprehend the default number.

Figure 23:
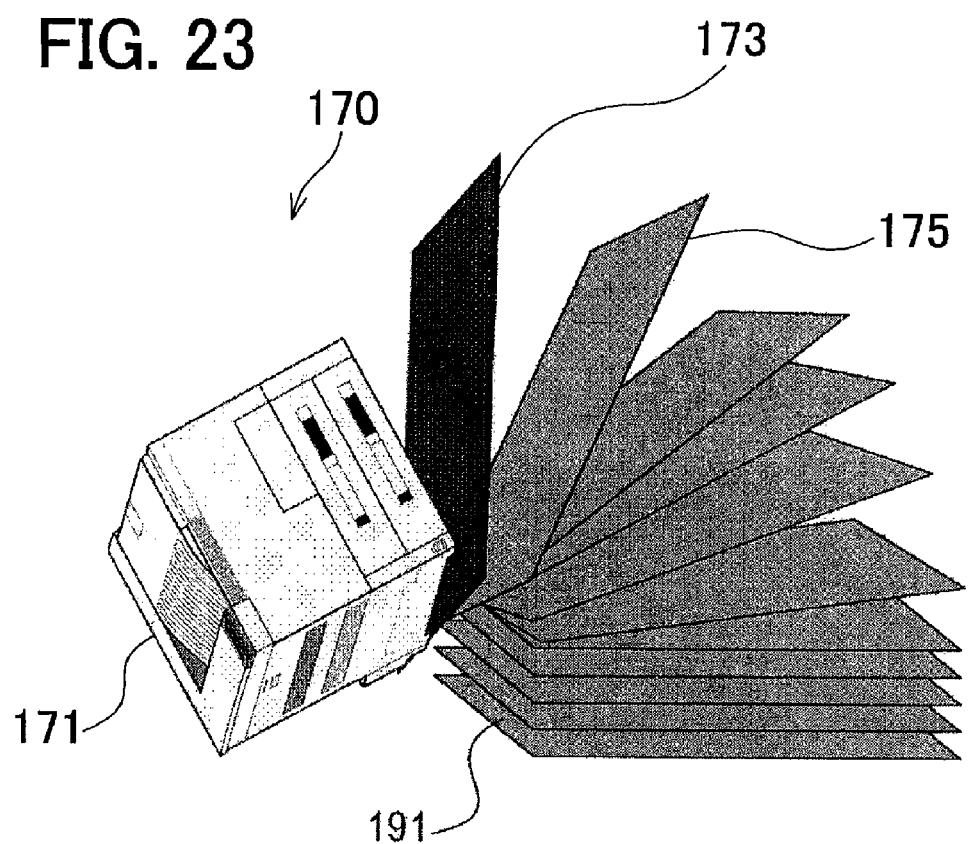
FIG. 23 shows another example of the display embodiment of the printer object.

In addition, in the present embodiment, the printer object 170 may be displayed with the format noted below. FIG. 23 shows another example of the printer object 170.

FIG. 23 shows the printer figure object 171 and the default status objects 173, 175 falling over. The stack of objects 171, 173, 175 in the Z direction is collapsed. This display is displayed when the printer 3 corresponding to the printer figure object 171 is set as the default printer by a number of PCs 2 that exceeds a predetermined number. The predetermined number noted above is freely set.

When an excessive number of PCs 2 has set one printer 3 as the default printer, print instructions will be concentrated on that printer 3, and the burden on that printer 3 will increase. The content of FIG. 23 will be displayed to warn a user that the default number is too large. The user can easily understand that the default number is too high. The user can change the default printer when the default number of that default printer is too large.

In addition, FIG. 24(a) shows another example of the layout.

The reference numeral 201 in the figure is a PC object. The reference numerals 203, 207 are communication path objects. The reference numeral 205 is a hub object. The reference numeral 209 is a printer object.

The PC object 201 has a PC figure object 201a and a self PC object 201b. The PC figure object 201a has a shape that is modeled on the PC 2. When a user views the PC figure object 201, he or she can intuitively understand that it is the PC 2. The self PC object 201b means that the PC figure object 201a corresponds to the client PC 2 that displays this layout. Because the self PC object 201b is displayed, the user can easily find the PC 2 that he or she is using from among the plurality of PC objects in the layout.

The client PC 2 stores its own index number. The display data creating portion 52i (see FIG. 12) can create display data for displaying the PC object 201 of the own PC 2 in a manner that includes the self PC object 201b, by referencing the contents of the device data 44 (see FIG. 11) and the index number of the PC 2.

The hub object 205 has a hub figure object 205a and a hub status object 205b. The hub figure object 205a has a shape that is modeled on a hub. When a user views the hub figure object 205a, he or she can intuitively understand that it is the hub.

The hub status object 205b shows the usage status of the ports. The hub status object 205b is displayed in a manner of (in use number of ports)/(total number of ports). In FIG. 24(a), 1/7 is displayed. This means that there are a total of 7 ports, and one of these is in use. A user can easily understand the usage status of the ports by viewing the hub status object 205b.

The display data creating portion 52i (see FIG. 12) can specify the usage status of the ports of each hub by referencing the contents of the device data 44 (see FIG. 11). The display data creating portion 52i can create display data for displaying the hub object 205 in a manner that includes the hub status object 205b.

The communication path object 203 is disposed between the PC figure object 201a and the hub object 205. The communication path object 207 is disposed between the hub object 205 and the printer figure object 209a.

The printer 3 that corresponds to the printer object 209 may input a print instruction output from the PC 2 corresponding to the PC object 201, and when the printer 3 is in the in-printing status, the printer object 209 will be displayed in the format of FIG. 24(a).

The printer object 209 has a printer figure object 209a, a self default status object 209b, and an in-printing status figure object 209c.

The in-printing status figure object 209c is the broken line displayed on the communication path objects 203, 207. In the present embodiment, an animation will be displayed such that the broken line will appear to flow in the direction of the arrows in the figure. In other words, an animation will be displayed which indicates that a print instruction is being transmitted from the PC 2 corresponding to the PC object 201 to the printer 3 corresponding to the printer object 209. A user can intuitively understand the PC 2 that output the print instruction, the transmission path of the print instruction, and the printer 3 into which the print instruction was input and performing printing.

When there is a printer in the process of printing, the index number of that printer will be associated therewith and stored together with the in-printing status in the device data 44 (see the printer of number S in FIG. 11). In addition, the index number of the PC 2 that output the print instruction will be stored in the device data 44 (the PC of number 3 in the example of FIG. 11). The display data creating portion 52i (see FIG. 12) can create display data for displaying the in-printing status figure object 209c by referencing the device data 44. In other words, the display data creating portion 52i can specify the PC 2 from which a print instruction was output and the printer 3 to which the print instruction will be input, and can display the in-printing status figure objects 209c along the communication path object therebetween.

In addition, FIG. 24(b) shows another example of the layout. Here, the points that differ from FIG. 24(a) will be described.

When the printer 3 that corresponds to the printer object 209 is in trouble status based on a print instruction output from the PC 2 corresponding to the PC object 201, the printer object 209 will be displayed in the format of FIG. 24(b).

The printer object 209 includes a communication trouble status figure object 209d and a remaining ink quantity object 209e.

The remaining ink quantity object 209e will indicate the remaining quantity of each ink with numerical values. A user can easily know the remaining quantity of each ink. The remaining ink quantity object 209e may be constantly displayed, or may not be constantly displayed. The display data creating portion 52i (see FIG. 12) can create display data for displaying the remaining ink quantity object 209e by referencing the contents of the device data 44 (see FIG. 11).

The communication trouble status figure object 209d includes the X symbols displayed on the communication path objects 203, 207. A user can intuitively understand the PC 2 output a print instruction, the transmission path of the print instruction, and the printer 3 that is in the trouble status (e.g., a paper jam state) based on the print instruction.

When the printer 3 that is in the trouble status is present, the trouble status will be associated with the index number of that printer 3 and stored. In addition, the index number of the PC 2 that output the print instruction will be stored in the device data 44. The display data creating portion 52i (see FIG. 12) can create display data for displaying the communication trouble status figure object 209d by referencing the device data 44. In other words, the display data creating portion 52i can specify the PC 2 from which the print instruction was output and the printer 3 to which the print instruction will be output, and can display the communication status figure object 209d along the communication path object therebetween.

Note that the in-printing status figure object 209c and the communication trouble status figure object 209d noted above are not limited to the display formats of the present embodiment. For example, the in-printing status figure object may be defined by arrows. In another example, the in-printing status figure object may be defined by coloring the communication path object with a color that is different than normal. In addition, the communication trouble status figure object may be defined by coloring the communication path object with a color that is different than normal (moreover, a color that is different from the in-printing status figure object).

FIG. 24(c) shows another example of the printer object. When the printer 3 is in sleep status, a printer object 211 of that printer 3 will be displayed as in FIG. 24(c). The printer object 211 has a printer figure object 211a and a sleep status figure object 211b.

The sleep status figure object 211b will display a figure such as "ZZZ" that means sleep. A user can intuitively understand that this is the sleep status when viewing the sleep status figure object 211b.

FIG. 24(*d*) shows another example of the printer object. When the printer 3 is in power off status, a printer object 213 of that printer 3 will be displayed as in FIG. 24(*d*). The printer object 213 has a printer figure object 213*a* and a power off status figure object 213*b*.

The power off status figure object 213*b* has the shape of a question mark. A user can intuitively understand that this is the power off status when viewing the power off status figure object 213*b*.

The display data creating portion 52*i* (see FIG. 12) can specify the printers 3 in the sleep status and power off status by referencing the device data 44 (see FIG. 11). The display data creating portion 52*i* can create display data for displaying the sleep status figure object 211*b* and the power off status figure object 213.

Figure 25:
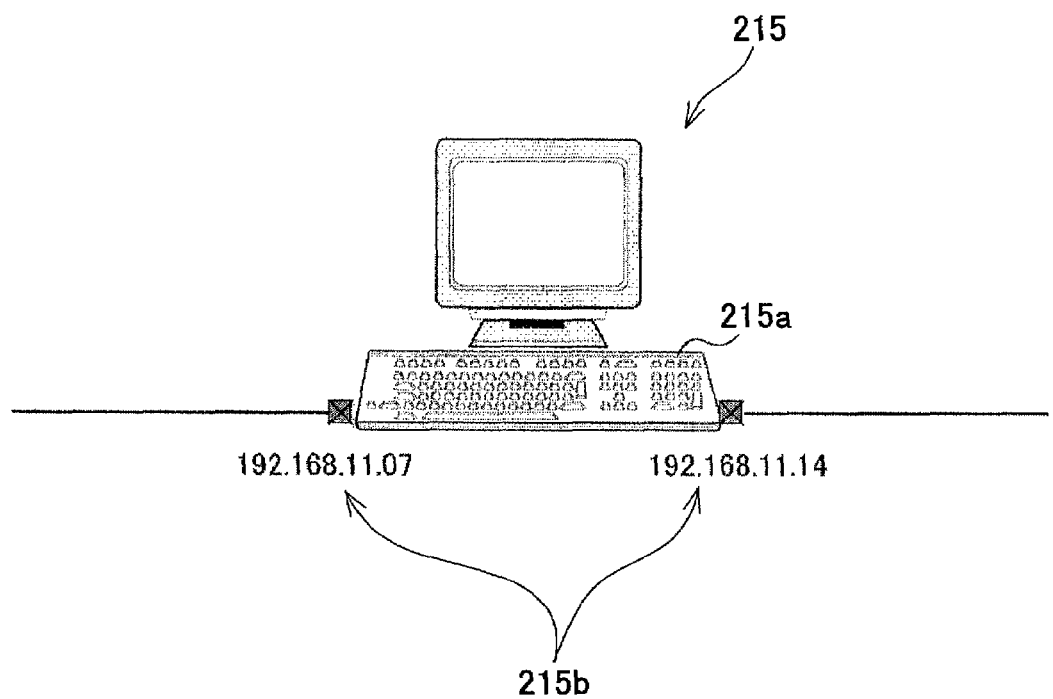
FIG. 25 shows an example of the display embodiment of a printer object.

FIG. 25 shows another example of the printer object. A printer object 215 of FIG. 25 is displayed when the client PC 2 comprises a plurality of network IFs 26 (see FIG. 2), and is connected to a plurality of devices.

The printer object 215 has a printer figure object 215*a* and IP address objects 215*b*. The IP address objects 215*b* display the IP addresses assigned to each of the plurality of network IFs 26. In FIG. 25, two IP addresses are displayed.

A user can easily understand that a plurality of devices is connected to the client PC 2 by viewing the IP address objects 215*b*.

As described above, the printer figure object, the PC figure object, and the hub figure object are modeled on the shape of each device. A user can easily identify any device by viewing these figure objects.

In addition, among each of the status figure objects noted above, there are those in which the status is defined with figures (the in-printing status figure object, the trouble status figure object, the sleep status figure object, the power off status figure object, and the like). A user can easily identify any status by viewing these status figure objects.

In the present embodiment, the display format of each device object when viewed from a plurality of positions will be prepared in advance. For example, the display format of the PC figure object of the PC 2*a* when viewed from 10 positions will be prepared. When the first angle and the second angle are to be set, the display format viewed from the closest position will be selected, and this will be displayed. In other words, when the view point from which the layout is viewed changes, the display format of the device object will change. Because the display format of the device object will change in response to the view point, the layout that is easy to understand can be achieved.

Note that a display format that is viewed from only one position may be prepared for each device object. In this case, even if the view point of the layout changes, the display format of the device object will not change. When this method is employed, the quantity of data for displaying the layout will be reduced.

In addition, the device object may be defined by polygons. In this case, the shape of the device when the view point has changed can be faithfully regenerated by performing calculations that take the first angle and second angle into consideration. When this method is employed, the device object can be realistically displayed.

Note that in the initial stage for forming the print network system 10, image data that represents each device object (hereinafter referred to as device object data) may be stored in any of the server PC 1, the client PC 2, and the printer 3. When the server PC 1 and the printer 3 have the aforementioned device object data, the device object data will be transmitted to the client PC 2. In this way, the client PC 2 can display each device object.

In the present embodiment, each device (printer, server PC, client PC) stores the device object data that is unique to that device. Each device will transmit own device object data to each client PC. In this way, each client PC can obtain the device object data of other devices. When a new device is installed in the system 10, the device object data will be sent from that device to each client PC. According to the present embodiment, the client PC can display the device object for each device.

In contrast, each device may not store the device object data. Any device in the system 10 may store the device object data for all of the devices. In this case, the client PC may acquire the device object data from a device that stores the device object data for all of the devices.

In addition, when a device that does not possess unique device object data is installed in the system 10, a device object that has a shape representing that device may be used.

Figure 26:
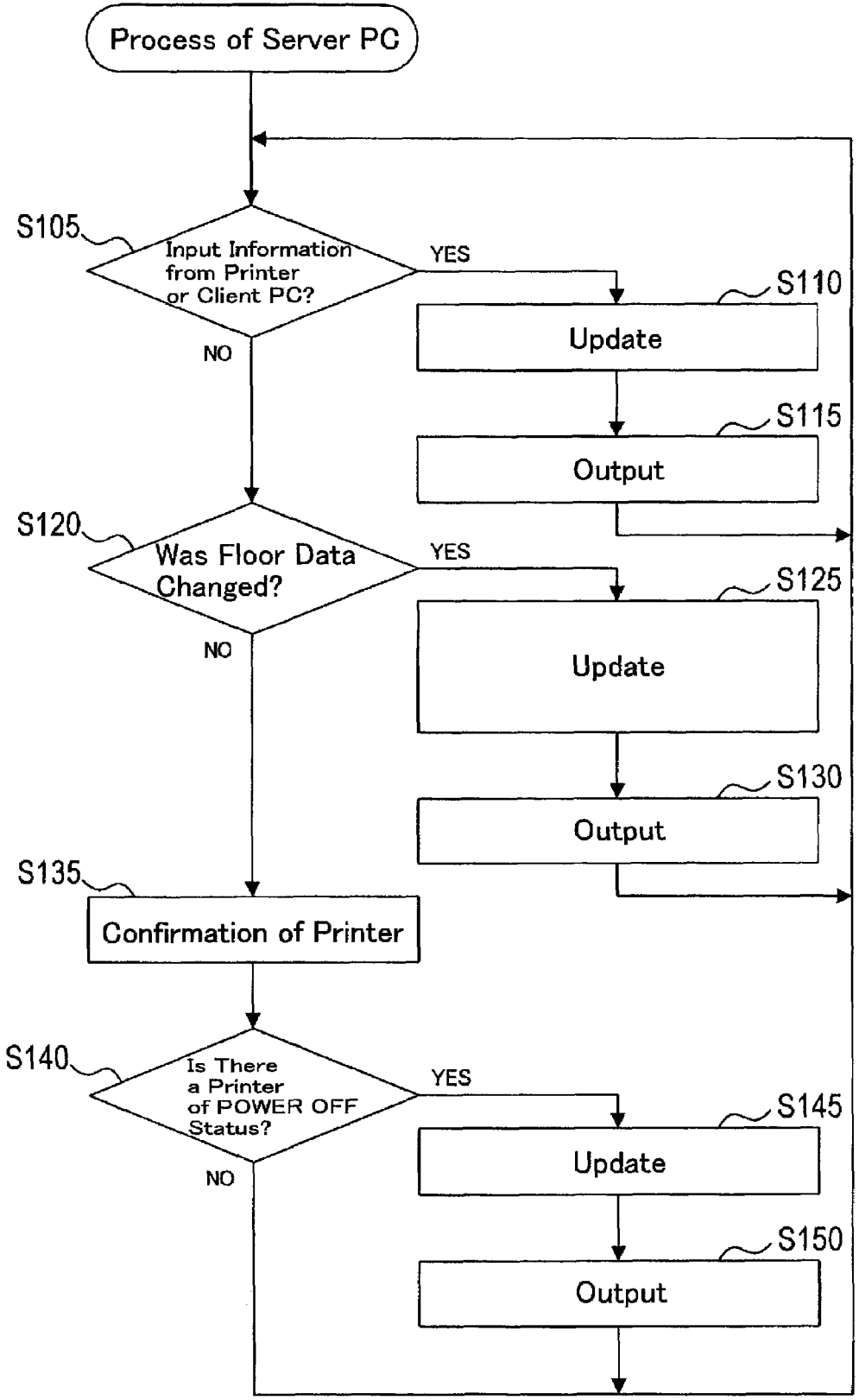
FIG. 26 shows a flowchart of a process executed by a server PC.

Next, details of the processes that each device executes will be described in detail. First, the process that the server PC 1 will execute will be described. FIG. 26 is a flowchart of the process that the server PC 1 will execute.

The server PC 1 will observe whether or not data output from the printer 3 or the client PC 2 was input.

(1) Data output from the printer 3 to the server PC 1 is described below.

(1-1) Data relating to the node name and the IP address set in the printer 3.

(1-2) Data relating to the status of the printer 3. When the status of the printer 3 has changed, the status after the change will be output.

(2) Data output from the client PC 2 to the server PC 1 is described below.

(2-1) Data relating to the node name and the IP address set in the client PC 2.

(2-2) Data indicating the print instructions output to the printer 3. (More specifically, the index number of the printer to which the print instruction was output)

(2-3) Data indicating that printing can be completed.

(2-4) Data relating to the index number of the default printer set in the client PC 2.

(2-5) Data relating to the index number of the temporary printer set in the client PC 2.

(2-6) Data relating to the connection relationship of the client PC 2.

(2-7) Data relating to the position of the client PC 2.

When the server PC 1 inputs data that was output from the printer 3 or the client PC 2 (when S105 is YES), the device data 44 (see FIG. 3) will be updated in accordance with the input data (S110). This process is executed by the updating portion 42*f* (see FIG. 4).

The updating portion 42*f* will update the contents of the status storage 42*d* when, for example, data relating to the status of the printer 3 after the change is input.

In addition, the updating portion 42*f* will update the contents of the status storage 42*d* when, for example, data relating to the index number of the printer 3 to which a print instruction was output is input. More specifically, a combination of the printer 3 to which the print instruction was output and the index number of the client PC 2 that output the print instruction is stored. In this way, like the printer 3 of number 5 in FIG. 11, the index number of the device that output the print instruction (the PC of number 3 in this example) will be stored.

Note that a user can input data relating to the position of the server PC 1, each client PC 2, and each printer 3 by using the operation device 14 (see FIG. 2). Even when these data are input, it will be determined that the answer is YES in S105, and the device data 44 will be updated. Although described below, data relating to the position of the client PC 2 may be sent from the client PC 2 to the server PC 1. Because of this, the user may not need to input data relating to the position of each client PC 2. However, the user must input data relating to the position of the server PC 1 and each printer 3 in the server PC 1.

When the device data 44 is updated in S110, the updated device data 44 will be output to each client PC 2 (S115). Each client PC 2 can obtain the latest device data 44.

The server PC 1 observes whether or not the production or modification of the floor data 45 (see FIG. 3) has occurred. A user can use the floor editor 43 (see FIG. 3) to produce or change the floor data 45. When the floor data 45 is updated by the user, it will be determined that the answer is YES in S120.

Figure 27:
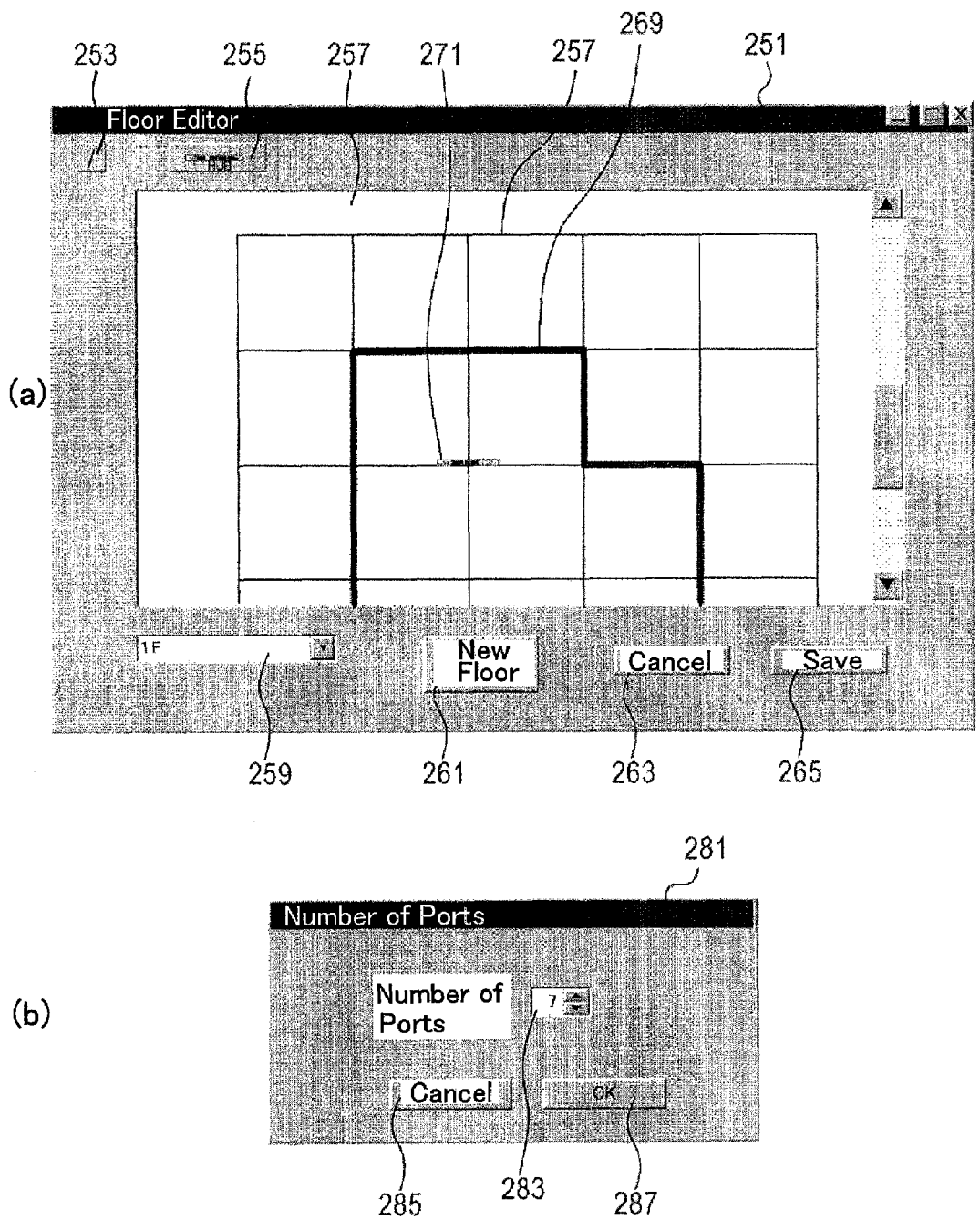
FIG. 27(a) shows an example of a screen that is displayed when using a floor editor.
FIG. 27(b) shows an example of a screen that is displayed when setting the number of ports.

FIG. 27(*a*) shows a floor editor window 251 that is displayed on the display device 15 of the server PC 1 (see FIG. 2) when the floor editor 43 is used. A line tool object 253, a hub addition object 255, an edit area 257, a floor selection box 259, a new floor addition object 261, a cancel object 263, a save object 265, and the like are arranged in the floor editor window 251.

The line tool object 253 is a switch that will turn a line drawing mode on and off. When the line drawing mode is in the on state, a user can draw a contour line 269 inside the edit area 257. This operation is executed by using the operation device 14. A user can draw the contour line 269 while viewing the grid 267. The area bound by the contour line 269 is the configuration of each floor. The coordinates of the corners of the contour lines are used as the floor data 45 (see FIG. 6).

A user can click on the hub addition object 255 when he or she wants to add data of the hub to the device data 44. When the hub addition object 255 is clicked, the hub object 271 will be added to the edit area 257. The user can use the operation device 14 to move the hub object 271. In this way, new hub data (the index number and position) will be added to the device data 44.

When the hub object 271 is moved outside the contour line 269, the hub object 271 will be deleted.

FIG. 27(*b*) is a window 281 for setting the port number of the new hub object 271. When the hub object 271 is double clicked, the window 281 will be displayed. A port number selection box 283, a cancel object 285, an OK object 287, and the like are arranged in the window 281. When a number is input into the port number selection box 283, and the OK object 287 is clicked, the port number will be set.

The floor selection box 259 of FIG. 27(*a*) is a box for selecting the floor that will be subject to editing. A user will click on the new floor addition object 261 when he or she wants to edit a floor that is not displayed in the floor selection box 259. In this way, a new floor can be edited.

A user will click the save object 265 when the editing of the floor configuration or the addition or deletion of the hub has been completed. In this way, data relating to the floor configuration and the hub can be updated (S125 of FIG. 26). In other words, the floor data 45 and the device data 44 can be updated. This process is executed by the updating portion 42*f* (FIG. 4).

The updated data (the floor data 45 and the device data 44) is output to each client PC 2 (S130). In this way, each client PC 2 can obtain the latest floor data 45 and device data 44.

Note that when the cancel object 263 of FIG. 27(*a*) is clicked, the updates to the data relating to the floor configuration and the hub will be cancelled.

When the answer is NO in S 120, a confirmation process for each printer 3 will be executed (S135). More specifically, it will be confirmed whether or not each printer 3 is in the power off status.

The server PC 1 will output ICMP echo packets to each printer 3 included in the device data 44 by means of unicast. In other words, a so-called PING (packet internet grouper) will be used here. When an ICMP echo packet is input to a printer 3 that is in the power on status, the printer 3 will output a response signal to the server PC 1. A printer 3 in the power off status will not output a response signal to the server PC 1. The server PC 1 can specify the printers 3 that are in the power on status and the printers 3 in the power off status.

As noted above, a method of requesting a response from each printer 3 by means of the unicast is used in the present embodiment. Other methods include requesting a response from each printer 3 by means of broadcast. This method may be employed. However, when a router is provided in the system 10, the use of the unicast is preferred.

When there is a printer 3 in the power off status (when the answer in S140 is YES), the server PC 1 will update the status of the printer 3 to the power off status (S145). In this way, the device data 44 will be updated. This process is executed by the updating portion 42*f* (FIG. 4). The updated device data 44 is output to each client PC 2 (S150).

Note that when the answer in S140 is NO, the process will return to S105.

The server PC 1 will repeatedly execute the process of S105 to S150. As a result, the latest device data 44 and floor data 45 will be produced in the server PC 1. Because the latest data is output to the client PCs 2, each client PC 2 can obtain the latest data.

Figure 28:
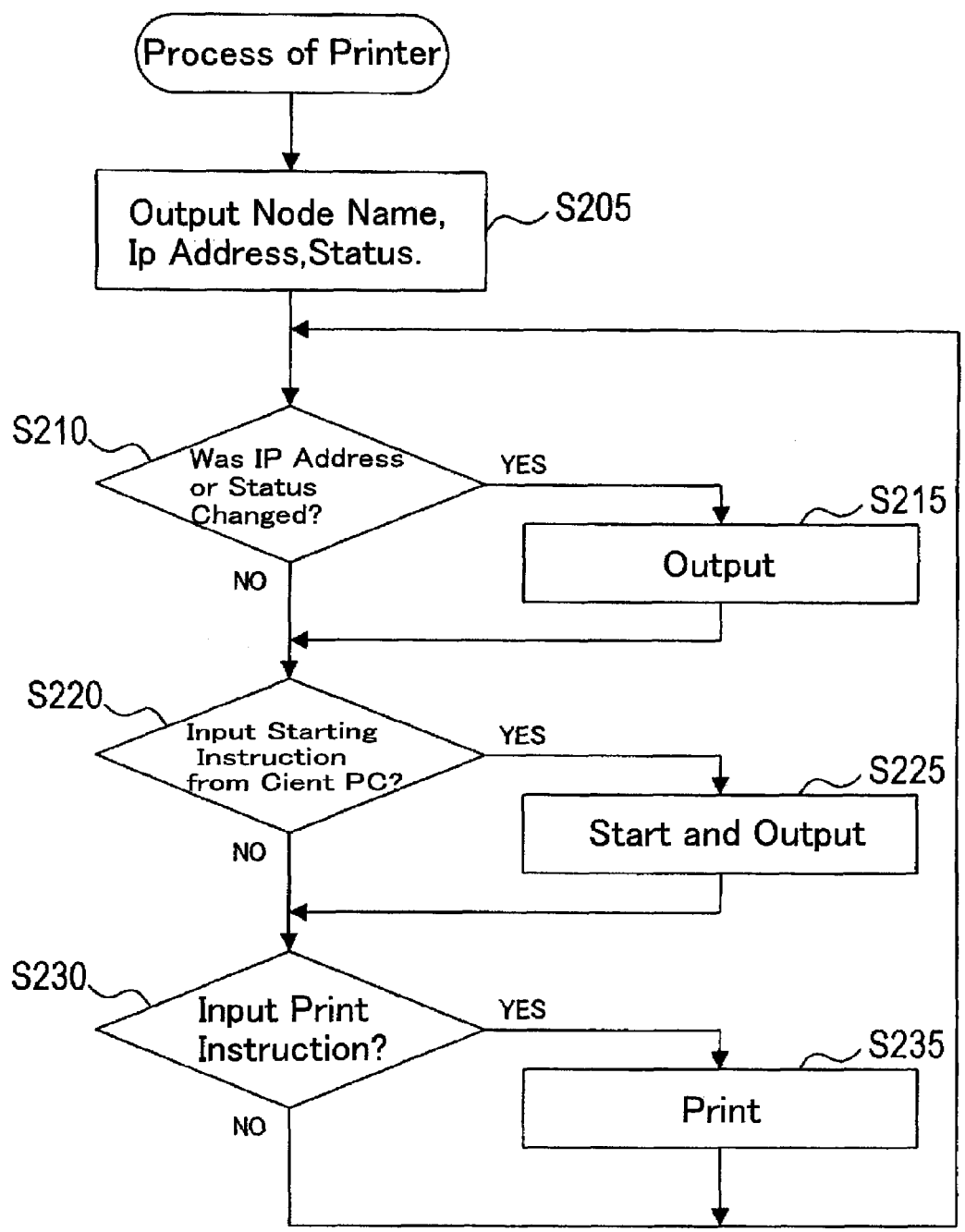
FIG. 28 shows a flowchart of a process executed by a printer.

Next, the process executed by the printer 3 will be described. This process will be executed by the print control portion 62 of FIG. 3. FIG. 28 is a flowchart of the process that the printer 3 will execute.

When the printer 3 goes from the power off status to the power on status, the node name, the IP address, and the status of the printer 3 will be output to the server PC 1 (S205). The data that is output here is used in the process of S110 in FIG. 26 noted above.

The printer 3 observes whether or not there are any changes in its IP address or status (S210). When there are changes in the IP address or status (when S210 is YES), the IP address or the status after the change (ready status, sleep status, remaining quantity of ink) will be output to the server PC 1 (S215). The data that is output here is also used in the process of S110 in FIG. 26 noted above.

The printer 3 will observe whether or not a start instruction output from the client PC 2 was input (S220). Under what circumstances the client PC 2 will output the start instruction will be described below. When the start instruction is input to the printer 3 (the answer in S220 is YES), the sleep status will be cancelled, and the printer 3 will be started (S225). The printer 3 will shift to the ready status. In the process of S225, data indicating that the printer 3 has shifted to the ready status will be output to the server PC 1. The data that is output here is also used in the process of S110 in FIG. 26 as noted above.

The start operation of the printer 3 will differ according to the printing method of the printer 3. For example, with a laser printer, the warm-up process and the like corresponds to the start operation. In another example, with an ink jet printer, the purge process and the like corresponds to the start operation.

The printer 3 will observe whether or not a print instruction has been input (S230). The print instruction includes data (print data) needed for printing. The print data is produced by the application portion 54 of the client PC 2 (see FIG. 3). The print data produced will be output to the printer 3 by the functions of the printing processor 53 and the spooler 55.

When the print instruction has been input to the printer 3 (the answer in S230 is YES), printing will be executed based on the input print data (S235). Note that when the printer 3 cannot execute printing due to a problem prior to printing or during printing (a paper jam, insufficient ink, and the like), the printer 3 will move to trouble status. In this case, the printer 3 will output the fact that the printer 3 is in trouble status to the client PC 2 that output the print instruction.

The printer 3 will repeatedly execute the process of S210 to S235 noted above. As a result, the printer 3 will output the latest data to the server PC 1 each time that data relating to the printer 3 has been changed. The server PC 1 can update the device data 44 by inputting the data output from the printer 3. Next, the processes executed by the client PC 2 will be described. The client PC 2 will execute a variety of processes. Each process will be sequentially described below.

Figure 29:
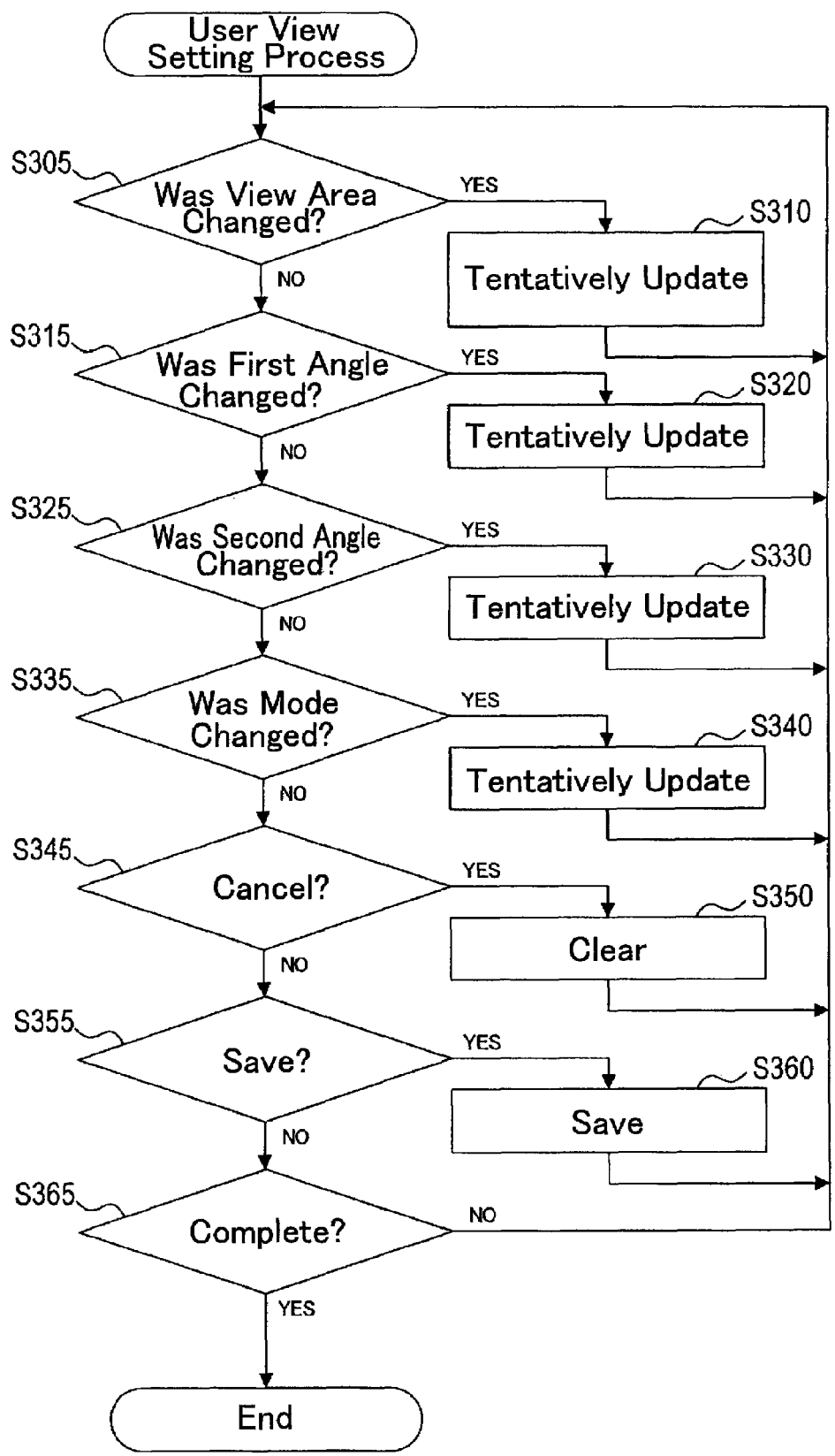
FIG. 29 shows a flowchart of a user view setting process executed by a client PC.

First, the user view setting process that is executed by the client PC 2 will be described. FIG. 29 shows a flowchart of the user view setting process.

A user can use a user view editor that is one of the functions of the display information control portion 52 (see FIG. 3). When the user view editor is to be used, the user view setting process will be executed.

Figure 30:
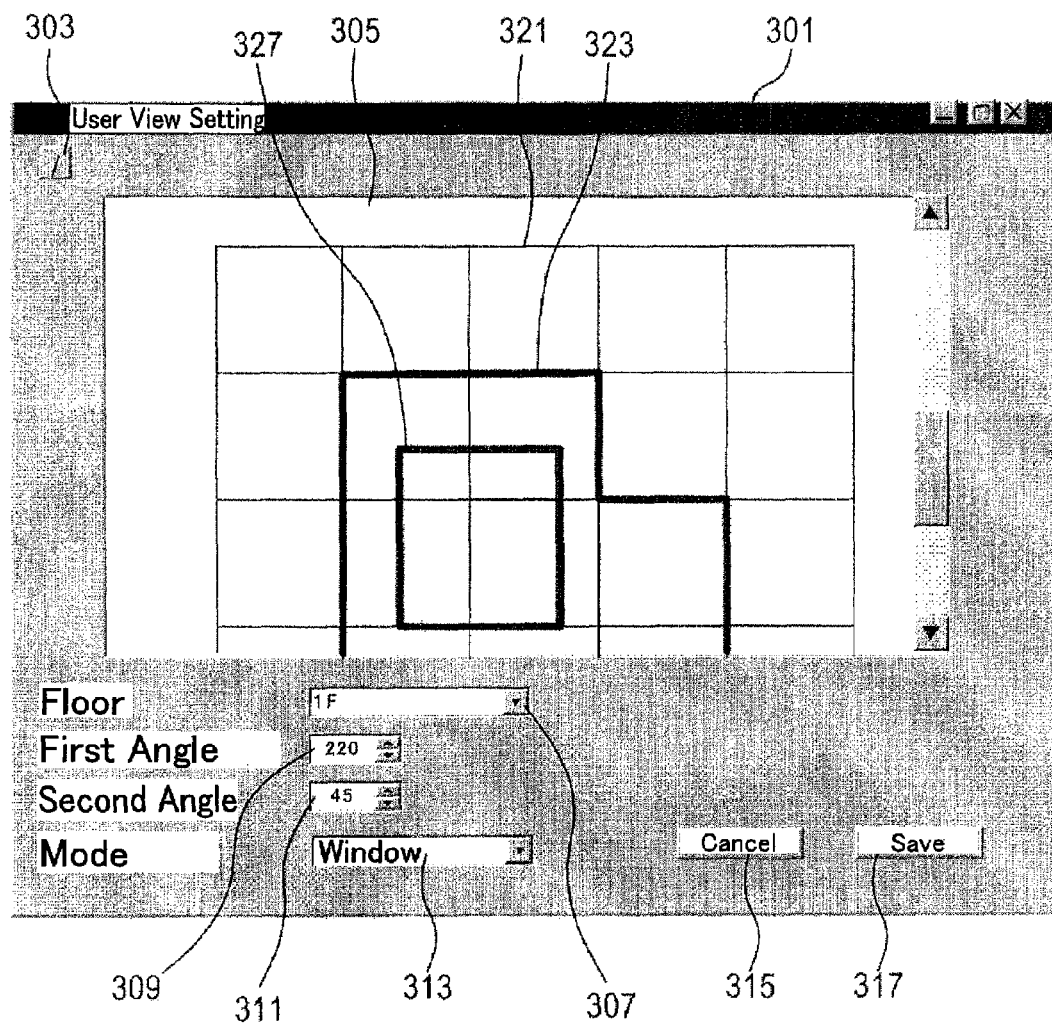
FIG. 30 shows an example of a screen that is displayed when using a user view editor.

FIG. 30 shows a window 301 that is displayed on the display device 25 of the client PC 2 (see FIG. 2), when the user view editor is to be utilized. A line tool object 303, a edit area 305, a floor selection box 307, a first angle input box 309, a second angle input box 311, a mode selection box 313, a cancel object 315, a save object 317, and the like are arranged in the window 301.

The line tool object 303 is a switch that will turn a mode that draws a contour line of the view area (the display areas 165a to 165c illustrated in FIG. 19(b)) on and off. When the mode is in the on status, a user can draw the contour line 327 inside the edit area 305. The user can draw the contour line 327 by using the operation device 24 (see FIG. 2) to execute click operations. When this occurs, a grid 321 and a floor configuration 323 can be utilized.

Note that the floor configuration 323 will be displayed based on the floor data 45 input from the server PC 1. The floor data 45 will be produced by the user using the floor editor 43 (see FIG. 3).

The floor selection box 307 is an input box for selecting the floor on which the view area is to be set.

The first angle input box 309 is an input box for inputting the first angle noted above (see FIG. 15(b)).

The second angle input box 311 is an input box for inputting the second angle noted above (see FIG. 15(c)).

The mode selection box 313 is an input box for inputting the modes noted above (see FIGS. 15(a), and FIGS. 16 to 18).

Returning to FIG. 29, the process that is executed by the client PC 2 will be described. The client PC 2 observes whether or not the view area in the window 301 has changed (S305). When it is determined that the answer here is YES, the client PC 2 will tentatively update the view area in accordance with the results of the user view editor (S310). "Tentatively update" means that the updated content will be stored in a temporary buffer in a manner that the proper update of the data has been deferred, and the display inside the window 301 will be updated.

The client PC 2 observes whether or not the first angle in the window 301 has changed (S315). When it is determined that the answer is YES, the client PC 2 will tentatively update the first angle (S320).

The client PC 2 observes whether or not the second angle in the window 301 has changed (S325). When it is determined that the answer is YES, the client PC 2 will tentatively update the second angle (S330).

The client PC 2 observes whether or not the mode in the window 301 has changed (S335). When it is determined that the answer is YES, the client PC 2 will tentatively update the mode (S340).

The client PC 2 observes whether or not the cancel object 315 in the window 301 has been clicked (S345). When it is determined that the answer is YES, the client PC 2 will clear the contents of the temporary buffer (S350). In this way, each data input in the window 301 will return to the initial state.

The client PC 2 observes whether or not the save object 317 in the window 301 has been clicked (S355). When it is determined that the answer is YES, the client PC 2 will save the contents of the temporary buffer (S360). In this way, the contents of the display data storage 52h of FIG. 12 will be updated.

The client PC 2 observes whether or not an operation indicating completion has been performed in window 301 (e.g., a click operation on the cross button in the upper right corner of the window 301) (S365). When it is determined that the answer is YES, the user view setting process will end. Further, when it is determined that the answer is NO, the process will return to S305.

When the user view setting process is to be executed, the data in the client PC 2 will be updated. However, the data updated in this process is data that an individual client PC 2 uses, and will not be output to the server PC 1 or to other client PCs 2.

Figure 31:
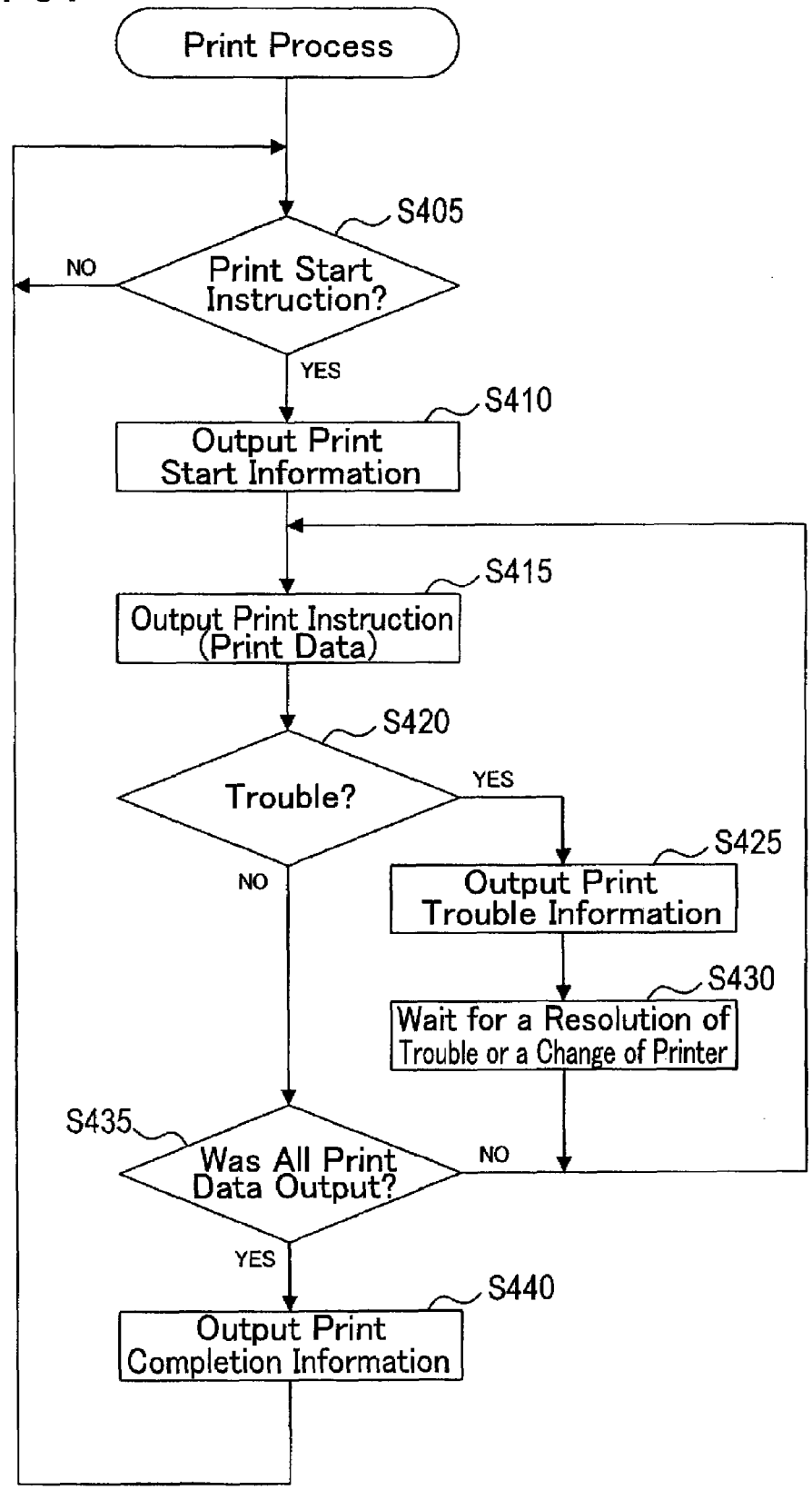
FIG. 31 shows a flowchart of a print process executed by the client PC.

Next, the print process executed by the client PC 2 will be described. FIG. 31 shows a flowchart of the print process. The print process is executed by the printing processor 53 shown in FIG. 3.

The printing processor 53 observes whether or not a print start instruction output from the spooler 55 (see FIG. 3) has been input (S405). When the answer is determined to be YES, the printing processor 53 will output data (print start information) that indicates that printing has been initiated to the display information control portion 52 (S410). The print start information is received by the display information control portion 52 during a process described below.

When S410 is completed, the printing processor 53 will read out the print data from the spooler 55, and will output a print instruction (print data) to the printer 3 that is to receive it. The printing processor 53 stores information concerning the printer 3 to which the print data will be output (in other words, the default printer). Normally, the printing processor 53 will output the print instruction to the default printer set in the client PC 2. However, when the printer 3 other than the default printer is set by a user, the printing processor 53 will output the print instruction to the printer 3 that was set.

The printing processor 53 will observe whether or not trouble has occurred after the print instruction was output. In other words, the printing processor 53 will observe whether or not there is a reason why printing cannot be executed in the printer 3 to which the print instruction was output (a paper jam, insufficient ink, etc.). When the printer 3 shifts to trouble status, data indicating that the printer 3 has shifted to trouble status will be output to the client PC 2 that output the print instruction. The printing processor 53 will execute the determination of S420 by observing whether or not this data was input.

When it is determined that the answer to the question in S420 is YES, the printing processor 53 will output the print trouble information to the display information control portion 52 (S425). The print trouble information is used by the display information control portion 52 during a process described below. The printing processor 53 will wait for the trouble to be eliminated (S430). When the trouble is eliminated, the process will return to S415. In addition, a user can change the printer 3 that will execute the printing when printing trouble has occurred. In other words, the user can set the printer 3 other than the default printer as a temporary printer. In this situation, returning to S415, the print instruction will be output to the temporary printer.

When it is determined that the answer is NO in the process of S420, the printing processor 53 will determine whether or not all print data has been read out from the spooler 55 (S435). When there is unprocessed print data remaining in the spooler 55 (When S435 is NO), the flow will return to S415, and the output of the print data will continue.

In contrast, when it is determined that the answer to the question in S435 is YES, the printing processor 53 will output print completion information to the display information control portion 52 (S440). The print completion information is used by the display information control portion 52 during a process described below.

By executing the printing process noted above, the print data will be processed, and various type of information will be output to the display information control portion 52. The display information control portion 52 will use this information to execute the processes. This point will be described below.

Next, the display process executed by the client PC 2 will be described. FIGS. 32 to 35 show flowcharts of the display process. The display process is executed by the display information control portion 52. In the present embodiment, the display process will always be executed while the client PC 2 operates. However, the display process need not always be executed. The display process may be executed in response to a call from a user operation or another application.

When the client PC 2 operates, the display information control portion 52 will request the device data 44 and the floor data 45 from the server PC 1. Although not shown in FIG. 26 noted above, the server PC 1 will output the device data 44 and the floor data 45 to the client PC 2 in response to this request.

The display information control portion 52 will input the device data 44 and the floor data 45 that is output from the server PC 1 (S510).

Next, the display information control portion 52 will execute a layout display process (S515). Detailed information on the layout display process will be described below. Due to the process of S515, the content of the display area 107 of the layout window 103 (see FIG. 13) will be updated to the latest status.

The display information control portion 52 observes whether or not the device data 44 or the floor data 45 that was output from the sever PC 1 was input (S520). The server PC 1 will output this data to the client PC 2 when there has been a change in the device data 44 or the floor data 45 (see S115, S130, S150 of FIG. 26). In the process of S520, it will be determined whether or not the data output from the server PC 1 was input.

When it is determined that the answer is YES in S520, the process will return to S515. In this way, the display content of the layout window 103 will be updated to the latest status.

When it is determined that the answer is NO in S520, the display information control portion 52 will determine whether or not the data of the client PC 2 itself is included in the device data 44. When it is determined that the answer is NO, the display information control portion 52 will output the node name, the IP address, and the default printer of the client PC 2 to the server PC 1 (S530). A user can set the node name, the IP address, and the default printer in the client PC 2. This data will be output to the server PC 1. The server PC 1 will update the device data 44 based on the data that was output (see S110 of FIG. 26 noted above).

Note that in the process of S530, data on the position and the connection relationship of the client PC 2 will not be output. Because of this, the PC object of this client PC 2 will not be displayed in a position on the floor object 111, 113 in the layout 100 (see FIG. 13) until the user sets the position and connection relationship. For example, the PC object will be displayed like the PC object 119 of FIG. 13.

When it is determined that the answer is YES in S525, the process will proceed to S535. In S535, the display information control portion 52 will determine whether or not a communication path has been added. A user can click the addition operation icon 136 of the layout window 103 (see FIG. 13) to place the addition mode in the on state. In this state, when two device objects are clicked in sequence (e.g., the PC object 119 and the hub object 127), it will be determined that the answer is YES in S535. When this operation is not performed, it will be determined that the answer is NO in S535. When it is determined that the answer is YES in S535, the process will proceed to S540. In contrast, when it is determined that the answer in S535 is NO, the process will proceed to S565 in FIG. 33.

When the answer is YES in S535, the display information control portion 52 will determine whether or not the hub object has been clicked in S535 (S540). The process of S540 will be YES when the position in which the click was performed matches the position of the hub in the device data 44.

When the answer is YES in S540, the display information control portion 52 will determine whether or not the hub clicked in S535 has an empty port (S545). This process will be executed by the determination device 52g of FIG. 12 noted above. The determination device 52g will execute the process of S545 by referring to the device data 44.

Figure 36:
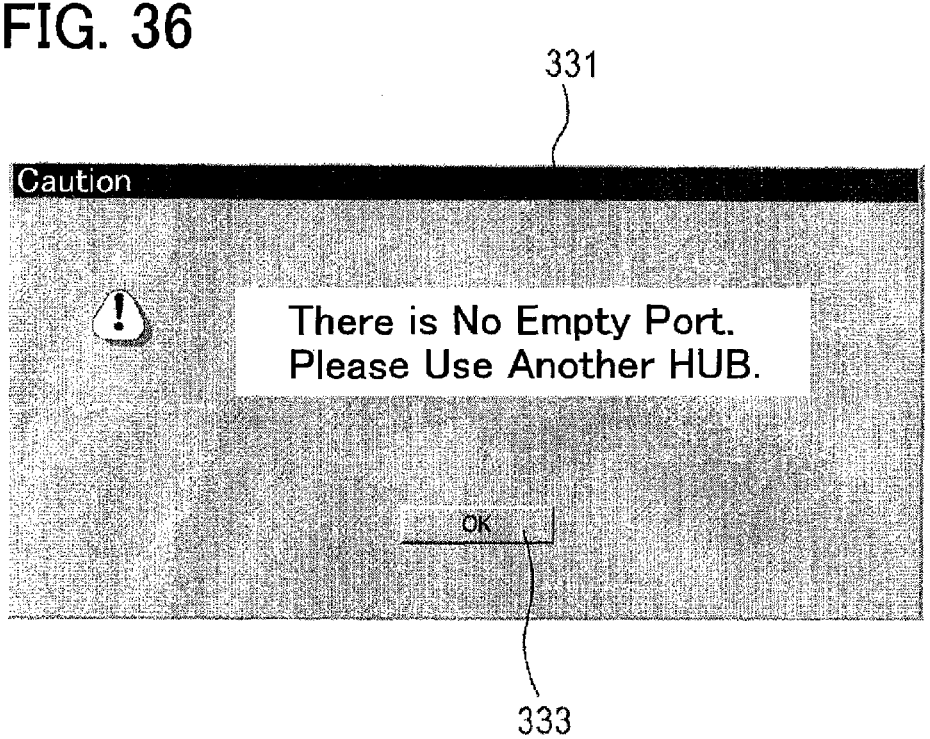
FIG. 36 shows an example of a caution display related to a HUB.

When there is no empty port in the hub (when S545 is YES), the display information control portion 52 will display a caution window on the display device 25 (see FIG. 2) (S550). This process will also be performed by the determination device 52g. FIG. 36 shows an example of a caution window 331. The caution window 331 will be eliminated when the OK object 333 is clicked.

In contrast, when the hub does have an empty port (when S545 is NO), the display information control portion 52 will update the device data 44 (S555). In other words, the number of ports in the hub that was clicked in S535 will be incremented by one.

When the processes of S540 to S555 are executed, the process will proceed to S560. In S560, the display information control portion 52 will add a communication path object to the layout window 103. More specifically, the communication path object was disposed between the two device objects that were clicked in S535. For example, when the PC object 119 and the hub object 127 of FIG. 13 are clicked in S535, the communication path object will be disposed between the PC object 119 and the hub object 127. In addition, the display information control portion 52 will update the device data 44 in S560. More particularly, the content of the connection relationship storage 52*e* (see FIG. 12) will be updated. In the case of the aforementioned example, the connection relationship of the PC object 119 will be updated. The update process will be executed by the updating portion 52*i*. The display information control portion 52 will output the updated data (data related to the connection relationship) to the server PC 1. This data is used in the process of S110 in FIG. 26 noted above.

Note that in the process of S535 noted above, it is preferable that the answer be determined to be YES, only when the PC object of the own client PC 2 (the client PC 2 showing this layout) is clicked. When this is done, a user will be prevented from unilaterally changing the connection relationship of client PCs belonging to another user. In addition, the user will be prevented from unilaterally changing the connection relationship of the printer.

Figure 33:
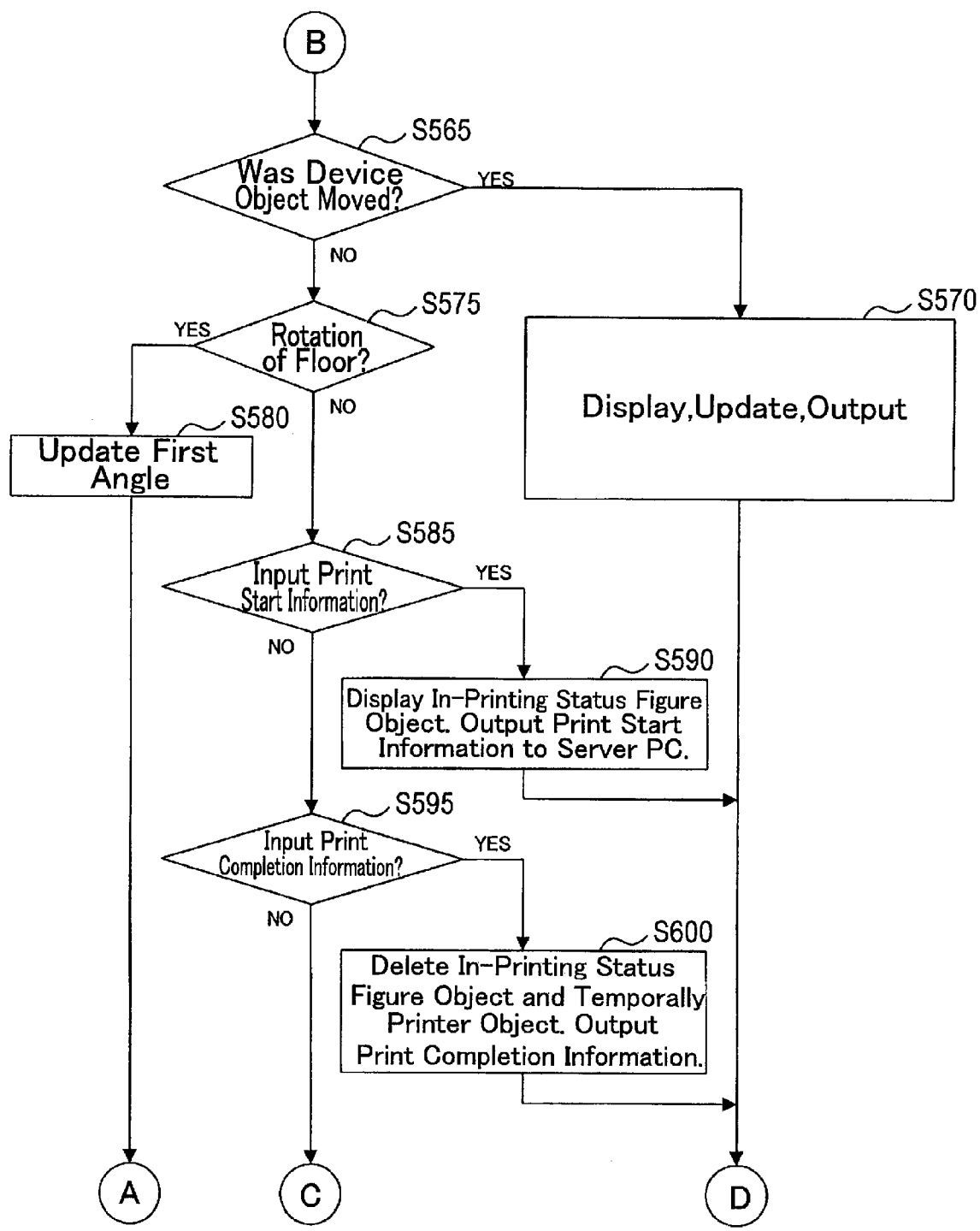
FIG. 33 shows a flowchart of the display process executed by the client PC (continuation B of FIG. 32).
Figure 37:
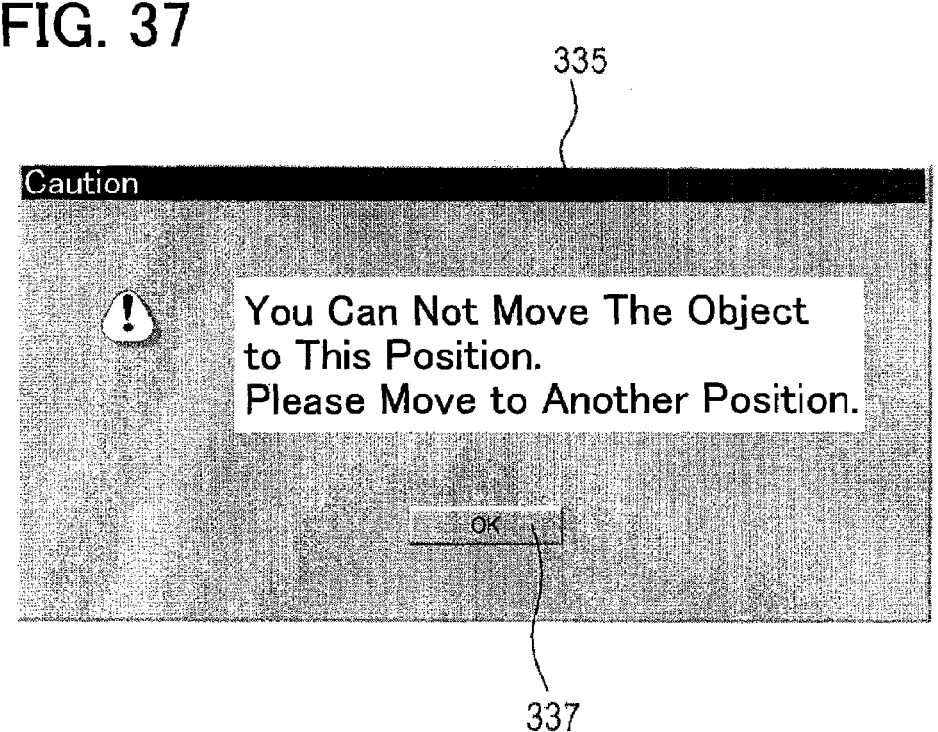
FIG. 37 shows an example of a caution display related to the movement of a device.

In contrast, when it is determined that the answer in S535 is NO, the process will proceed to S565 in FIG. 33. In S565, the display information control portion 52 will determine whether or not a device object has been moved. A user can move the device object. For example, the user can move the PC object 119 of FIG. 13 to a position on the floor objects 113, 117. The user cannot move the device object to a position in which another device object is disposed. In this case, a caution window shown in FIG. 37 will be displayed. The caution window 335 will be deleted when the OK object 337 in the window 335 is clicked.

When S565 is YES, the display information control portion 52 will display a layout in which the device object is disposed in the post-movement location. The display information control portion 52 will also move the communication path object in accordance with the movement of the device object. Note that when the device object is moved to a floor that has not yet been displayed, a new floor will be displayed. Furthermore, the display information control portion 52 will update the device data 44. More particularly, the content of the position storage 52*c* of FIG. 12 will be updated. The post-movement position of the device object will be stored in the position storage 52*c*. The update process will be executed by the updating portion 52*i*. The display information control portion 52 will output the updated data (data related to the position of the device) to the server PC 1. This data is used in the process of S110 in FIG. 26 as noted above.

Note that in the process of S565 noted above, it is preferable that the answer be determined to be YES only when the PC object of the own client PC 2 (the client PC2 showing this layout) is clicked. When this is done, a user will be prevented from unilaterally changing the position of a client PCs belonging to another user. In addition, the user will be prevented from unilaterally changing the position of the printer.

When the process of S570 is to be executed, the device object will be moved to a position intended by a user. In addition, the communication path object will be moved in accordance with the movement of the device object. The communication path object may be defined by several straight lines, like the communication path object 133 of FIG. 13. A curved position of the communication path object is preferably determined by considering the position of the device objects and the positions of other communication path objects. In particular, it is preferable that a plurality of communication path objects is not placed on the same straight line. In addition, the communication path object is preferably disposed so as to be as short as possible. This drawing method is widely used in draw software and the like, and thus a detailed description thereof will be omitted.

Note that in the present embodiment, when a user moves the device object a large distance in the Z direction (the direction in which a plurality of floors overlap), it will be determined that the device object has been moved to a separate new floor. In this case, the floor object of the new floor will be displayed. For example, the floor object 113 of FIG. 13 is newly displayed because the device object 117 prior to movement was moved a large distance in the Z direction.

When the answer in S565 in FIG. 33 is NO, the display information control portion 52 will determine whether or not an operation that rotates the floor has been performed. A user can use the operation device 24 (see FIG. 2) to rotate a floor object. When an operation that rotates a floor object is performed (e.g., a drag operation with respect to the floor object), it is determined that the answer in S575 is YES. In this case, the display information control portion 52 will update the first angle noted above (see FIG. 15(*b*)) (S580). This process is performed by means of updating portion 52*f* (see FIG. 12) updating the content of the display data storage 52*h*. When S580 is completed, the process will return to S515.

Note that in the process of S580, the first angle will increase or decrease in response to the amount and direction that the floor object is dragged. In this way, the layout will be displayed in which the floor object revolves around the Z axis. A user can view each object revolving around the Z axis by means of a drag operation with respect to the floor object.

In contrast, when the answer is NO in S575, the display information control portion 52 will determine whether or not print start information output from the printing processor 53 has been input (S585). The print start information is data that was output in S410 of FIG. 31 noted above. When the answer is YES in S585, the display information control portion 52 will display the in-printing status figure objects 209*c* (see FIG. 24(*a*)) (S590). More particularly, the in-printing status figure objects 209*c* will be displayed on the communication path objects (e.g., 203, 207) that are disposed between the PC object of the own client PC 2 (e.g., 201*a*) and the printer figure object of the printer 3 to which the print instruction will be output (e.g., 209*a*).

In S590, the following process will also be performed. In other words, the display information control portion 52 will output information indicating the print instruction output to the printer 3 to the server PC 1 (also referred to as print start information). More specifically, the display information control portion 52 will output the index number of the printer 3 to which the print instruction will be output. The server PC 1 can specify both of the client PC 2 that output the print instruction and the printer 3 to which the print instruction is output. In this way, the server PC 1 can update the device data 44 in the process of S110 in FIG. 26 noted above.

When the process of S590 is completed, the process will return to S520 of FIG. 32.

In contrast, when the answer is NO in S585, the display information control portion 52 will determine whether or not print completion information output from the printing processor 53 has been input (S595). When the answer is YES here, the display information control portion 52 will delete the in-printing status figure object 209*c* that are displayed in S590 and then re-display the layout (S600). Furthermore, the display information control portion 52 will delete the self temporary printer object (e.g., reference numeral 177 of FIG. 20(*c*)) that is displayed on the layout and then re-display the layout (S600).

In S600, the following process will also be performed. In other words, the display information control portion 52 will output information (also referred to as print completion data) concerning that printing has completed to the server PC 1. In this way, the server PC 1 can update the device data 44 in the process of S110 in FIG. 26 noted above.

When the process of S600 is completed, the process will return to S520 of FIG. 32.

Figure 34:
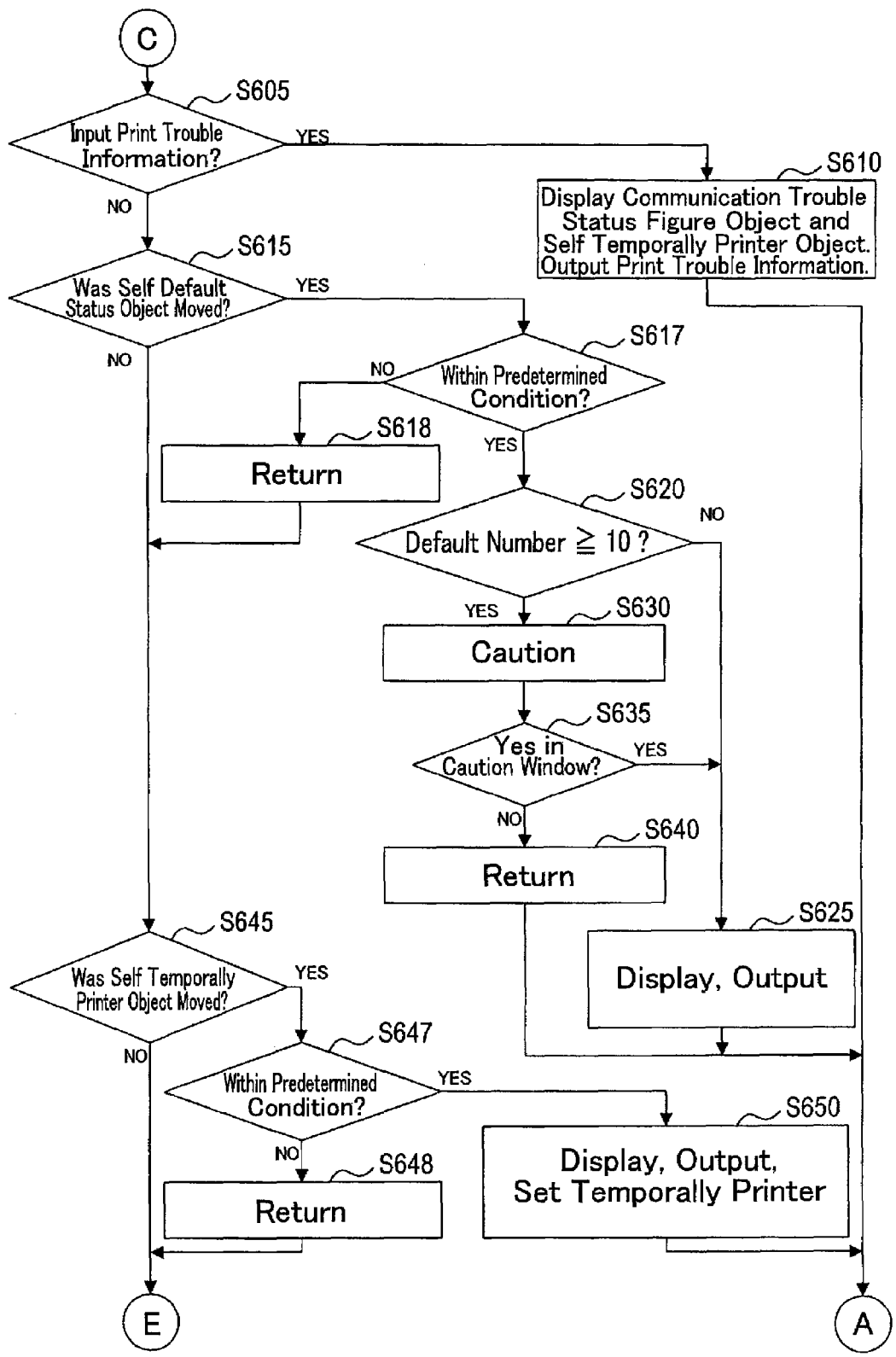
FIG. 34 shows a flowchart of the display process executed by the client PC (continuation C of FIG. 33).

In addition, when it is determined that the answer in S595 is NO, the process will proceed to S605 in FIG. 34.

In S605, the display information control portion 52 will determine whether or not print trouble information output from the printing processor 53 was input (S605). When the answer is YES, the display information control portion 52 will display the communication trouble status figure object 209*d* (see FIG. 24(*b*)) (S610). More particularly, the communication trouble status figure objects 209*d* will be displayed on the communication path objects (e.g., 203, 207) that are disposed between the PC object of the own client PC 2 (e.g., 201*a*) and the printer figure object of the printer 3 to which the print instruction will be output (e.g., 209*a*). In S610, the self temporary printer object (e.g., reference numeral 177 of FIG. 20(*c*)) will be displayed. The self temporary printer object will be displayed below the printer figure object of the printer 3 in which trouble has occurred.

In S610, the following process will also be performed. In other words, the display information control portion 52 will output information (also referred to as print communication trouble information) concerning that the communication trouble has occurred to the server PC 1. In this way, the server PC 1 can update the device data 44 in the process of S110, in FIG. 26 noted above.

When the process of S610 is completed, the process will return to S515 of FIG. 32.

When the answer is NO in S605, the display information control portion 52 will determine whether or not an operation that moves the self default status object (reference numeral 173 of FIG. 20) has been executed. When the answer here is YES, it will be determined whether or not the post-movement position satisfies predetermined conditions. An example of the process of S617 is provided below.

FIG. 38(*a*) serves to describe an example of the process of S617. The printer object 171 has an area 171*a* in which nothing is displayed, and an object display region 171*b* that is disposed inside the area 171*a*. The self default status object 173 has an area 173*a* in which nothing is displayed, and an object display region 173*b* that is disposed inside the area 173*a*. In S617, when at least a portion of the area 173*a* overlaps with the area 171*a* (the state in FIG. 38(*a*)), the answer may be determined to be YES.

FIG. 38(*b*) serves to describe another example of the process of S617. In S617, when at least a portion of the area 173*b* overlaps with the object display area 171*b*, the answer may be determined to be YES. Or, in S617, when at least a portion of the object display area 173*b* overlaps with the area 171*a*, the answer may be determined to be YES. In FIG. 38(*b*), these two conditions are simultaneously satisfied. If one of the conditions is satisfied, the answer may be determined to be YES in S617. Or, when the two conditions are simultaneously fulfilled, the answer may be determined to be YES in S617.

In addition, in S617, when at least a portion of the object display area 173*b* overlaps with the object display area 171*b*, the answer may be determined to be YES.

FIG. 38(*c*) serves to describe another example of the process of S617. In S617, when a distance D between the self default status object 173 and the printer object 171 after movement is equal to or less than a predetermined value, the answer may be determined to be YES. The distance D may be the distance between the center of the object 171 and the center of the object 173, or may be a gap between the object 171 and the object 173.

In S617, any of the conditions noted above can be adopted. When the answer is NO in S617, the display information control portion 52 will return the self default status object to the original position (S618).

Note that when it is determined that the setting of the default printer will be eliminated in accordance with the movement of the self default status object 173, the opposite method as that in S617 can be used.

For example, when a state in which the area 173*a* (FIG. 38(*a*)) is overlapped with the area 171*a* is eliminated, it may be determined that the setting of the default printer has been deleted.

In addition, when a state in which the area 173*a* is overlapped with the object display area 171*b* is eliminated, it may be determined that the setting of the default printer has been deleted.

Furthermore, when a state in which the object display area 173*b* is overlapped with the area 171*a* is eliminated, it may be determined that the setting of the default printer has been deleted.

In addition, when the distance D (see FIG. 38(*c*) has exceeded a predetermined value, it may be determined that the setting of the default printer has been deleted.

If the determination is based on these conditions, the setting of the default printer will not be deleted, even when the self default status object 173 is moved slightly due to an operation error by a user. The occurrence of an unintentional deletion of a setting by the user can be prevented.

In contrast, when S617 is YES, the display information control portion 52 will determine whether or not the default number of the printer to which the self default status object was moved is 10 or more. The default number can be obtained by referencing the device data 44.

When S620 is NO, the display information control portion 52 will display a layout in which the self default status object is disposed in the post-movement position. In addition, the display information control portion 52 will output data to the server PC 1 indicating that a change in the default printer has occurred. More specifically, the index number of the default printer after the change will be output to the server PC 1. This data will be used by the server PC 1 in S110 of FIG. 26.

Note that in the client PC 2, the printing processor 53 (see FIG. 3) will store default printer information (e.g., the index number) for the own client PC 2. In S625, a process will also be executed that stores the default printer after being changed in the printing processor 53.

When the process of S625 is completed, the process will return to S515 of FIG. 32.

Figure 39:
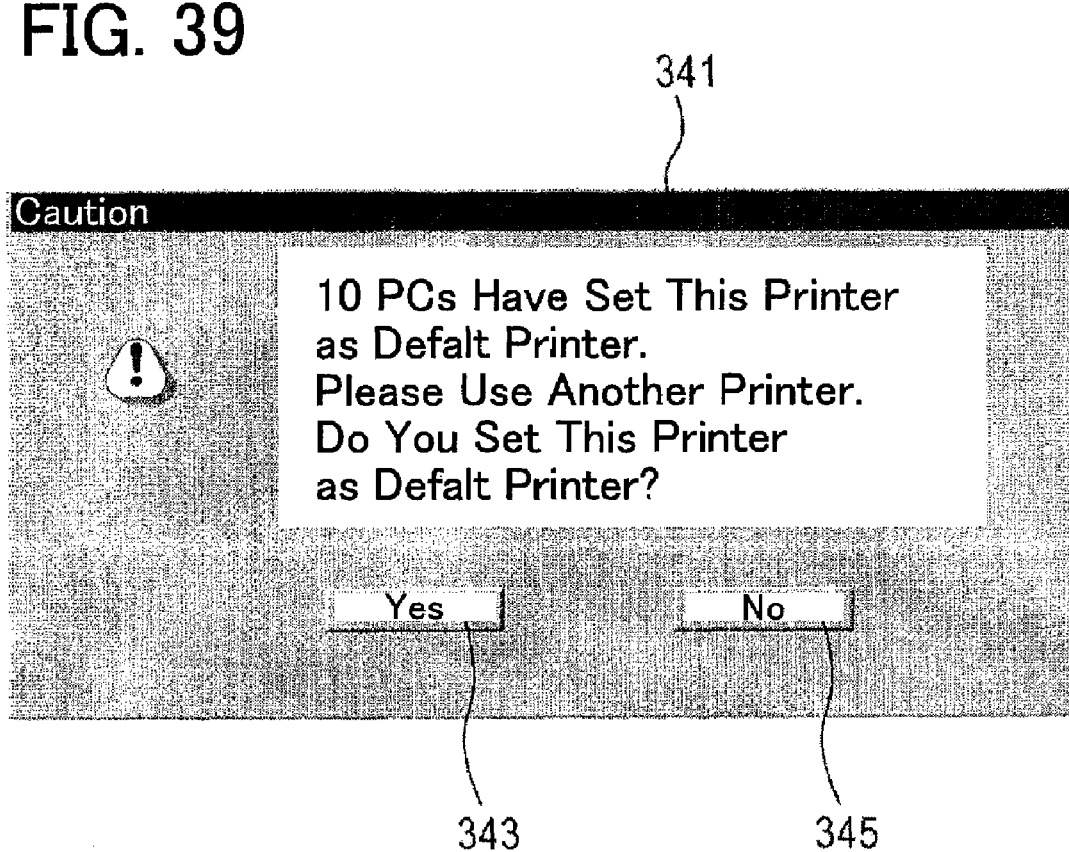
FIG. 39 shows an example of a caution display related to a default printer.
Figure 40:
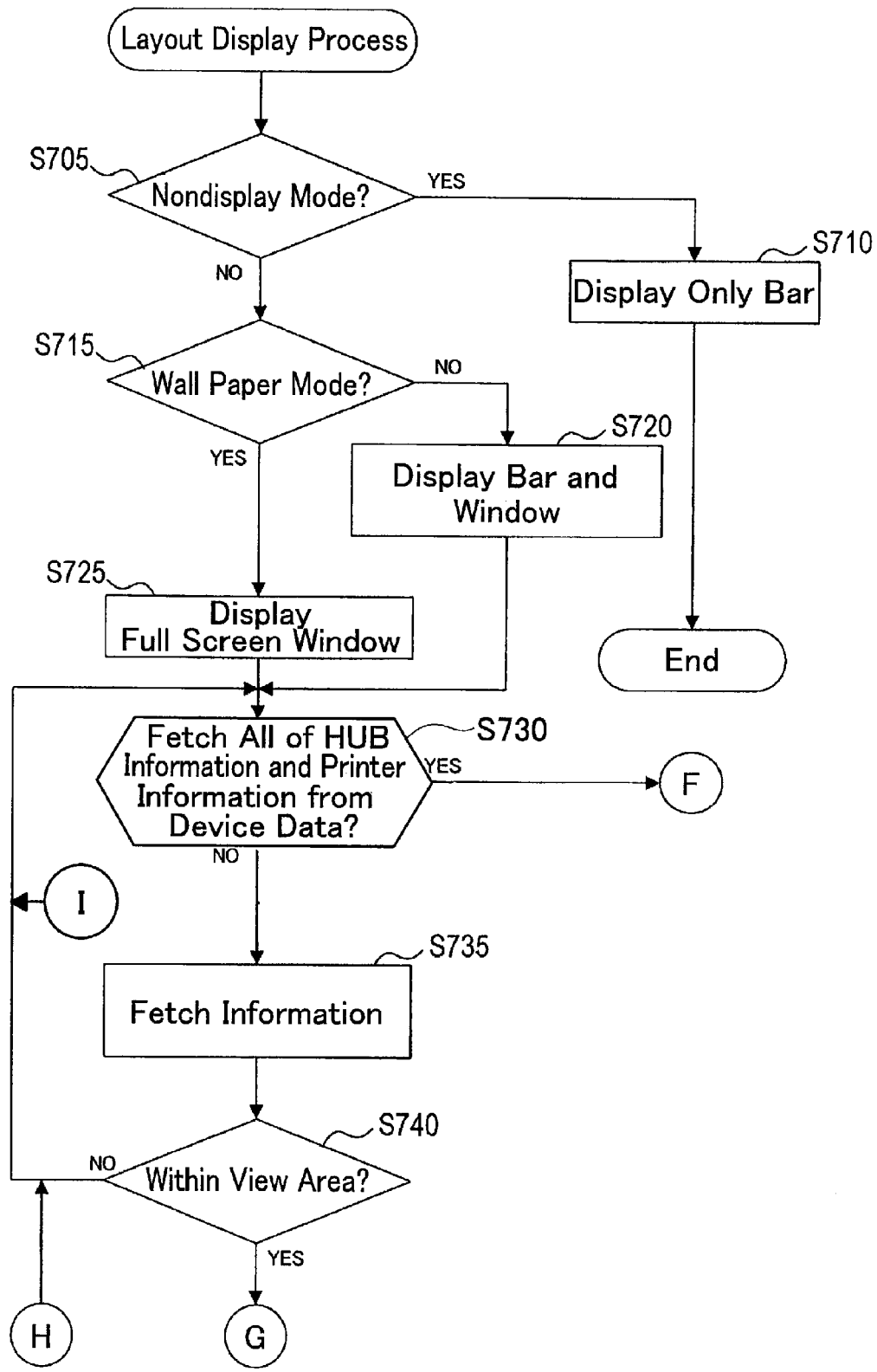
FIG. 40 shows a flowchart of a layout display process executed by the client PC.

In contrast, when the answer is YES in S620, the display information control portion 52 will display a caution window (S630). FIG. 39 shows an example of a warning window 341. A user can force the setting of the default printer by clicking the YES object 343. In addition, the user can cancel the setting of the default printer by clicking the NO object 345.

Furthermore, in S630, the display information control portion 52 will display the printer object to which the self default status object was moved so that it appears to collapse (see FIG. 23).

The display information control portion 52 will determine whether or not "Yes" was selected in the caution window 341. When the answer here is YES, the process of S625 noted above will be executed. The setting of the default printer will be changed.

In addition, when "No" was selected in the caution window 341 (when the answer is NO in S635), the display information control portion 52 will return the self default status object to the original position (S640). When the process of S640 is completed, the process will return to S515 of FIG. 32.

When the answer is NO in S615, S645 will be executed. In S645, the display information control portion 52 will determine whether or not an operation has been executed by a user that moves the self temporary printer object (see reference numeral 177 of FIG. 20(c)). The self temporary printer object is displayed in the process of S610 noted above. When the answer is YES in S645, the display information control portion 52 will determine whether or not the post-movement position satisfies predetermined conditions (S647). The process of S647 is the same as the process of S617 noted above.

When the answer is NO in S647, the display information control portion 52 will return the self temporary printer object to the original position (S648). In this case, the process will proceed to S655 of FIG. 35 noted below.

In contrast, when S647 is YES, the display information control portion 52 will display a layout in which the self temporary printer object is disposed in the post-movement position (S650). In addition, the display information control portion 52 will display the in-printing status figure objects (see reference numeral 209c of FIG. 24(a)) in the communication path object that is disposed between the PC figure object of the own client PC 2 and the printer figure object of the temporary printer.

In S650, the display information control portion 52 will output data indicating that the temporary printer has been set to the printing processor 53 (see FIG. 3). This data is used in the process of S430 in FIG. 31 noted above. In other words, the printing processor 53 will change the printer to which the print instruction (print data) is output from the default printer to the temporary printer.

In addition, in S650, the display information control portion 52 will output data to the server PC 1 that indicates that the temporary printer has been set. More specifically, the index number of the temporary printer will be output to the server PC 1. This data is used in S110 of FIG. 26.

When the process of S650 is completed, the process will return to S515 of FIG. 32.

Figure 35:
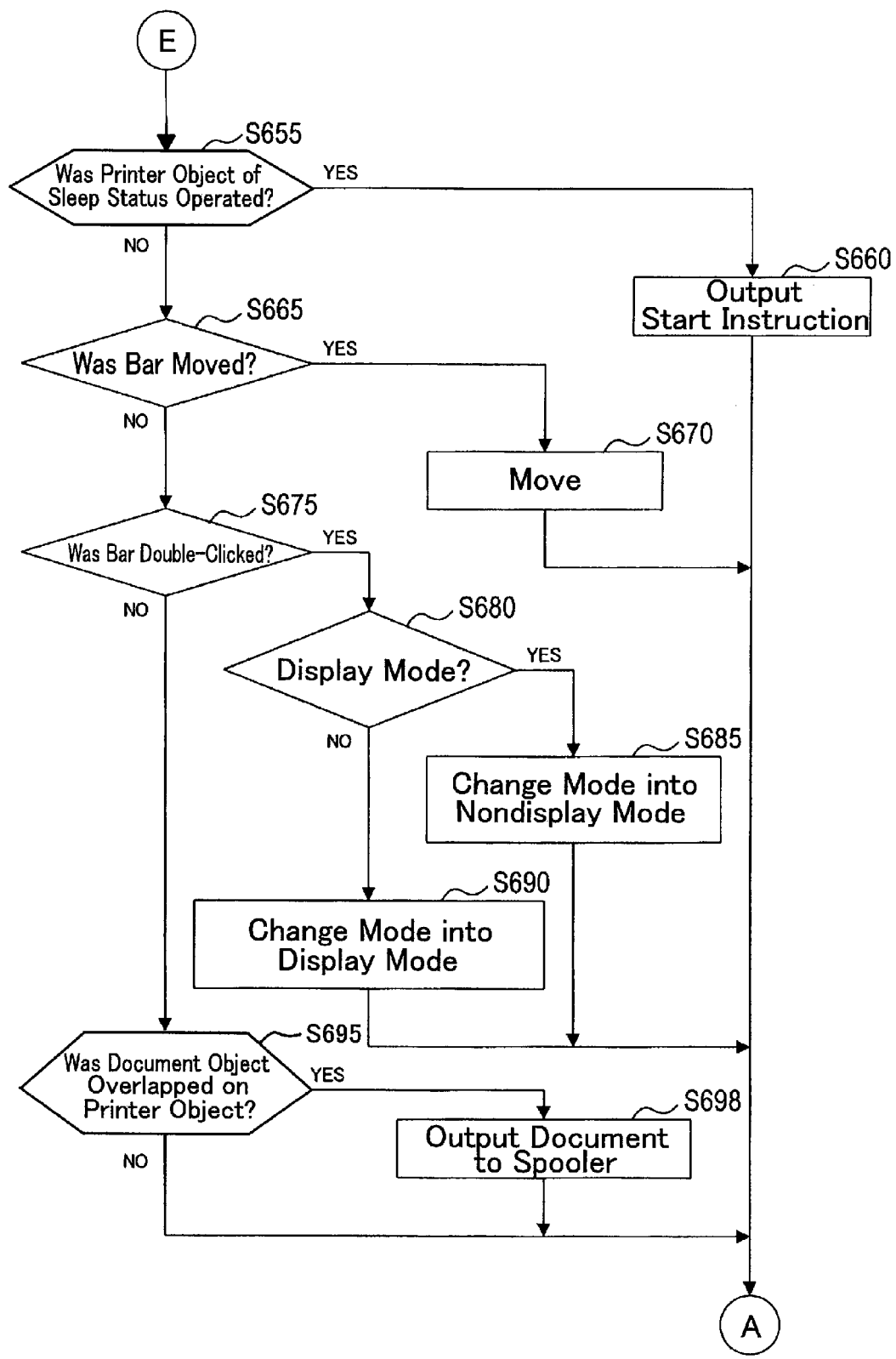
FIG. 35 shows a flowchart of the display process executed by the client PC (continuation E of FIG. 34).

Next, the process of S655 of FIG. 35 will be described. The display information control portion 52 will determine whether or not the printer object in the sleep status was clicked (S655). When the answer here is YES, the display information control portion 52 will output a start instruction to the printer in sleep status (S660). The start instruction is input to the printer 3 in the process of S220 of FIG. 28 noted above.

When the process of S660 is completed, the process will return to S515 of FIG. 32.

The display information control portion 52 observes whether or not a drag operation that moves the bar 105 (see FIG. 17) has been executed by a user (S665). When the answer here is YES, the display information control portion 52 will move the layout window 103 (S670). When the process of S670 is completed, the process will return to S515 of FIG. 32.

The display information control portion 52 observes whether or not an operation that double clicks the bar 105 has been executed by a user (S675). When the answer here is YES, the display information control portion 52 will determine whether or not the mode (see FIG. 15(a)) is in the display mode (S680). When the answer here is YES, the mode will change to the non-display mode (S685). More specifically, the content of the display data storage 52h (see FIG. 12) will be updated. In contrast, when the answer here is NO, the mode will change to the non-display mode (S690). The content of the display data storage 52h (see FIG. 12) will be updated.

When S685 or S690 is completed, the process will return to S515 of FIG. 32.

The display information control portion 52 observes whether or not an operation that overlaps a document object with the printer object has been executed by a user (S695).

A document means a file that is to be printed by the printer 3 (referred to as a document file). The document file is produced by an application such as word processing software, spreadsheet software, draw software, or the like. Document objects are objects that represent each document file. Reference numeral 163 of FIG. 16 shows an example of the document object. The document object 163 is displayed by the functioning of the OS 51 (see FIG. 3). In the process of S695, the display information control portion 52 will determine whether or not the document object 163 has been overlapped with any printer object.

When the answer is YES in S695, the content of the document file will be sent to the spooler 55 (see FIG. 3) (S698). In the process of S698, the application portion 54 (see FIG. 5) will produce print data from the content of the document file. The print data will be output to the spooler 55. By executing the process of S698, it will be determined that the answer in the process of S405 of FIG. 31 noted above is YES. Moreover, in this case, a print instruction will be output to the printer 3 that corresponds to the printer object with which the document object was overlapped in S415. Printing will be executed by the printer 3 selected by a user.

Note that when the answer in S695 is NO, the process will return to S515 of FIG. 32.

Figure 32:
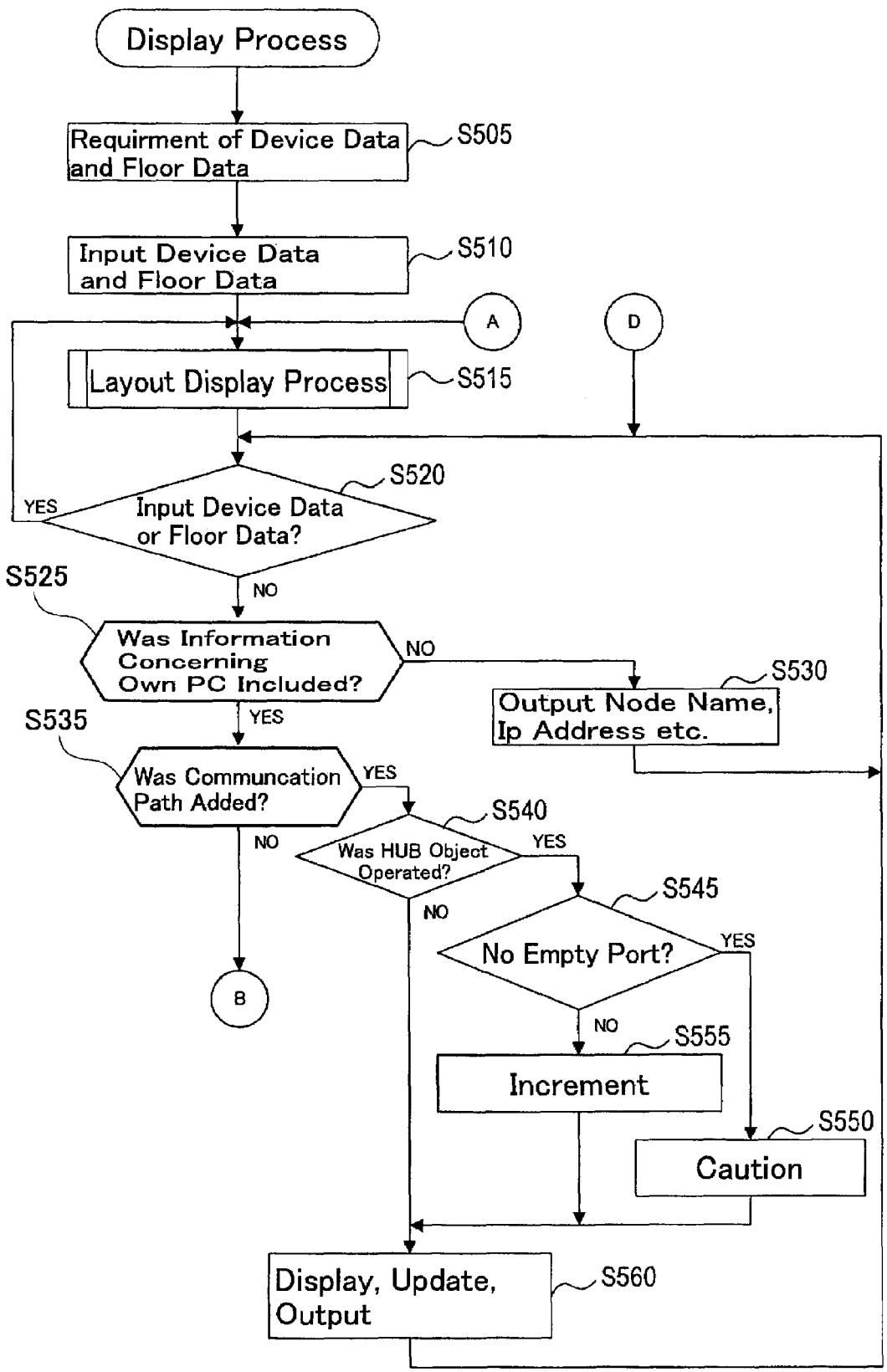
FIG. 32 shows a flowchart of a display process executed by the client PC.

Next, details of process of S515 of FIG. 32 (the layout display process) will be described. FIGS. 40 to 44 show flowcharts of the layout display process.

The display information control portion 52 will determine whether or not the mode (see FIG. 15(a)) is in the non-display mode (S705). When the answer here is YES, the display information control portion 52 will display only the bar 105 in a predetermined position of the screen 101 of the display device 25 (see FIG. 2) (S710). A user can change this predetermined position by dragging the bar 105. By executing S710, the screen 101 illustrated in FIG. 17 will be displayed.

In contrast, when the answer is NO in S705, the display information control portion 52 will determine whether or not the mode is the desktop wallpaper mode (S715). When the answer here is NO, the display information control portion 52 will display the bar 105 and display the window 103 in a predetermined position (S720) In this case, each object inside the window 103 will be semi-transparently displayed (see FIG. 16).

When the answer is YES in S715, the display information control portion 52 will display a full screen window (S725). In this case, the full screen window will be disposed more to the rear than the other windows (see FIG. 18).

Next, the display information control portion 52 will determine whether or not all hub data and printer data was fetched (S730). Hub data is data that is the combination of the index number of the hub, the connection relationship, the status, and the position (e.g., the data in the example of number 1 of FIG. 11). In addition, printer data is data that is the combination of the index number of the printer, the node name, the IP address, the connection relationship, the status, and the position (e.g., the data in the example of number 4 of FIG. 11). When the answer is NO in S730, the display information control portion 52 will fetch the hub data or printer data from the device data 44 (S735). In S735, one row's worth of data in FIG. 11 will be fetched. In the process of S735, the data of PC 2 will not be fetched.

The display information control portion 52 will determine whether or not the data fetched in S735 is inside the view area (see reference numerals 165*a* to 165*c* of FIG. 19) (S740). More specifically, it will be determined whether or not the position that is included in the fetched data is in the view area. The data concerning the view area is stored in the display data storage 52*h* (see FIG. 12).

When the answer is NO in S740, the data fetched in S735 will not be used, and the process will return to S730. In this way, the hub or the printer that is outside the view area will not be displayed in the layout.

Figure 41:
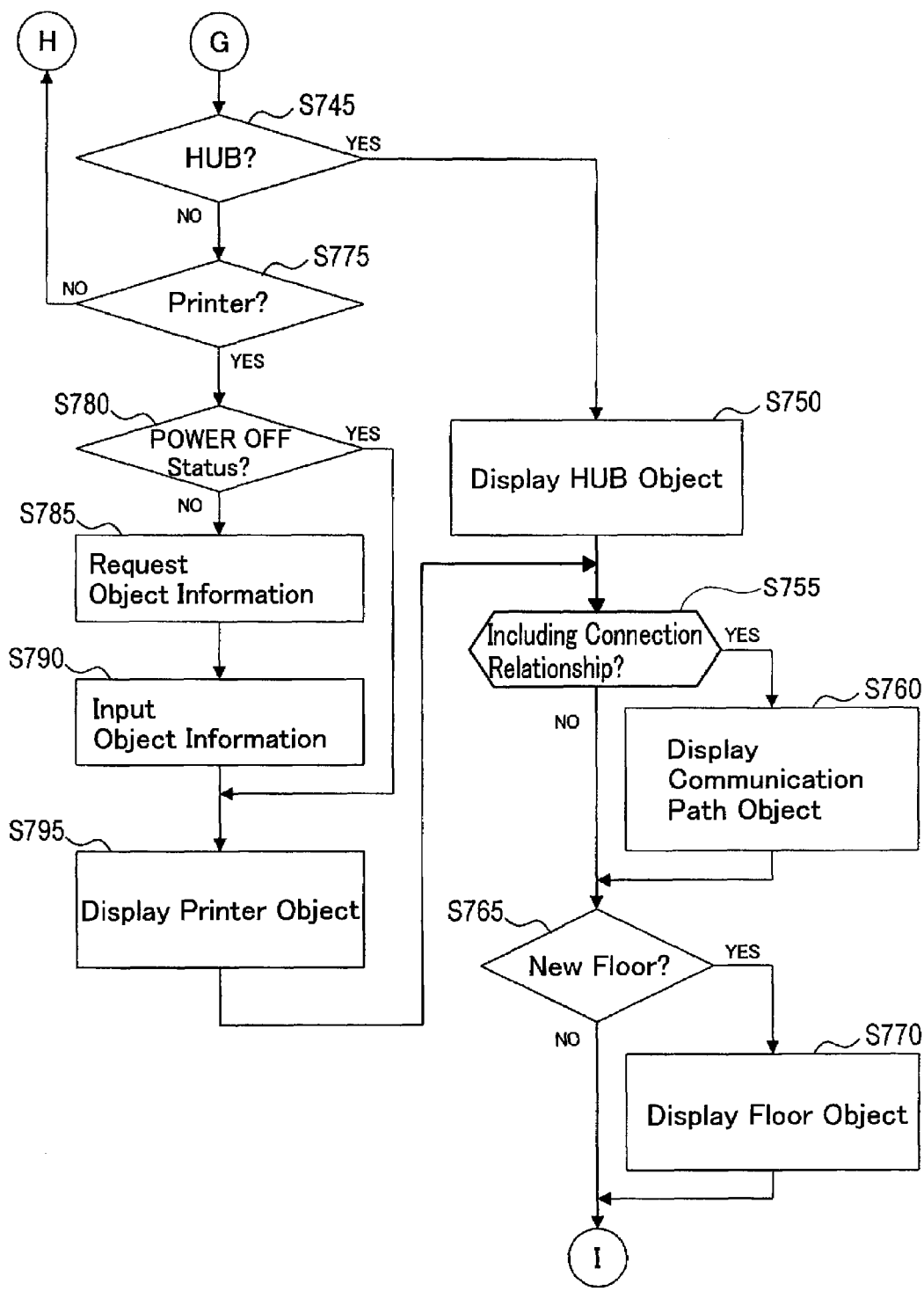
FIG. 41 shows a flowchart of the layout display process executed by the client PC (continuation G of FIG. 40).

In contrast, when the answer is YES in S740, the process will proceed to S745 in FIG. 41. In S745, the display information control portion 52 will determine whether or not the data fetched in S735 is hub data (S745). When the answer here is YES, the display information control portion 52 will display the hub object at the position included in the data fetched in S735. At this point, the display information control portion 52 will take the first angle and the second angle (see FIG. 15(*b*) and (*c*)) into consideration and display the hub object (S750). In this way, the hub object will be displayed in the layout.

The most optimal display format of the hub object is selected from the plurality of display formats prepared in advance, based upon the first angle and the second angle. Note also that the hub object may be formed by polygons. In this case, a polygon hub object will be displayed in a shape that is based on the first angle and the second angle.

Next, the display information control portion 52 will determine whether or not connection relationship data is included in the fetched data in S735 (S755). For example, in the case of the hub of number 2 in FIG. 11, the answer in S755 will be determined to be YES because connection relationship data (1) is included. When the answer is YES in S755, the display information control portion 52 will display the communication path object (S760). Here, the communication path object will be displayed in accordance with the view area, the first angle, and the second angle.

When the answer is NO in S755, the process of S760 will be skipped.

Next, the display information control portion 52 will determine whether or not the display of a new floor is necessary (S765). When the position in the fetched data in S735 includes a new floor, the answer is determined to be YES in S765. In this case, the display information control portion 52 will display the floor object of a new floor (S770). Here, the floor object will be displayed in accordance with the view area, the first angle, and the second angle.

When the answer is NO in S765, the process of S770 will be skipped. When the process of S765 or S770 is completed, the process will return to S730 of FIG. 40.

When it is determined that the answer is NO in S745, the display information control portion 52 will determine whether or not the data fetched in S735 is printer data (S775). When the answer here is YES, the display information control portion 52 will determine whether or not the printer is in the POWER OFF status (S780). The process of S780 will be executed by referencing the status included in the data fetched in S735.

When the answer is NO in S780, the display information control portion 52 will request the object data from the printer 3 (S785). When the client PC 2 requests the object data, the printer 3 will send the object data to the client PC 2. The client PC 2 will input the object data (S790). The object data is data relating to the shape of the printer object, and will differ for each printer.

The display information control portion 52 will display the printer object in the layout based on the object data. In the present embodiment, the client PC 2 can obtain object data from the printer 3. When this is done, the client PC 2 can display the printer object that is modeled on the shape of the printer 3, even when a new printer 3 is added to the system 10.

Note that when the answer is YES in S780, the processes of S785 and S790 will be skipped. When the processes of S785 and S790 have been skipped, the display information control portion 52 cannot obtain the object data. In this case, the display information control portion 52 will use the printer object that is prepared in advance. In addition, when the client PC 2 previously obtained the object data from the printer 3 in the POWER OFF status, that data may be stored in a cache memory. In this case, the object data of the printer 3 in the POWER OFF status can be used.

The display information control portion 52 will display the printer object in accordance with the status of the printer 3, the position of the printer 3, the first angle, and the second angle (S795). For example, when the status of the printer 3 changes, the printer object that shows the status after the change will be displayed in the process of S795.

When S795 is completed, the process will proceed to S755 noted above. In this way, the communication path object will be connected to the printer object (S760), and a new floor may be added (S770).

When the processes of S730 to S795 noted above are performed, the hub objects and the printer objects will be displayed in the layout. When it is determined that all data has been fetched in the process of S730 of FIG. 40 (when the answer is YES in S730), the process will proceed to S800 of FIG. 42.

In S800, the display information control portion 52 will determine whether or not all PC data was fetched from the device data 44 (S800). When the answer here is NO, the display information control portion 52 will fetch the PC data from the device data 44 (S805). Here, one row's worth of data in FIG. 11 will be fetched. In the process of S805, the hub data and printer data will not be fetched.

The display information control portion 52 will determine whether or not the data fetched in S805 is inside the view area (see reference numerals 165*a* to 165*c* of FIG. 19) (S810). When the answer here is NO, the data of S805 will not be used, and the process will return to S800.

In contrast, when the answer is YES in S810, the display information control portion 52 will determine whether or not the PC with the same node name is already being displayed (S815). There will be times in which the PC comprises a plurality of network IFs 26 (see FIG. 2). In this case, a plurality of index number will be provided for one PC. When this type of PC exists in the device data 44, the answer may be determined to be YES in S815.

When the answer is NO in S815, the display information control portion 52 will display the PC object (S820). Here, the PC object will be displayed in accordance with the position of the PC, the first angle, and the second angle. When the position of the PC is not known (e.g., the PC of number 9 in FIG. 11), the PC object will be disposed outside the floor object.

On the other hand, when the answer is YES in S815, the display information control portion 52 will append an IP address to the displayed PC object (S825). In this way, the display illustrated in FIG. 25 will be provided.

Figure 43:
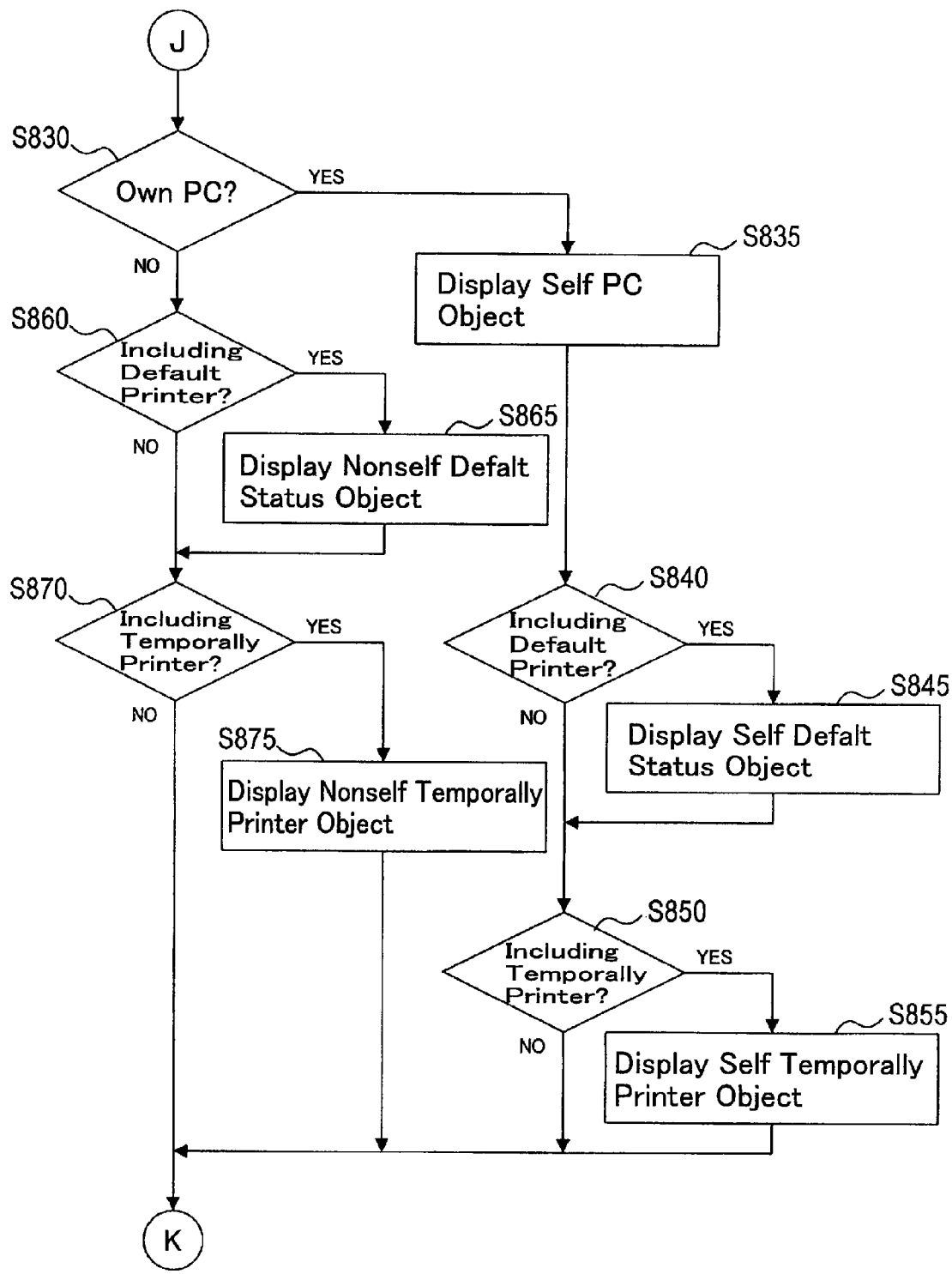
FIG. 43 shows a flowchart of the layout display process executed by the client PC (continuation J of FIG. 42).

When the process of S820 or S825 is completed, the process will proceed to S830 of FIG. 43.

In S830, the display information control portion 52 will determine whether or not the data fetched in S805 is its own PC data. This determination will be executed by comparing the node name included in data fetched in S805 with the node name of the own client PC.

When the answer is YES in S830, the display information control portion 52 will display the self PC object below the own PC figure object (see reference numeral 201*b* of FIG. 24(*a*)) (S835). A user can easily find the own PC figure object in the layout.

In addition, the display information control portion 52 will determine whether or not default printer data is included in the data fetched in S805 (S840). For example, the default printer of the PC of number 3 in FIG. 11 is 4. In this case, the answer will be determined to be YES in S840. When the answer is YES in S840, the display information control portion 52 will display the self default status object below the printer figure object of the default printer (see reference numeral 173 of FIG. 20(*a*)) (S845).

In addition, the display information control portion 52 will determine whether or not temporary printer data is included in the data fetched in S805 (S 850). For example, the temporary printer of the PC of number 3 in FIG. 11 is 5. In this case, the answer will be determined to be YES in S850. When the answer is YES in S850, the display information control portion 52 will display the self temporary printer object below the printer figure object of the temporary printer (see reference numeral 177 of FIG. 20(*d*)).

In contrast, when the answer is NO in S830, the display information control portion 52 will determine whether or not default printer data is included in the data fetched in S805 (S860). When the answer is YES in S860, the display information control portion 52 will display the non-self default status object below the printer figure object of the default printer (see reference numeral 175 of FIG. 20(*b*)) (S865).

Each non-self default status object may be set to have different colors and patterns. For example, the color of the PC object may be the same as the color of the non-self default status object that corresponds to that PC object. In this case, each PC object is preferably set to a different color. When this is done, it will be easy to understand the corresponding relationship between the PC object and the default printer of that PC.

In addition, the display information control portion 52 will determine whether or not temporary printer data is included in the data fetched in S805 (S870). When the answer is YES in S870, the display information control portion 52 will display the non-self temporary printer object below the printer figure object of the temporary printer (see reference numeral 179 of FIG. 20(*d*)).

Each non-self temporary printer object may be set to have different colors and patterns. For example, the color of the PC object may be the same as the color of the non-self temporary printer object that corresponds to that PC object. In this case, each PC object is preferably set to a different color. When this is done, it will be easy to understand the corresponding relationship between the PC object and the temporary printer of that PC.

Figure 44:
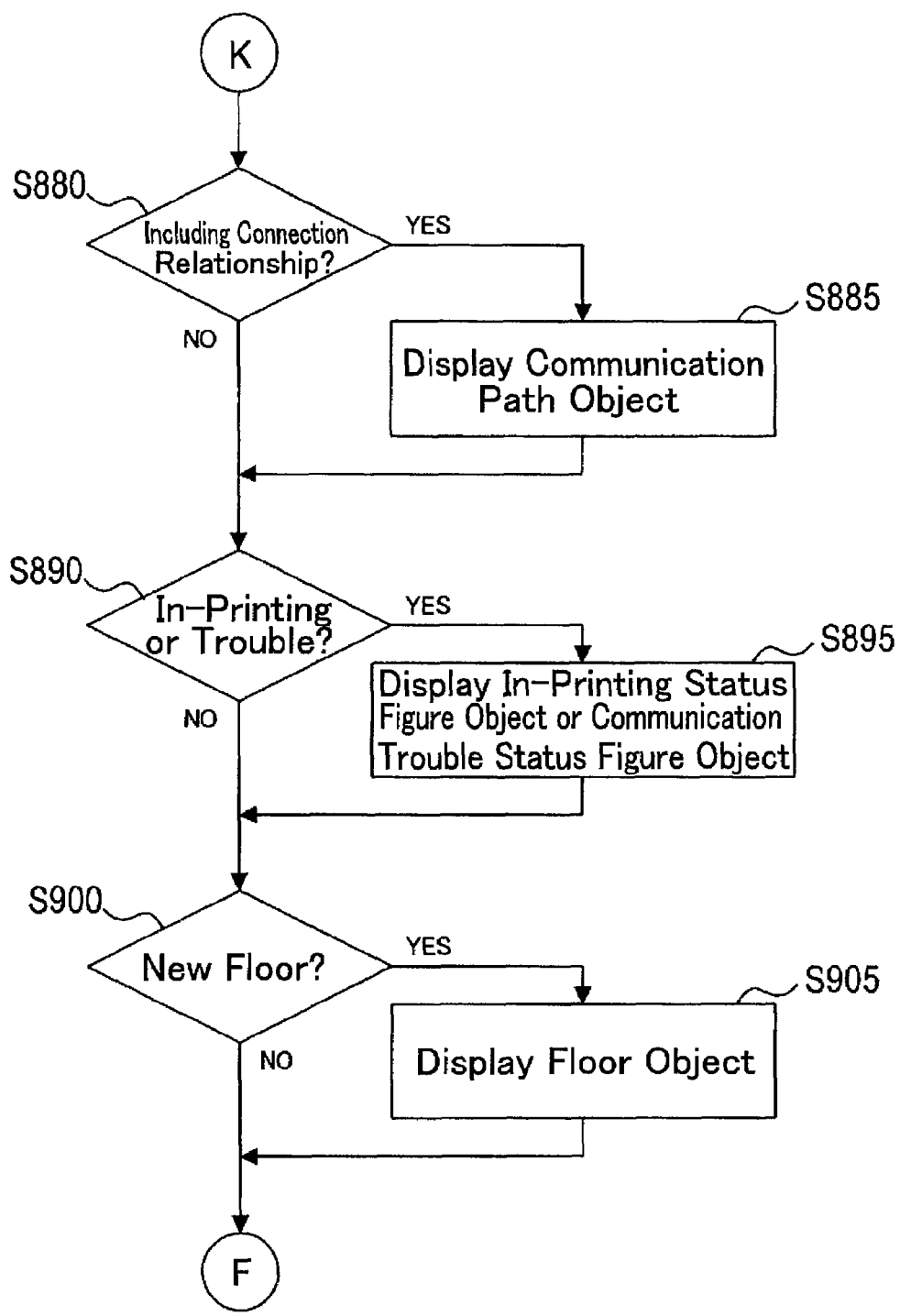
FIG. 44 shows a flowchart of the layout display process executed by the client PC (continuation K of FIG. 43).

When the processes of S830 to S875 noted above are completed, the process will proceed to S880 of FIG. 44. In S880, the display information control portion 52 will determine whether or not connection relationship data is included in the data fetched in S805 (S880). For example, in the case of the PC of number 3 in FIG. 11, the answer in S880 will be determined to be YES because the connection relationship data is 2. In contrast, in the case of the PC of number 9 in FIG. 11, the answer in S880 will be determined to be NO because connection relationship data is not included.

When the answer is YES in S880, the display information control portion 52 will display the communication path object (S885). Here, the communication path object will be displayed in accordance with the first angle and the second angle. When the answer is NO in S880, S885 will be skipped.

The display information control portion 52 will determine whether or not the printer 3 is currently printing or in trouble status due to the print instruction output from the PC fetched in S805 (S890). For example, the PC of number 3 in FIG. 11 will output the print instruction to the printer of number 5, and the printer of number 5 will be printing. In this case, when the data fetched in S805 is the PC of number 3, the answer will be determined to be YES in S890.

Figure 42:
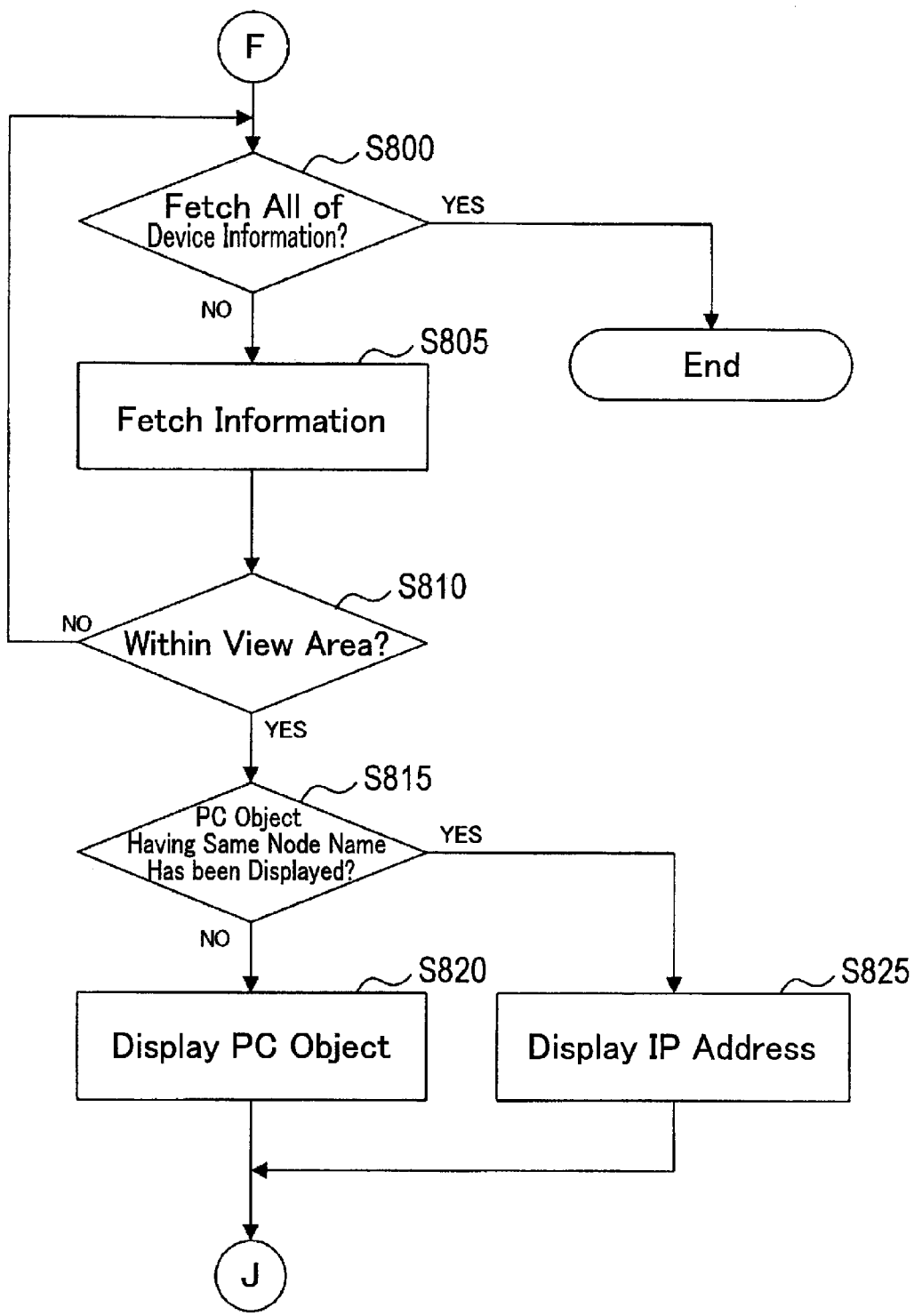
FIG. 42 shows a flowchart of the layout display process executed by the client PC (continuation F of FIG. 40).

When the printer 3 is printing (when the answer in S890 is YES), the display information control portion 52 will display the in-printing status figure object (reference numeral 209*c* of FIG. 24(*a*)) in the communication path object between the PC figure object displayed in S820 of FIG. 42 and the printer figure object of the printer 3 that is printing.

In addition, when the printer 3 is in trouble status (when the answer in S890 is YES), the display information control portion 52 will display the communication trouble status figure object (reference numeral 209*d* of FIG. 24(*b*)) in the communication path object between the PC figure object displayed in S820 of FIG. 42 and the printer figure object of the printer 3 that is in trouble status.

The display information control portion 52 will determine whether or not the display of a new floor is necessary (S900). When the position in the data fetched in S805 includes a new floor, the answer is determined to be YES in S900. In this case, the display information control portion 52 will display the floor object of a new floor (S905). Here, the floor object will be displayed in accordance with the view area, the first angle, and the second angle.

When the processes of S800 to S905 noted above are performed, the PC objects and the like will be displayed. When the processes with regard to all PC data included in the device data 44 is complete, it will be determined that the answer is YES in S800 of FIG. 42, and the layout display process will be complete.

The illustrative aspect of the present invention was described in detail.

When the aspect noted above is used, a user can know the location of each device by viewing the layout of the system 10. In particular, the user can intuitively understand the status of each device from the device objects and the communication path objects.

In addition, in the embodiment noted above, the functions for displaying the layout are divided between the server PC 1 and the client PC 2. The processing burden on each client PC 2 can be reduced.

In addition, according to the system 10 noted above, each printer stores its own printer object that is modeled on the shape of the printer. Then, each printer 3 will send its own printer object to each client PC 2. The client PC 2 can display the printer object that corresponds to a new printer, even when the new printer has been added to the system 10.

In the present embodiment, the second floor object will not be displayed when a device object is not present on the second floor. The second floor object will be displayed, when an operation is performed that moves a device object disposed on the first floor to the second floor.

In addition, the user can set the view area. In this case, only the inside of the view area will be displayed in the layout.

In the present embodiment, the layout is easy to understand because only the data that is needed for the user will be displayed.

The user can provide the start instruction to the printer that is in sleep status in the layout. In addition, the user can change the default printer by moving the self default status object in the layout. The user can set the temporary printer by moving the self temporary printer object in the layout.

According to the present embodiment, a convenient client PC 2 is achieved.

In addition, according to the present embodiment, the mode of the layout window can be changed. The client PC 2 will be user-friendly. Furthermore, with the display mode, each object will be semi-transparently displayed. In this case, other windows will be easy to see.

In the embodiment described above, the system has client PCs 2, printers 3, and the hubs. However, the devices that form the system 10 can be changed in a variety of ways. Other network devices such as scanners, faxes, cameras, routers, network storage devices, and the like can be combined in the system 10. In addition, a multi-function device that possesses two or more functions that comprise each network device (PC, printer, hub, scanner, fax, camera, router, network storage device, and the like) can also be combined in the system 10.

Characteristics of the above embodiment will be described.

(1) The printer object may include a printer figure object and a status figure object. The printer figure object may have a shape that is modeled on a printer. A user can easily understand that the printer figure object corresponds the printer when viewing the same. The status figure object preferably has a shape that allows a user to intuitively understand the status.

The communication path object may be disposed between each of the terminal objects and each of the printer figure objects. The printer object of a printer having a predetermined status may be displayed in a manner that includes the printer figure object and the status figure object. The printer object of a printer not having the predetermined status may be displayed in a manner that includes only the printer figure object.

(2) The aforementioned predetermined status may include an in-printing status. The status figure object may include an in-printing status figure object. The printer object of a printer having the in-printing status may be displayed in a manner that includes the in-printing status figure object disposed along the communication path object between the terminal object of a terminal which has output a print instruction and the printer figure object of the printer having the in-printing status.

A user can easily identify the printer that is currently printing. Moreover, a user can easily identify the terminal which has output the print instruction to the printer that is currently printing.

(3) The aforementioned predetermined status may include a communication trouble status. The status figure object may include a communication trouble status figure object. The printer object of a printer having the communication trouble status may be displayed in a manner that includes the communication trouble status figure object disposed along the communication path object between the terminal object of a terminal which has output a print instruction and the printer figure object of the printer having the communication trouble status.

A user can easily identify the printer in which communication trouble has occurred. Moreover, a user can easily identify the terminal which has output the print instruction to the printer in which communication trouble has occurred.

(4) The aforementioned predetermined status may include a sleep status. The status figure object may include a sleep status figure object. In this case, the printer object of a printer having the sleep status may be displayed in a manner that includes the sleep status figure object.

A user can easily identify the printer that is in the sleep status.

(5) The aforementioned predetermined status may include a power off status. The status figure object may include a power off status figure object. In this case, the printer object of a printer having the power off status may be displayed in a manner that includes the power off status figure object.

A user can easily identify the printers that are in the power off status.

(6) The printer object of a printer having a ready status may be displayed in a manner that includes only the printer figure object.

A user can easily identify the printer that is in the ready status.

(7) The display terminal may further comprise a status receiving device for receiving the latest status of each of the printers, and a status updating device for updating the status storage in response to receiving the latest status of each of the printers.

In this case, the display terminal can display the layout based upon the latest status of the printers.

(8) The display terminal may further comprise a floor storage for storing a configuration of the floor on which the print network system is disposed. In this case, the layout may further comprise a floor object having the configuration stored in the floor storage.

A user can easily understand the configuration of the floor.

(9) A user is capable of choosing a view area from the configuration of the floor. In this case, the display device may display the layout in a manner that includes only the view area chosen by the user.

In this case, areas that are unnecessary to a user will not be displayed. A layout that is easy to view will be displayed.

(10) The display terminal may further comprise an operation device (e.g., a keyboard or a mouse) that is operated by a user. In this case, the user is capable of inputting information to operate any of the items in the layout by operating the operation device.

(11) The terminal device may further comprise a first outputting device. The user is capable of operating a printer object that shows a sleep status. In this case, the first outputting device outputs a start instruction to the printer corresponding to the printer object operated by the user.

A user can easily start the printer that is in the sleep status.

(12) The terminal device may further comprise a second outputting device. A user is capable of overlapping a document object on any of the printer objects. In this case, the second outputting device outputs a print instruction to the printer on which the document object has been overlapped.

A user can print a document by performing a simple operation.

(13) The display device may display the layout in a perspective view. In this case, the display device may change a view point in order to display the layout.

According to this technique, the layout that is easy to view will be achieved.

(14) The display device may simultaneously display a layout window showing the layout and another window. In this case, the display device may display the layout window in a full-screen mode. In addition, when the layout window is displayed in full-screen mode, the display device may display another window on the front side of the layout window.

According to this technique, the layout that is easy to view will be achieved.

(15) The print network system may further comprise a hub. The print storage may store a position of the hub. The status storage may further store a status of the hub. The connection relationship storage may store a connection relationship between each of the terminals, each of the printers, and the hub. The layout may further comprise a hub object. The hub object may be disposed at a corresponding position stored in the position storage. The hub object may be displayed in a manner that represents the status of the hub stored in the status storage. The communication path object is disposed between each of the terminal objects, each of the printer objects, and the hub object, based on the connection relationship stored in the connection relationship storage.

A user can know the status of the hub, and the connection relationship of the hub, from the layout.

(16) The display terminal may further comprise an operation device operated by a user, and a determination device. The user may input information in order to arrange the communication path between the hub object and any of the terminal objects and the printer objects by operating the operation device. The determination device determines whether the information input by the user is within an allowance based on the status of the hub stored in the status storage. The determination device may prohibit the arrangement of the communication path object when the information input by the user is not within the allowance.

A user can execute a simulation in order to arrange the communication path on the layout screen.

(17) In the aspect of the present invention, a print network system is also provided. The print network system may include a server PC, a plurality of client PCs, and a plurality of printers. In this case, each of the client PCs may comprise the position storage, the status storage, the connection relationship storage, and the display device.

The layout can be displayed on each client PC. A system in which each user can obtain valuable information is constructed.

(18) In the aforementioned system, each printer may output information regarding its own status to the server PC. In this case, the server PC outputs information regarding the status of each printer to each client PC.

Note that each client PC in the system can adopt any of the technologies disclosed in (1) to (16) described above.

(19) A method of displaying the layout of a print network system is useful. This method comprises a position storing step, a status storing step, a connection relationship storing step, and a display step.

The position storing step stores a position of each of the terminals and the printers. The status storing step stores a status of each of the printers. The connection relationship storage step stores a connection relationship between each of the terminals and each of the printers. The display step displays a layout of the print network system. The layout has a plurality of terminal objects, a plurality of printer objects, and a communication path object. Each of the terminal objects and the printer objects is disposed at a corresponding position stored in the position storing step. Each of the printer objects is displayed in a manner that represents the status of a corresponding printer stored in the status storing step. The communication path object is disposed between each of the terminal objects and each of the printer objects, based on the connection relationship stored in the connection relationship storing step.

When this method is used, the layout can be displayed that includes information on the position relationship of each device, information on the printer status, and information about the connection relationship of each device. A user can obtain extremely valuable information.

Note that this method can include the step of applying any of the characteristics disclosed in (1) to (16) described above.

(20) A computer program product for a display terminal that displays a layout of a print network system is useful. The computer program product includes instructions for ordering the display terminal to perform each of the steps disclosed in (19) above.

When the computer program product is used, a display terminal that can display valuable information can be achieved.

The computer program product may include, for example, a recording medium on which a computer program is stored. In addition, the computer program product may include a device in which a computer program has been installed.

Note that this computer program product may include instructions for causing steps that perform any of the characteristics disclosed in (1) to (16) described above to be executed on the display terminal.

(21) In the present invention, a computer data signal that is embodied in a carrier wave is provided. The computer data signal includes at least one computer program for a display terminal that displays a layout of a print network system. The computer program includes instructions for ordering the display terminal to perform each of the steps disclosed in (19) above.

The computer data signal will, for example, be transmitted to a terminal through a communication network. When the computer data signal is used, a display terminal that can display valuable information can be achieved.

Note that this computer data signal may include instructions for causing steps that perform any of the characteristics disclosed in (1) to (16) described above to be executed on the display terminal.

What is claimed is:

1. A display terminal for displaying a layout of a print network system, the print network system comprising a plurality of terminals and a plurality of printers, wherein the display terminal is one of the terminals of the print network system, the display terminal comprising:

a position storage for storing a position of each of the terminals and the printers; a status storage for storing a status of each of the printers;

a connection relationship storage for storing a connection relationship between each of the terminals and each of the printers; and a display device for displaying the layout of the print network system, the layout comprising a plurality of terminal objects, a plurality of printer objects, and a communication path object, wherein (1) each of the terminal objects and the printer objects is disposed at a corresponding position stored in the position storage, (2) each of the printer objects is displayed in a manner that represents a status of a corresponding printer stored in the status storage, and (3) the communication path object is disposed between each of the terminal objects and each of the printer objects based on the connection relationship stored in the connection relationship storages wherein the printer object includes a printer figure object and a status figure object, the communication path object is disposed between each of the terminal objects and each of the printer figure objects, the printer object of a printer having a predetermined status is displayed in a manner that includes the printer figure object and the status figure object, the predetermined status includes one or both of an in-printing status and a communication trouble status, the status figure object includes one or both of an in-printing status figure object and a communication trouble status figure object, the printer object of a printer having the in-printing status is displayed in a manner that includes the in-printing status figure object disposed along the communication path object between the terminal object of a terminal which has output a print instruction and the printer figure object of the printer having the in-printing status, and the printer object of a printer having the communication trouble status is displayed in a manner that includes the communication trouble status figure object disposed along the communication path object between the terminal object of a terminal which has output a print instruction and the printer figure object of the printer having the communication trouble status.

2. The display terminal as in claim 1, wherein
the predetermined status includes a power off status,
the status figure object includes a power off status figure object, and
the printer object of a printer having the power off status is displayed in a manner that includes the power off status figure object.

3. The display terminal as in claim 1, wherein
the printer object of a printer having a ready status is displayed in a manner that includes only the printer figure object.

4. The display terminal as in claim 1, further comprising:
a status receiving device for receiving the latest status of each of the printers; and
a status updating device for updating the status storage in response to receiving the latest status of each of the printers.

5. The display terminal as in claim 1, further comprising:
a floor storage for storing a configuration of a floor on which the print network system is disposed,
wherein the layout further comprises a floor object having the configuration stored in the floor storage.

6. The display terminal as in claim 5, wherein
an user is capable of choosing a view area from the configuration of the floor, and
the display device displays the layout in a manner that includes only the view area chosen by the user.

7. The display terminal as in claim 1, further comprising:
an operation device operated by an user, wherein
the user is capable of inputting information to operate any of the items in the layout by operating the operation device.

8. The display terminal as in claim 7, further comprising:
a first outputting device, wherein
the user is capable of operating the printer object showing a sleep status, and
the first outputting device outputs a start instruction to a printer corresponding to the printer object operated by the user.

9. The display terminal as in claim 7, further comprising:
a second outputting device, wherein
the user is capable of overlapping a document object on any of the printer objects, and
the second outputting device outputs a print instruction to a printer corresponding to the printer object on which the document object has been overlapped.

10. The display terminal as in claim 1, wherein
the display device is capable of displaying the layout in a perspective view.

11. The display terminal as in claim 10, wherein
the display device is capable of changing a view point for displaying the layout.

12. The display terminal as in claim 1, wherein
the display device is capable of simultaneously displaying a layout window showing the layout and the other window.

13. The display terminal as in claim 12, wherein
the display device is capable of displaying the layout window in a full-screen mode, and
in a case where the layout window is displayed in the full-screen mode, the display device is capable of displaying the other window on a front side of the layout window.

14. The display terminal as in claim 1, the print network system further comprising a hub, wherein
the position storage further stores a position of the hub,
the status storage further stores a status of the hub,
the connection relationship storage stores a connection relationship between each of the terminals, each of the printers, and the hub,
the layout further comprises a hub object,
the hub object is disposed at a corresponding position stored in the position storage,
the hub object is displayed in a manner that represents the status of the hub stored in the status storage, and
the communication path object is disposed between each of the terminal objects, each of the printer objects, and the hub object based on the connection relationship stored in the connection relationship storage.

15. The display terminal as in claim 14, further comprising:
an operation device operated by an user; and
a determination device, wherein the user is capable of inputting information to add the communication path object between the hub object and any of the terminal objects and the printer objects by operating the operation device, and
the determination device determines whether the information input by the user is within an allowance based on the status of the hub stored in the status storage, and the determination device prohibits the communication path object from being added in a case where the information input by the user is not within the allowance.

16. A print network system comprising a server PC, a plurality of client PCs, and a plurality of printers, wherein
each of the client PCs comprises the position storage, the status storage, the connection relationship storage, and the display device as in claim 1.

17. The print network system as in claim 16, wherein
each of the printers outputs information concerning its own status to the server PC, and
the server PC outputs information concerning the status of each of the printers to each of the client PCs.

18. The display terminal as in claim 1, wherein
the predetermined status includes a sleep status,
the status figure object includes a sleep status figure object, and
the printer object of a printer having the sleep status is displayed in a manner that includes the sleep status figure object.

19. A method of displaying a layout of a print network system, the print network system comprising a plurality of terminals and a plurality of printers, the method performed by a display terminal which is one of the terminals of the print network system, the method comprising:

a position storing step of storing a position of each of the terminals and the printers;

a status storing step of storing a status of each of the printers;

a connection relationship storing step of storing a connection relationship between each of the terminals and each of the printers; and a displaying step of displaying the layout of the print network system, the layout comprising a plurality of terminal objects, a plurality of printer objects, and a communication path object, wherein (1) each of the terminal objects and the printer objects is disposed at a corresponding position stored in the position storing step, (2) each of the printer objects is displayed in a manner that represents a status of a corresponding printer stored in the status storing step, and (3) the communication path object is disposed between each of the terminal objects and each of the printer objects based on the connection relationship stored in the connection relationship storing step, wherein the printer object includes a printer figure object and a status figure object, the communication path object is disposed between each of the terminal objects and each of the printer figure objects, the printer object of a printer having a predetermined status is displayed in a manner that includes the printer figure object and the status figure object, the predetermined status includes one or both of an in-printing status and a communication trouble status, the status figure object includes one or both of an in-printing status figure object and a communication trouble status figure object, the printer object of a printer having displayed in a manner includes the in-printing status figure object disposed along the communication path object between the terminal object of a terminal which has output a print instruction and the printer figure object of the printer having the in-printing status, and the printer object of a printer having the communication trouble status is displayed in a manner that includes the communication trouble status figure object disposed along the communication path object between the terminal object of a terminal which has output a print instruction and the printer figure object of the printer having the communication trouble status.

20. A computer storage medium having computer readable instructions stored thereon, for a display terminal displaying a layout of a print network system, the print network system comprising a plurality of terminals and a plurality of printers, wherein the display terminal is one of the terminals of the print network system, and the computer readable medium comprises instructions for ordering a computer mounted on the display terminal to perform:

a position storing step of storing a position of each of the terminals and the printers; a status storing step of storing a status of each of the printers;

a connection relationship storing step of storing a connection relationship between each of the terminals and each of the printers; and a displaying step of displaying the layout of the print network system, the layout comprising a plurality of terminal objects, a plurality of printer objects, and a communication path object, wherein (1) each of the terminal objects and the printer objects is disposed at a corresponding position stored in the position storing step, (2) each of the printer objects is displayed in a manner that represents a status of a corresponding printer stored in the status storing step, and (3) the communication path object is disposed between each of the terminal objects and each of the printer objects based on the connection relationship stored in the connection relationship storing step, wherein the printer object includes a printer figure object and a status figure object, the communication path object is disposed between each of the terminal objects and each of the printer figure objects, the printer object of having a predetermined status is displayed in a manner that includes the printer figure object and the status figure object, the predetermined status includes one or both of an in-printing status and a communication trouble status, the status figure object includes one or both of an in-printing status figure and communication trouble status figure object, the printer object of a printer having the in-printing status is displayed in a manner that includes the in-printing status figure object disposed along the communication path object between the terminal object of a terminal which has output a print instruction and the printer figure object of the printer having the in-printing status, and the printer object of a printer having the communication trouble status is displayed in a manner that includes the communication trouble status figure object disposed along the communication path object between the terminal object of a terminal which has output a print instruction and the printer figure object of the printer having the communication trouble status.

* * * * *